US011815354B2

(12) United States Patent
Senkal et al.

(10) Patent No.: US 11,815,354 B2
(45) Date of Patent: Nov. 14, 2023

(54) DRIVE AND SENSE BALANCED, SEMI-COUPLED 3-AXIS GYROSCOPE

(71) Applicant: INVENSENSE, INC., San Jose, CA (US)

(72) Inventors: Doruk Senkal, San Jose, CA (US); Robert Hennessy, San Jose, CA (US); Houri Johari-Galle, San Jose, CA (US); Joseph Seeger, Menlo Park, CA (US)

(73) Assignee: INVENSENSE, INC., San Jose, CA (US)

( * ) Notice: Subject to any disclaimer, the term of this patent is extended or adjusted under 35 U.S.C. 154(b) by 162 days.

(21) Appl. No.: 17/138,392

(22) Filed: Dec. 30, 2020

(65) Prior Publication Data

US 2021/0116244 A1    Apr. 22, 2021

Related U.S. Application Data

(60) Division of application No. 15/940,810, filed on Mar. 29, 2018, now Pat. No. 10,914,584, which is a
(Continued)

(51) Int. Cl.
G01C 19/5712 (2012.01)
G01C 19/5747 (2012.01)
G01C 19/5762 (2012.01)

(52) U.S. Cl.
CPC ..... *G01C 19/5712* (2013.01); *G01C 19/5747* (2013.01); *G01C 19/5762* (2013.01)

(58) Field of Classification Search
CPC .................. G01C 19/5712; G01C 19/5783
(Continued)

(56) References Cited

U.S. PATENT DOCUMENTS

| 4,510,802 A | 4/1985 | Peters |
| 5,349,855 A | 9/1994 | Bernstein et al. |

(Continued)

FOREIGN PATENT DOCUMENTS

| CN | 1782713 A | 6/2006 |
| CN | 101663586 A | 3/2010 |

(Continued)

OTHER PUBLICATIONS

International Search Report and Written Opinion received for International Application No. PCT/US2012/054411 dated Dec. 24, 2012, 8 pages.
(Continued)

*Primary Examiner* — John Fitzgerald
*Assistant Examiner* — Rodney T Frank
(74) *Attorney, Agent, or Firm* — Amin, Turocy & Watson, LLP

(57) ABSTRACT

In a first aspect, the angular rate sensor comprises a substrate and a rotating structure anchored to the substrate. The angular rate sensor also includes a drive mass anchored to the substrate and an element coupling the drive mass and the rotating structure. The angular rate sensor further includes an actuator for driving the drive mass into oscillation along a first axis in plane to the substrate and for driving the rotating structure into rotational oscillation around a second axis normal to the substrate; a first transducer to sense the motion of the rotating structure in response to a Coriolis force in a sense mode; and a second transducer to sense the motion of the sensor during a drive mode. In a second aspect the angular rate sensor comprises a substrate and two shear masses which are parallel to the substrate and anchored to the substrate via flexible elements. In further embodiments, a dynamically balanced 3-axis gyroscope architecture is provided. Various embodiments described herein can facili-
(Continued)

tate providing linear and angular momentum balanced 3-axis gyroscope architectures for better offset stability, vibration rejection, and lower part-to-part coupling.

15 Claims, 29 Drawing Sheets

Related U.S. Application Data continuation-in-part of application No. 15/865,189, filed on Jan. 8, 2018, now abandoned, which is a continuation of application No. 14/678,774, filed on Apr. 3, 2015, now Pat. No. 9,863,769, which is a continuation-in-part of application No. 14/472,143, filed on Aug. 28, 2014, now Pat. No. 9,395,183, and a continuation-in-part of application No. 14/041,810, filed on Sep. 30, 2013, now Pat. No. 9,170,107, said application No. 14/472,143 is a continuation of application No. 13/235,296, filed on Sep. 16, 2011, now Pat. No. 8,833,162.

(60) Provisional application No. 62/529,401, filed on Jul. 6, 2017, provisional application No. 62/001,474, filed on May 21, 2014.

(58) Field of Classification Search
USPC .......................................... 73/504.12, 504.14
See application file for complete search history.

(56) References Cited

U.S. PATENT DOCUMENTS

| | | | |
|---|---|---|---|
| 5,481,914 A | 1/1996 | Ward | |
| 5,895,850 A | 4/1999 | Buestgens | |
| 5,992,233 A | 11/1999 | Clark | |
| 6,067,858 A | 5/2000 | Clark et al. | |
| 6,230,563 B1 | 5/2001 | Clark et al. | |
| 6,250,156 B1 | 6/2001 | Seshia et al. | |
| 6,508,122 B1 | 1/2003 | McCall et al. | |
| 6,520,017 B1 | 2/2003 | Schoefthaler et al. | |
| 6,845,669 B2 | 1/2005 | Acar et al. | |
| 6,892,575 B2 | 5/2005 | Nasiri et al. | |
| 6,939,473 B2 | 9/2005 | Nasiri et al. | |
| 7,036,372 B2 | 5/2006 | Chojnacki et al. | |
| 7,250,112 B2 | 7/2007 | Nasiri et al. | |
| 7,284,430 B2 | 10/2007 | Acar et al. | |
| 7,437,933 B2 | 10/2008 | Durante et al. | |
| 7,458,263 B2 | 12/2008 | Nasiri et al. | |
| 8,042,394 B2 | 10/2011 | Coronato et al. | |
| 8,042,396 B2 | 10/2011 | Coronato et al. | |
| 8,069,726 B2 | 12/2011 | Seeger et al. | |
| 8,141,424 B2 | 3/2012 | Seeger et al. | |
| 8,322,213 B2 | 12/2012 | Trusov et al. | |
| 8,539,835 B2 | 9/2013 | Seeger et al. | |
| 2003/0200804 A1 | 10/2003 | Johnson | |
| 2004/0211258 A1 | 10/2004 | Geen | |
| 2005/0066728 A1 | 3/2005 | Chojnacki et al. | |
| 2005/0072231 A1 | 4/2005 | Chojnacki et al. | |
| 2005/0081631 A1 | 4/2005 | Weinberg et al. | |
| 2005/0081633 A1 | 4/2005 | Nasiri et al. | |
| 2005/0199061 A1 | 9/2005 | Acar et al. | |
| 2006/0070441 A1 | 4/2006 | Durante et al. | |
| 2006/0112764 A1 | 6/2006 | Higuchi | |
| 2006/0219006 A1 | 10/2006 | Nasiri et al. | |
| 2007/0214883 A1 | 9/2007 | Durante et al. | |
| 2007/0240508 A1 | 10/2007 | Watson | |
| 2007/0266785 A1 | 11/2007 | Cadarelli | |
| 2008/0000296 A1 | 1/2008 | Johnson | |
| 2008/0115579 A1 | 5/2008 | Seeger et al. | |
| 2008/0190199 A1 | 8/2008 | Prandi et al. | |
| 2009/0019933 A1 | 1/2009 | Sung et al. | |
| 2009/0064780 A1 | 3/2009 | Coronato et al. | |
| 2009/0114016 A1 | 5/2009 | Nasiri et al. | |
| 2009/0193892 A1 | 8/2009 | Seeger | |
| 2009/0260437 A1 | 10/2009 | Blomqvist | |
| 2010/0064805 A1 | 3/2010 | Seeger et al. | |
| 2010/0071467 A1 | 3/2010 | Nasiri et al. | |
| 2010/0095768 A1 | 4/2010 | Acar et al. | |
| 2010/0199764 A1 | 8/2010 | Hammer | |
| 2010/0218605 A1 | 9/2010 | Blomqvist et al. | |
| 2010/0222998 A1 | 9/2010 | Blomqvist | |
| 2010/0251800 A1 | 10/2010 | Mueck | |
| 2010/0313657 A1 | 12/2010 | Trusov et al. | |
| 2011/0061460 A1 | 3/2011 | Seeger et al. | |
| 2011/0146402 A1 | 6/2011 | Donadel et al. | |
| 2012/0216612 A1 | 8/2012 | Seeger et al. | |
| 2012/0272711 A1 | 11/2012 | Supino et al. | |
| 2012/0291548 A1 | 11/2012 | Kanemoto | |
| 2013/0019680 A1 | 1/2013 | Kittilsland et al. | |
| 2013/0068018 A1 | 3/2013 | Seeger et al. | |
| 2013/0086985 A1 | 4/2013 | Lin | |
| 2013/0180334 A1 | 7/2013 | Coronato et al. | |
| 2013/0192365 A1 | 8/2013 | Zhuang et al. | |
| 2013/0233048 A1 | 9/2013 | Anac et al. | |
| 2013/0239686 A1 | 9/2013 | Cazzaniga et al. | |
| 2014/0366631 A1 | 12/2014 | Seeger et al. | |
| 2017/0023363 A1 | 1/2017 | Cazzaniga et al. | |
| 2017/0167876 A1 | 6/2017 | Coronato et al. | |
| 2017/0343351 A1 | 11/2017 | Tormalehto | |

FOREIGN PATENT DOCUMENTS

| | | |
|---|---|---|
| CN | 101855516 A | 10/2010 |
| CN | 101987718 A | 3/2011 |
| CN | 102959405 A | 3/2013 |
| CN | 103033177 A | 4/2013 |
| CN | 103076012 A | 5/2013 |
| CN | 103221778 A | 7/2013 |
| CN | 103245340 A | 8/2013 |
| CN | 103797331 A | 5/2014 |
| CN | 104931032 A | 9/2015 |
| CN | 105091875 A | 11/2015 |
| CN | 105683710 A | 6/2016 |
| EP | 1 568 968 A2 | 8/2005 |
| EP | 2 570 770 A2 | 3/2013 |
| EP | 2 899 503 A1 | 7/2015 |
| KR | 10-0374431 B1 | 5/2003 |
| KR | 10-2013-0084950 A | 7/2013 |
| WO | 2009/130554 A2 | 10/2009 |

OTHER PUBLICATIONS

Non-Final Office Action received for U.S. Appl. No. 13/235,296 dated Dec. 26, 2013, 38 pages.
Notice of Allowance received for U.S. Appl. No. 13/235,296 dated May 9, 2014, 21 pages.
Non-Final Office Action received for U.S. Appl. No. 13/862,352, dated May 10, 2016, 25 pages.
Notice of Allowance received for U.S. Appl. No. 14/041,810 dated Apr. 20, 2015, 37 pages.
Notice of Allowance received for U.S. Appl. No. 14/041,810 dated Jun. 24, 2015, 27 pages.
Non-Final Office Action received for U.S. Appl. No. 14/472,143 dated Apr. 20, 2015, 41 pages.
Notice of Allowance received for U.S. Appl. No. 14/472,143, dated Nov. 12, 2015, 27 pages.
Notice of Allowance received for U.S. Appl. No. 14/472,143, dated Dec. 18, 2015, 19 pages.
Communication pursuant to Article 94(3) received for European Patent Application No. 12832613.9 dated Dec. 10, 2015, 5 pages.
Extended European Search Report received for European Patent Application No. 12832613.9 dated Feb. 2, 2015, 6 pages.
Partial European Search Report received for European Patent Application No. 15167772 dated Oct. 26, 2015, 7 pages.
Extended European Search Report received for European Patent Application No. 15167772 dated Feb. 11, 2016, 15 pages.
Notice of Allowance received for U.S. Appl. No. 14/472,143, dated Mar. 28, 2016, 29 pages.

(56) References Cited

OTHER PUBLICATIONS

First Office Action received for Korean Patent Application No. 10-2015-0070468 dated Mar. 16, 2017, 4 pages (including English translation).
First Office Action received for Chinese Patent Application No. 201510258053.8 dated Aug. 1, 2017, 25 pages (including English translation).
First Office Action received for Chinese Patent Application No. 201280045067.6, dated Nov. 14, 2014, 28 pages (including English translation).
Second Office Action received for Chinese Patent Application No. 201280045067.6 dated Jul. 21, 2015, 8 pages (including English translation).
First Office Action received for Chinese Patent Application No. 201410505767.X, dated Dec. 5, 2016, 34 pages (including English translation).
Second Office Action received for Chinese Patent Application No. 201410505767.X dated Jun. 13, 2017, 23 pages (including English translation).
Extended European Search Report received for European Patent Application No. 14182956.4 dated May 15, 2015, 10 pages.
Communication pursuant to Article 94(3) received for European Patent Application No. 14182956.4 dated Mar. 15, 2016, 7 pages.
Extended European Search Report received for European Patent Application No. 17156131.9 dated Mar. 17, 2017, 8 pages.
Non-Final Office Action received for U.S. Appl. No. 14/678,774 dated Jan. 13, 2017, 35 pages.
Extended European Search Report received for European Patent Application No. 17174612.6 dated Oct. 11, 2017, 9 pages.
First Office Action received for Korean Patent Application No. 10-2014-7009829 dated Apr. 3, 2015, 6 pages (including English translation).
First Office Action received for Korean Patent Application No. 10-2014-0128112 dated Jan. 28, 2016, 11 pages (including English translation).
Decision to Grant a Patent received for Korean Patent Application No. 10-2014-0128112 dated Oct. 31, 2016, 2 pages (including English translation).
Third Office Action received for Chinese Patent Application No. 201410505767.X dated Sep. 29, 2017, 8 pages (including English translation).
Communication pursuant to Article 94(3) received for European Patent Application No. 15167772.1 dated May 22, 2018, 7 pages.
Second Office Action received for Chinese Patent Application No. 201510258053.8 dated Jul. 17, 2018, 9 pages (including English translation).
Decision to Grant a Patent received for Korean Patent Application Serial No. 10-2015-0070468 dated Oct. 30, 2017, 2 pages (including English translation).
International Search Report and Written Opinion for International Application No. PCT/US2018/040822 dated Nov. 21, 2018, 20 pages.
European Office Action received for EP Application No. 17174612.6 dated Jun. 11, 2019, 5 pages.
European Office Action received for EP Application No. 15167772.1 dated Apr. 11, 2019, 8 pages.
Indian Office Action received for IN Application No. 1375/DEL/2015 dated Sep. 12, 2018, 6 pages.
European Office Action received for EP Application No. 187745779.1 dated Feb. 18, 2020, 3 pages.
Office Action received for U.S. Appl. No. 15/644,534 dated Jan. 31, 2019, 25 pages.
Notice of Allowance received for U.S. Appl. No. 15/644,534 dated May 8, 2019, 25 pages.
Notice of Allowance received for U.S. Appl. No. 15/644,534 dated Jul. 8, 2019, 8 pages.
European Office Action received for European Application No. 15167772.1 dated Sep. 22, 2020, 5 pages.
Non-Final Office Action received for U.S. Appl. No. 15/940,810 dated Jun. 2, 2020, 30 pages.
Notification to Grant Patent Rights for Invention received for Chinese Patent Application No. 201280045067.6 dated Feb. 22, 2016, 4 pages (including English translation).
Intention to Grant received for European Patent Application No. 12832613.9 dated Dec. 22, 2016, 92 pages.
Decision to Grant received for European Patent application No. 12832613.9 dated May 11, 2017, 2 pages.
Intention to Grant received for European Patent Application No. 14182956.4 dated May 25, 2018, 72 pages.
Communication pursuant to Article 94(3) EPC received for European Patent Application No. 18745779.1 dated Jan. 22, 2021, 5 pages.
Extended European Search Report received for E.P Patent Application Serial No. 20193687.9 dated Jan. 26, 2021, 12 pages.
Notice of Allowance received for U.S. Appl. No. 15/940,810 dated Sep. 30, 2020, 19 pages.
Communication pursuant to Article 94(3) EPC received for European Patent Application No. 17156131.9 dated Nov. 2, 2018, 7 pages.
U.S. Appl. No. 15/940,810, filed Mar. 29, 2018.
U.S. Appl. No. 15/865,189, filed Jan. 8, 2018.
U.S. Appl. No. 14/678,774, filed Apr. 3, 2015.
U.S. Appl. No. 14/472,143, filed Aug. 28, 2014.
U.S. Appl. No. 14/041,810, filed Sep. 30, 2013.
U.S. Appl. No. 13/235,296, filed Sep. 16, 2011.
Notice of Intent to Grant for European Patent Application No. 18745779.1, dated Feb. 17, 2022, 86 pages.
Notice of Intent to Grant for European Patent Application No. 20193687.9, dated Feb. 23, 2022, 85 pages.
Office Action received for Chinese Patent Application Serial No. 201880058031.9 dated Feb. 28, 2023, 24 pages (Including English Translation).
Decision to Grant received for European Patent application No. 18745779.1 dated Jun. 30, 2022, 3 pages.
Decision to Grant received for European Patent application No. 20193687.9 dated Jun. 30, 2022, 3 pages.
Extended European search report received for European Patent Application No. 22212811.8 dated Mar. 9, 2023, 8 pages.
Extended European search report received for European Patent Application No. 22212809.2 dated Mar. 9, 2023, 10 pages.
Communication under Rules 71(3) EPC received for EP Patent Application U.S. Appl. No. 15167772.1 dated May 4, 2023, 45 pages.
Decision to Grant a Patent received for European Patent Application Serial No. 15167772.1 dated Aug. 10, 2023, 3 pages.
Decision to Grant a Patent received for Chinese Patent Application Serial No. 201880058031.9 dated Jul. 21, 2023, 4 pages (Original Copy Only).
Second Office Action received for Chinese Patent Application Serial No. 201880027814.0 dated Jul. 21, 2023, 5 pages.

DRIVE AND SENSE BALANCED, SEMI-COUPLED 3-AXIS GYROSCOPE

PRIORITY CLAIM

This application is a divisional application and claims priority to U.S. patent application Ser. No. 15/940,810, filed on Mar. 29, 2018, entitled "DRIVE AND SENSE BALANCED, SEMI-COUPLED 3-AXIS GYROSCOPE," which application is a continuation-in-part of and claims priority to U.S. patent application Ser. No. 15/865,189, filed on Jan. 8, 2018, entitled "MEMS SENSOR WITH DECOUPLED DRIVE SYSTEM," which application is a continuation application of and claims priority to U.S. patent application Ser. No. 14/678,774, filed on Apr. 3, 2015, entitled "MEMS SENSOR WITH DECOUPLED DRIVE SYSTEM," which application claims benefit under 35 U.S.C. 119(e) of U.S. Provisional Patent Application No. 62/001,474, filed on May 21, 2014, entitled "MEMS SENSOR WITH DECOUPLED DRIVE SYSTEM", and is a continuation-in-part of U.S. patent application Ser. No. 14/041,810, filed Sep. 30, 2013, (IVS-212/5290P) entitled "MICROMACHINED GYROSCOPE INCLUDING A GUIDED MASS SYSTEM," which is a continuation-in-part of U.S. patent application Ser. No. 14/472,143, filed Aug. 28, 2014, (IVS-147C/5007C) entitled "MICROMACHINED GYROSCOPE INCLUDING A GUIDED MASS SYSTEM," and which is a continuation application and claims priority to U.S. application Ser. No. 13/235,296, filed Sep. 16, 2011, (IVS-147/5007P) entitled "MICROMACHINED GYROSCOPE INCLUDING A GUIDED MASS SYSTEM," and this application is a non-provisional application of and claims benefit under 35 U.S.C. 119(e) to U.S. Provisional Patent Application No. 62/529,401, filed on Jul. 6, 2017, entitled "DRIVE AND SENSE BALANCED, SEMI-COUPLED 3-AXIS GYROSCOPE", all of which are incorporated herein by reference in their entireties.

TECHNICAL FIELD

The present invention relates generally to angular velocity sensors and more particularly relates to angular velocity sensors that include guided mass systems.

BACKGROUND

Sensing of angular velocity is frequently performed using vibratory rate gyroscopes. Vibratory rate gyroscopes broadly function by driving the sensor into a first motion and measuring a second motion of the sensor that is responsive to both the first motion and the angular velocity to be sensed.

Accordingly, what is desired is to provide a system and method that overcomes the above issues. The present invention addresses such a need.

In addition, conventional vibratory rate microelectromechanical systems (MEMS) gyroscopes may not provide adequate solutions that reduce sensitivity to vibration and part-to-part coupling, reduce electrostatic levitation force induced in-phase offset shift, and/or reduce sensitivity to package stress.

The above-described deficiencies are merely intended to provide an overview of some of the problems of conventional implementations, and are not intended to be exhaustive. Other problems with conventional implementations and techniques, and corresponding benefits of the various aspects described herein, may become further apparent upon review of the following description.

SUMMARY

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

An angular rate sensor is disclosed. In a first aspect, the angular rate sensor comprises a substrate and a rotating structure anchored to the substrate. The angular rate sensor also includes a drive mass anchored to the substrate and an element coupling the drive mass and the rotating structure. The angular rate sensor further includes an actuator for driving the drive mass into oscillation along a first axis in plane to the substrate and for driving the rotating structure into rotational oscillation around a second axis normal to the substrate; a first transducer to sense the motion of the rotating structure in response to a Coriolis force in a sense mode; and a second transducer to sense the motion of the sensor during a drive mode.

In a second aspect, the angular rate sensor comprises a substrate and a first shear mass and a second shear mass which are parallel to the substrate and anchored to the substrate via at least a first plurality of flexible elements. The angular rate sensor further includes a drive mass which is parallel to the substrate and anchored to the substrate via at least a second plurality of flexible elements.

In further non-limiting embodiments, a dynamically balanced 3-axis gyroscope architecture is described, which can comprise one or more frame gyroscopes, two or more drive shuttle, coupled to the one or more frame gyroscopes, and/or one or more center proof mass or paddle gyroscopes coupled to the frame gyroscopes.

Various embodiments described herein can facilitate providing linear and angular momentum balanced 3-axis gyroscope architectures for better offset stability, vibration rejection, and lower part-to-part coupling. Further non-limiting embodiments are directed to methods associated with various embodiments described herein.

These and other embodiments are described in more detail below.

BRIEF DESCRIPTION OF THE DRAWINGS

Various non-limiting embodiments are further described with reference to the accompanying drawings, in which.

DETAILED DESCRIPTION

The present invention relates generally to angular velocity sensors and more particularly relates to angular velocity sensors that include guided mass systems. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein. Accordingly, while a brief overview is provided, certain aspects of the subject disclosure are described or depicted herein for the purposes of illustration and not limitation. Thus, variations of the disclosed embodiments as suggested by the disclosed apparatuses, systems, and methodologies are intended to be encompassed within the scope of the subject matter disclosed herein.

Figure 1A:
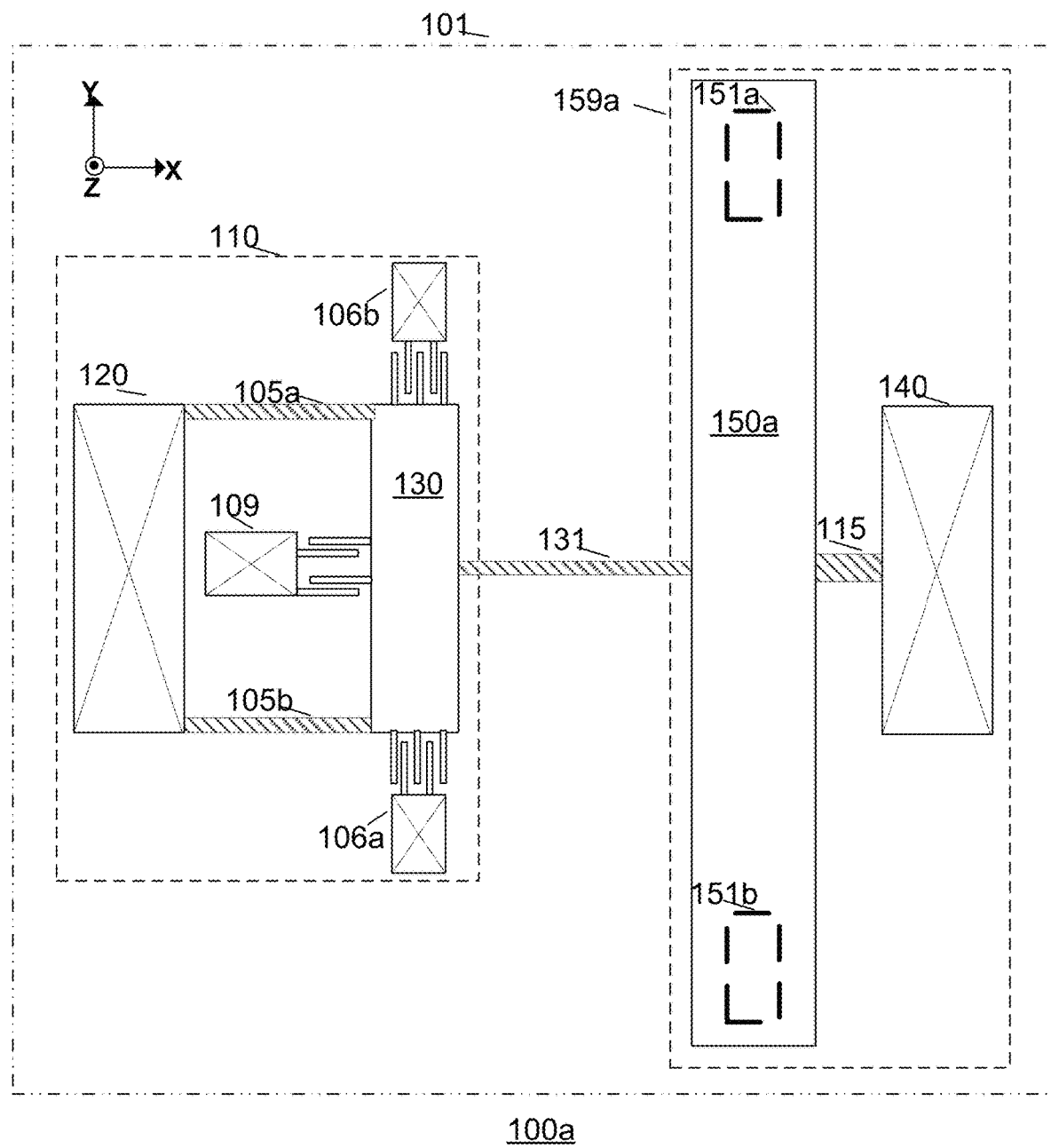
FIG. 1A illustrates a first embodiment of a single axis gyroscope in accordance with the present invention.

FIG. 1A illustrates a first embodiment of a single axis gyroscope 100a in accordance with the present invention. The single axis gyroscope is disposed in an X-Y plane parallel to a substrate 101 and comprises a drive system 110, a sense system 159a and a coupling element 131. The drive system 110 includes a drive mass 130, an electrostatic actuator 109, two drive springs 105a-b, an anchor 120 and two drive-sense electrodes 106a-b. The drive springs 105a-b and the anchor 120 act as a suspension system for the drive mass. The sense system 159a comprises a rotating proof mass 150a, a pivot spring 115, an anchor 140 and two capacitive sense electrodes 151a and 151b. Finally, the drive system 110 and the sense system 159a are coupled by a coupling spring 131. In an embodiment, the suspension system is stiffer than the coupling spring 131 while the drive mass 130 is rotating out of plane.

The drive mass 130 is coupled to the substrate through spring elements 105a-b and the anchor 120. In the drive operation of the single axis gyroscope 100a, electrostatic forces are applied to the drive mass 130 via the electrostatic actuator 109, and the motion of drive mass 130 in Y direction is detected by electrostatic transducers 106a and 106b that are called drive-sense electrodes. The detected drive motion can be transferred to circuitry to be used to control the mechanical amplitude of drive mass 130 in a closed loop operation.

Although electrostatic actuators and transducers will be described throughout this specification, one of ordinary skill in the art recognizes that a variety of actuators could be utilized for this function and that use would be within the spirit and scope of the present invention. For example, the actuators or transducers could be piezoelectric, thermal or electromagnetic or the like.

The drive mass 130 is driven in the Y direction by the electrostatic actuator 109 at a certain frequency, which is referred to as a drive frequency. While drive mass 130 is driven in the Y direction, a moment around the Z-axis and a Y-direction force are applied to the rotating proof mass 150a through the coupling spring 131. If the pivot spring 115 is very stiff in the Y direction, the rotating proof mass 150*a* rotates around an axis that is parallel to the Z-axis due to the applied moment. The described motion of the drive mass 130 and rotating proof mass 150*a* is referred to as a drive motion.

When the gyroscope 100*a* is subject to an angular velocity about a roll-input axis in the Y-direction that is in the plane of the substrate 101 and orthogonal to the X-direction will cause Coriolis forces to act on the rotating proof mass 150*a* in the Z-direction. The Coriolis forces cause the rotating proof mass 150*a* to rotate out-of-plane about the roll-sense axis which is parallel to the X-direction. The amplitude of the rotation of the rotating proof mass 150*a* is proportional to the angular velocity about the roll-input axis and also mechanical drive amplitude of the rotating proof mass 150*a*. The capacitive sense electrodes 151*a* and 151*b*, which are placed on the substrate 101 under the rotating proof mass 150*a*, are used to detect the rotation of the rotating proof mass 150*a* about the roll-sense axis. This rotation provides a measure of the angular velocity about the roll-input axis. Although the capacitive electrodes 151*a* and 151*b* are given as transducers to detect the rotation of the rotating proof mass 150*a* around the roll-sense axis, various types of transducers could be utilized in the present invention. For example, the capacitive electrodes 151*a-b* could be also piezoelectric or optical or the like and its use would be within the spirit and scope of the present invention.

Figure 1B:
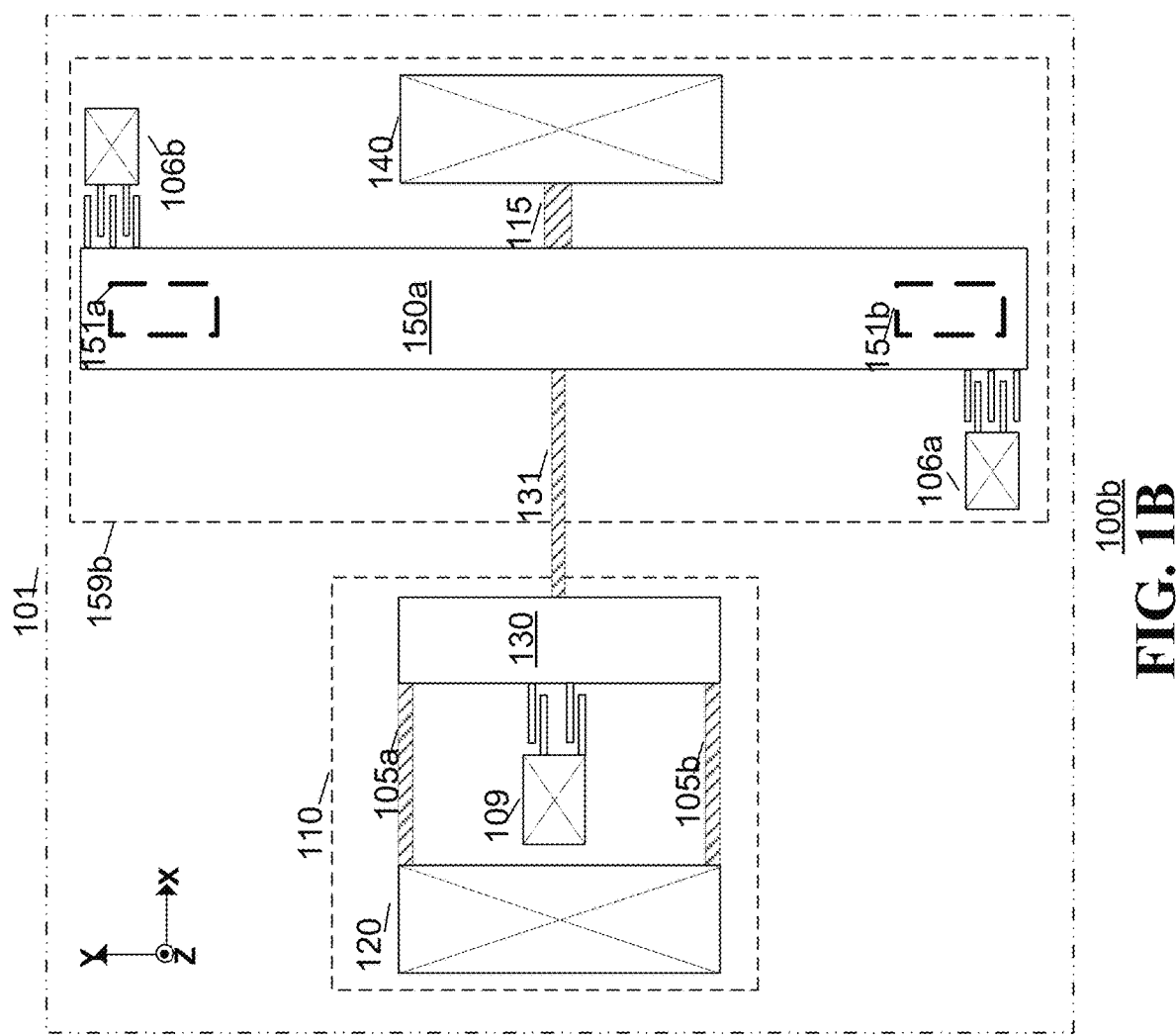
FIG. 1B illustrates a second embodiment of a single axis gyroscope in accordance with the present invention.

As it is given in FIGS. 1A and 1B, the drive mass 130 is separated from the rotating proof mass 150*a* and the electrostatic actuators 109 are attached to the drive mass 130. A benefit of this approach is to eliminate the effect of the non-idealities of the electrostatic actuator 109 on the rotating proof mass 150*a*. The non-idealities of the electrostatic actuator may be due to the fabrication imperfections, like sidewall angle during deep reactive ion etching, or built-in stresses due to the environmental effects.

As an example, the electrostatic forces generated by a non-ideal electrostatic actuator may not be only in-plane but also out-of plane, the out-of plane non-ideal forces could result in unwanted out-of plane motion and rotation of the rotating proof mass 150*a* around its sensitive axis. The unwanted rotation of the rotating proof mass 150*a* around its sensitive axis would lead to erroneous motion which can be detected by the capacitive sense electrodes 151*a-b* resulting in an error in the measurement of angular velocity.

On the other hand, in FIGS. 1A and 1B, drive mass 130 is coupled to the anchor 120 via springs 105*a-b* which are very stiff in Z direction. As a result, the motion of drive mass 130 due to the non-ideal out-of plane electrostatic forces by actuator 109 is minimized. Consequently, the non-ideal forces are not transferred to the proof mass 150*a*, and measurement errors are reduced.

In FIG. 1A, the coupling spring 131, which is used to transfer the linear Y direction motion of the drive mass 130 to the rotation of the proof mass 150*a*, can be made very stiff in Y-direction, but act as a pivot for rotation about z-axis or a torsion spring. Using a flexure as a coupling spring 131 in embodiment 100*a* can be an option to satisfy those compliance conditions.

If the coupling spring 131 is made very stiff in Y-direction, but act as a pivot for rotation about z-axis, the whole single axis gyroscope 100*a* would act as a single Degree of Freedom (DOF) mechanical system in the drive motion. The Y-direction motion of drive mass 130 is converted to in-plane rotation of the proof mass 150*a* around an axis parallel to the Z direction. The amount of rotation of proof mass 150 depends on the ratio of the length of the coupling spring to the radius of rotation of the proof mass 150*a* with respect to the center of its rotation. The Y-direction motion is either amplified or attenuated depending on the ratio. Moreover, the drive-sense electrodes 106*a-b* can be placed on the drive mass 130 without effecting the closed loop drive operation.

FIG. 1B illustrates a second embodiment of a single axis gyroscope in accordance with the present invention. In the embodiment shown in FIG. 1B, the coupling spring 131 is compliant in the Y-direction and can be designed so that single axis gyroscope 100*b* acts as a two DOF system in the drive motion. In that configuration, the sense system 159*b* can be designed as a vibration absorber of the drive mass 130. As a result, small motion on drive mass 130 can be amplified to get bigger motion on the sense mass 150*a*. For a vibration absorber configuration, it is necessary that drive-sense electrodes 106*a-b* to be connected to the rotating proof-mass 150*a* as it is shown in FIG. 1B. The connection is necessary to allow the rotational motion of rotating proof mass 150*a* at a certain mechanical amplitude around the Z axis (the main component of the drive motion) to maximize the sensitivity of the gyroscope 100*b*.

The small motion on the drive mass 130 is beneficial for area optimization. If the drive mass 130 has small drive motion, the electrostatic actuator gaps could be kept small, which will result in area savings. Moreover, the small drive motion is beneficial to minimize the spring softening, squeeze film damping and the non-linearity effects.

Figure 1C:
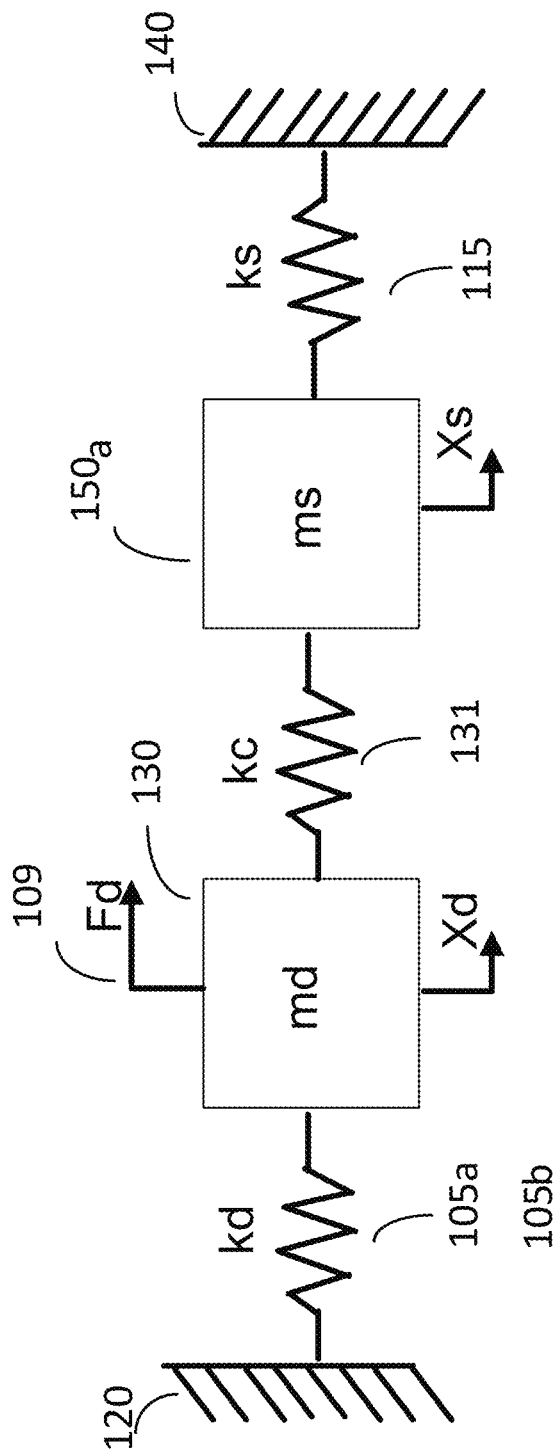
FIG. 1C is a simple block diagram of the gyroscope of FIG. 1B.
Figure 1D:
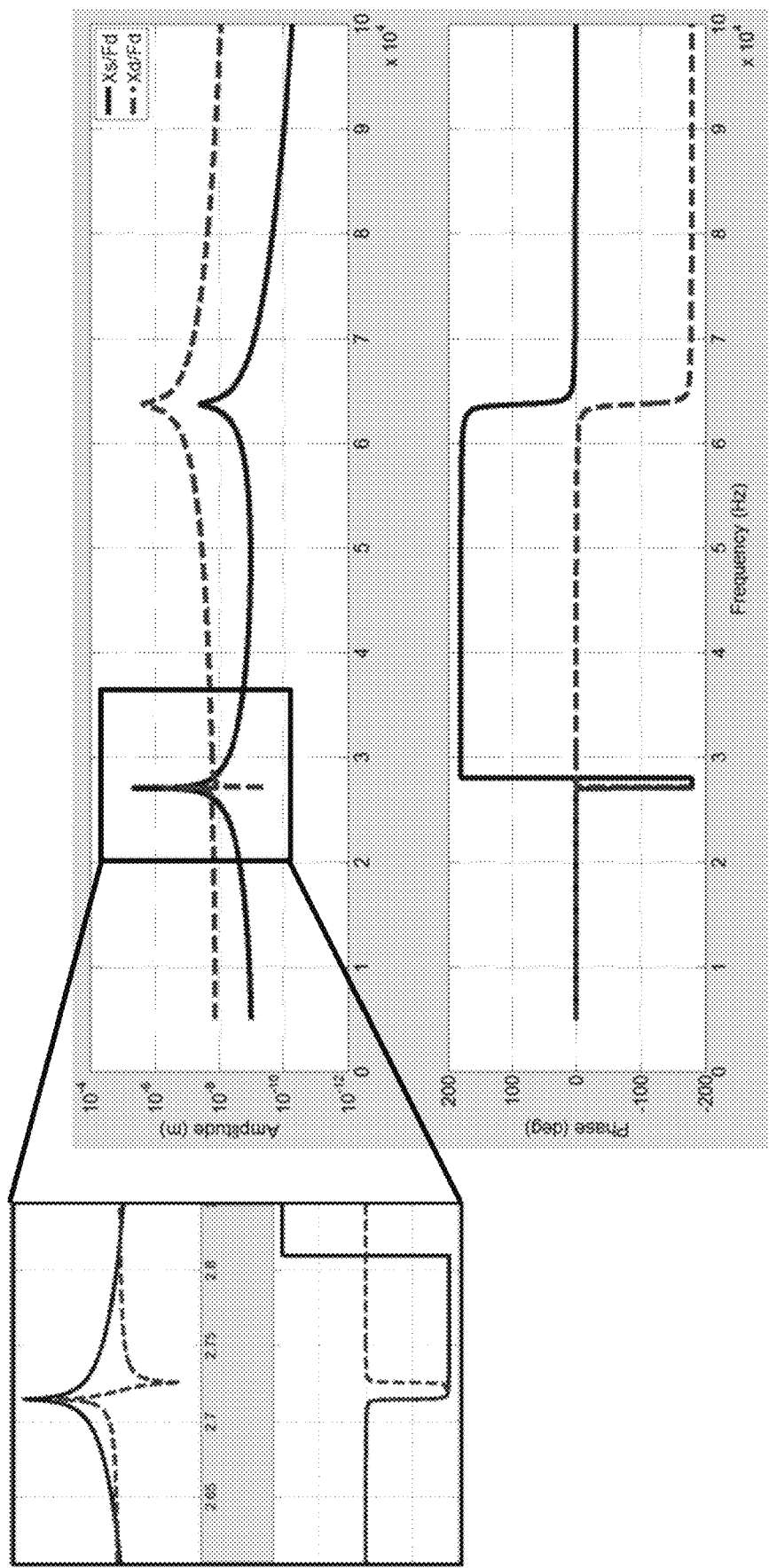
FIG. 1D illustrates bode plots of the transfer functions Xdf/Fd and Xs/Fd of the gyroscope of FIG. 1B.

To explain the operation of the gyroscope 100*b* in more detail refer now to FIGS. 1C and 1D. FIG. 1C is a simple block diagram of the gyroscope 100*b*, the reference numerals which conform to those of FIG. 1B. It is desirable in the gyroscope 100*b* that the drive mass 130 moves less than the sense mass 150*a*. The minimization of motion of 130 is accomplished by tuning the coupling spring kc (131) such that it is at least an order of magnitude more flexible than the springs kd (105*a*/105*b*) and ks (115).

To explain the tuning of kc spring in more detail, bode plots of the transfer functions Xd/Fd and Xs/Fd are shown in FIG. 1D where Xd is the movement of the drive mass 130 in a first direction, Xs is the movement the sense mass 150*a* in a second direction and Fd is the force caused by the actuator 109 on the drive mass 130. In FIG. 1D, the top plot shows the amplitude vs. frequency information and the bottom plot shows phase vs. frequency.

Xd/Fd transfer function has two peaks, and one zero. A first peak represents a motion of the drive mass (md) in the common mode shape, and the second peak represents a motion of the drive mass (md) in differential mode shape. In an embodiment, the flexibility of the coupling spring kc is such that the transfer function Xs/Fd is greater than Xd/Fd at a specific frequency range of interest. As an example in FIG. 1D, an expansion of a specific region has been shown. Based on the 2-DOF mechanical system dynamics, if the kc spring is sufficiently compliant compared to the ks and kd, the separation between first peak and zero is minimized in Xd/Fd transfer function. So, the amplitude of the first peak is attenuated. On the other hand Xs/Fd transfer function is not affected by the zero due to the 2-DOF system characteristics and its amplitude remains constant in the frequency range of interest. As a result, by placing the zero close to the first peak in Xd/Fd, the amplitude difference between drive mass and sense mass is obtained.

Figure 2:
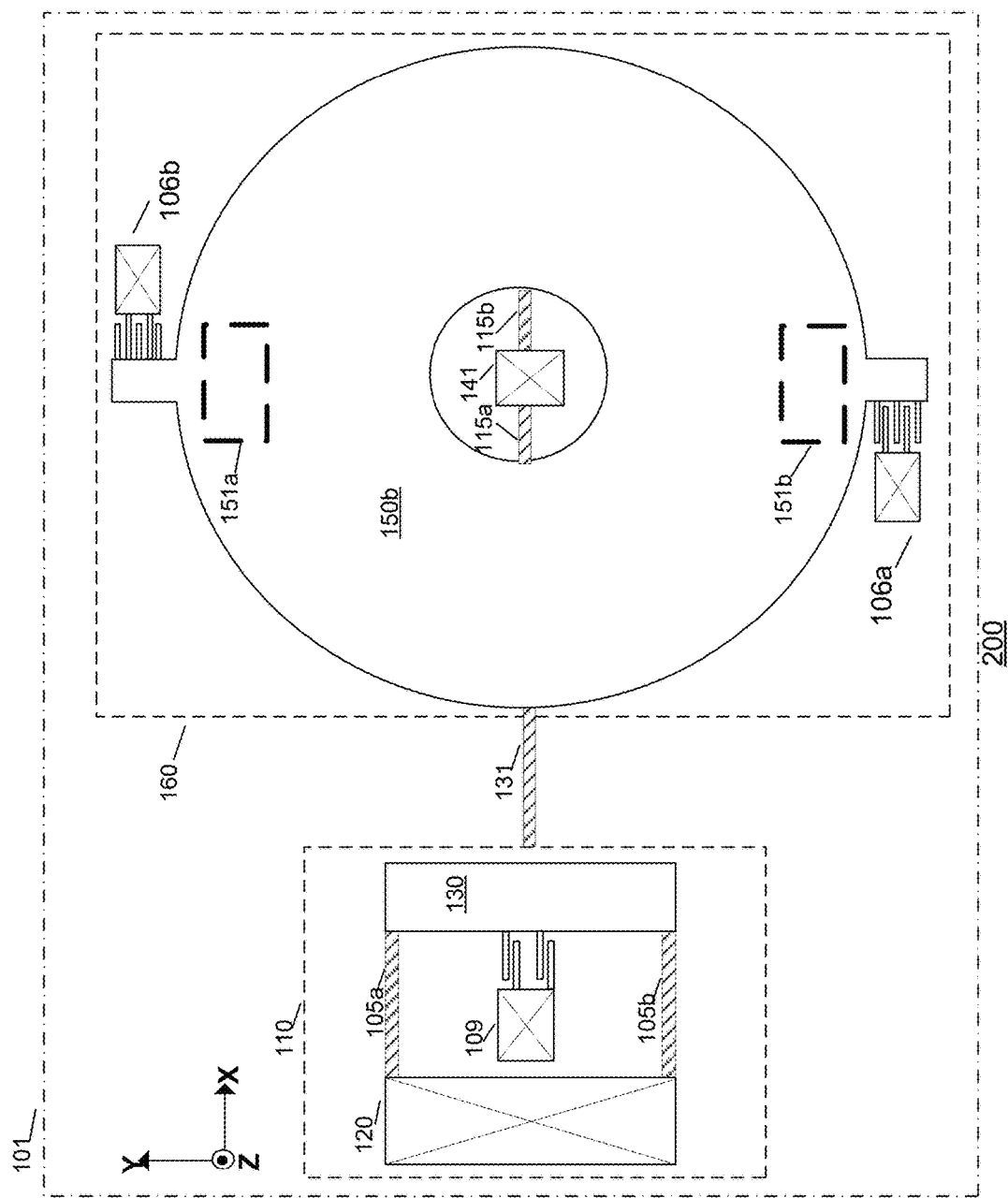
FIG. 2 illustrates a third embodiment of a single axis gyroscope in accordance with the present invention.

FIG. 2 illustrates a third embodiment of a single axis gyroscope 200 in accordance with the present invention. In this embodiment, the sense system 160 has some differences compared to the sense system 159*a* which is shown in FIG. 1A. The sense system 160 comprises a circular proof mass 150b, instead of a rectangular proof mass 150a given in FIG. 1A. Moreover, the proof mass 150b is coupled to the substrate via two pivot springs 115a and 115b and the anchor 141. The drive system 110 is similar to the embodiment given in FIG. 1A. Similar to the single axis gyroscopes shown in FIGS. 1A and 1B, the single axis gyroscope 200 is driven via electrostatic actuator 109 attached to the drive mass 130.

When the drive mass 130 is driven in Y direction, the proof mass 150b rotates around Z axis. The amplitude of the drive motion of the proof mass 150b depends on the drive mass 130 motion and the coupling spring 131 stiffness as it was explained previously. The amplitude of drive motion of the proof mass 150b is detected by the drive sense electrodes 106a and 106b.

An angular velocity about a roll-input axis in the Y-direction that is in the plane of the substrate 101 and orthogonal to the X-direction will cause Coriolis forces to act on the proof mass 150b in the Z-direction. The Coriolis forces cause the proof mass 150b to rotate out-of-plane about the roll-sense axis which is parallel to the X-direction. The amplitude of the rotation of the proof mass 150b is proportional to the angular velocity about the roll-input axis. The capacitive sense electrodes 151a and 151b, which are placed on the substrate 101 under the proof mass 150b, are used to detect the rotation of the proof mass 150b about the roll-sense axis. This rotation provides a measure of the angular velocity about the roll-input axis.

Figure 3:
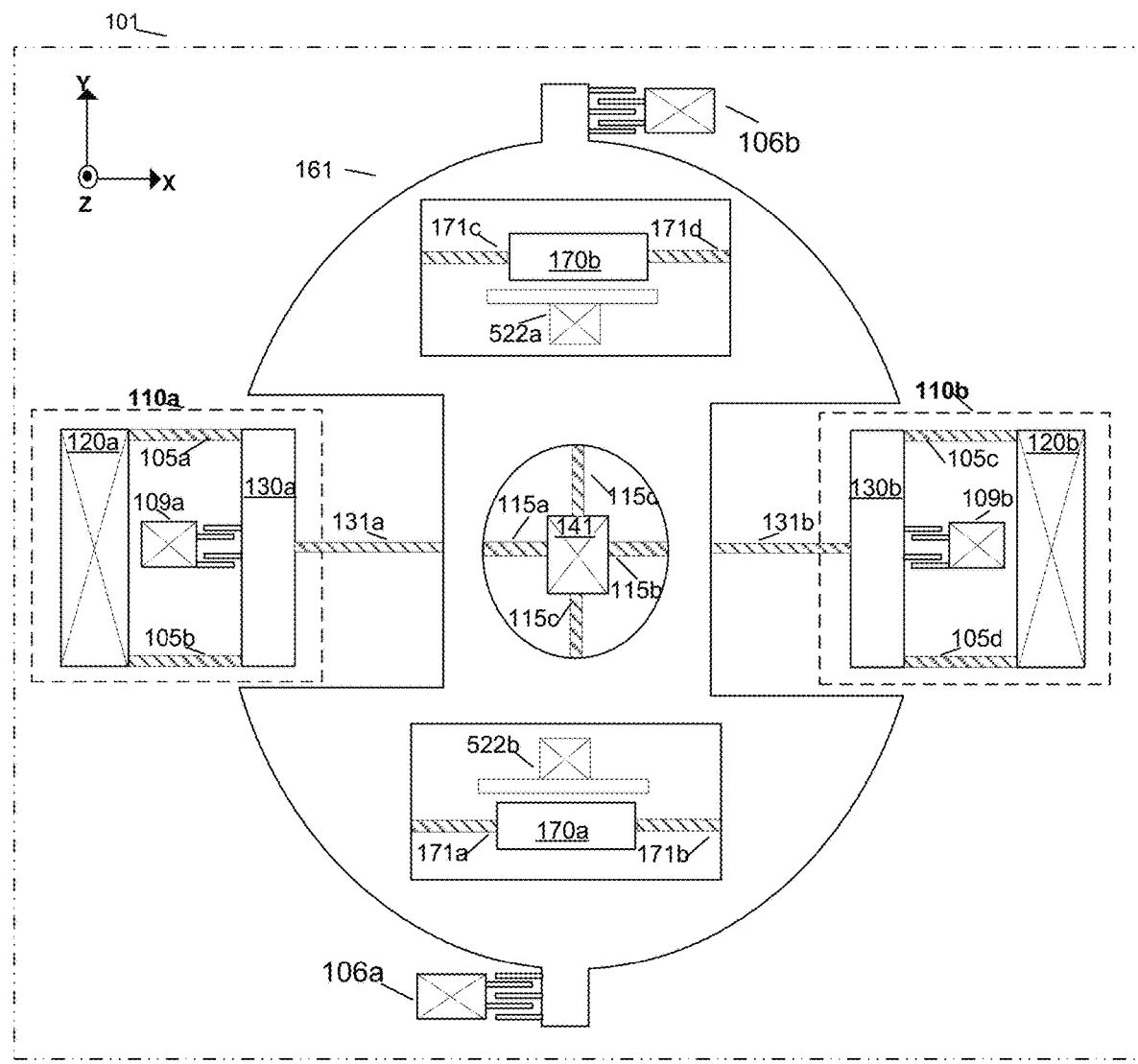
FIG. 3 illustrates a fourth embodiment of a single-axis gyroscope configuration in accordance with the present invention.

FIG. 3 illustrates a fourth embodiment of a single-axis gyroscope 300 configuration in accordance with the present invention. The gyroscope configuration 300 includes two drive systems 110a and 110b, two coupling springs 131a and 131b, a rotating structure 161 and two yaw proof mass systems 180a and 180b. Drive systems 110a and 110b are similar to the drive system 110 given in FIG. 1A, FIG. 1B and FIG. 2. Drive systems 110a-b both include anchors 120a-b, drive springs 105a-d, drive masses 130a-b, drive-sense combs 106a and 106b and electrostatic actuators 109a-b. Yaw proof mass systems 180a-b both include a yaw proof mass 170a-b, yaw sense springs 171a-d and the electrostatic transducers 522a-b.

Rotating structure 161 is coupled to the anchor 141 via springs 115a-d. Rotating structure 161 is connected to the drive systems 110a-b via coupling springs 131a-b and finally rotating structure supports the yaw proof mass systems 180a-b via springs 171a-d. In the drive motion of the single-axis gyroscope 300, electrostatic actuators 109a-b drives the proof masses 130a and 130b anti-phase in Y direction. Anti-phase motion of drive masses 130a-b result in rotation of rotating structure 161 around Z-axis which is detected by the drive-sense combs 106a and 106b. As a result of the Z axis rotation of rotating structure 161, yaw proof masses 170a-b translate anti-phase in the X direction since they are attached to rotating structure 161 through springs 171a-d. Springs 171a-d are very stiff in the X direction so that they don't deflect during the drive motion.

While the yaw proof masses are driven in X direction, an angular velocity about a yaw input axis in the Z direction that is normal to the substrate 101 will cause Coriolis forces to act on yaw proof masses 170a-b in the Y-direction. The Coriolis forces cause the proof masses 170a-b to translate anti-phase in Y direction. The amplitude of the rotation of the proof masses is proportional to the angular velocity about the yaw-input axis. The capacitive in-plane sense electrodes 522a and 522b, which are attached to the substrate 101 via anchors, are used to detect the Y direction translation of the proof masses 170a-b. This translation provides a measure of the angular velocity about the yaw-input axis.

In FIG. 3, springs 115a-d are configured such a way that the out of plane rotation and translation of rotating structure 161 is minimized. As a result, single-axis gyroscope 300 is not responsive to Coriolis forces around pitch and roll-input axes. However, for different embodiments, the spring configuration can be adjusted to detect the Coriolis response due to pitch and roll axes inputs.

The drive systems 110a and 110b are decoupled from the yaw proof masses 170a and 170b by using a similar approach given in FIG. 1A. Consequently, the benefits of decoupling the drive system from the sensing proof mass mentioned in the explanation of FIGS. 1A and 1B will apply equally to the single-axis gyroscope 300.

Figure 4:
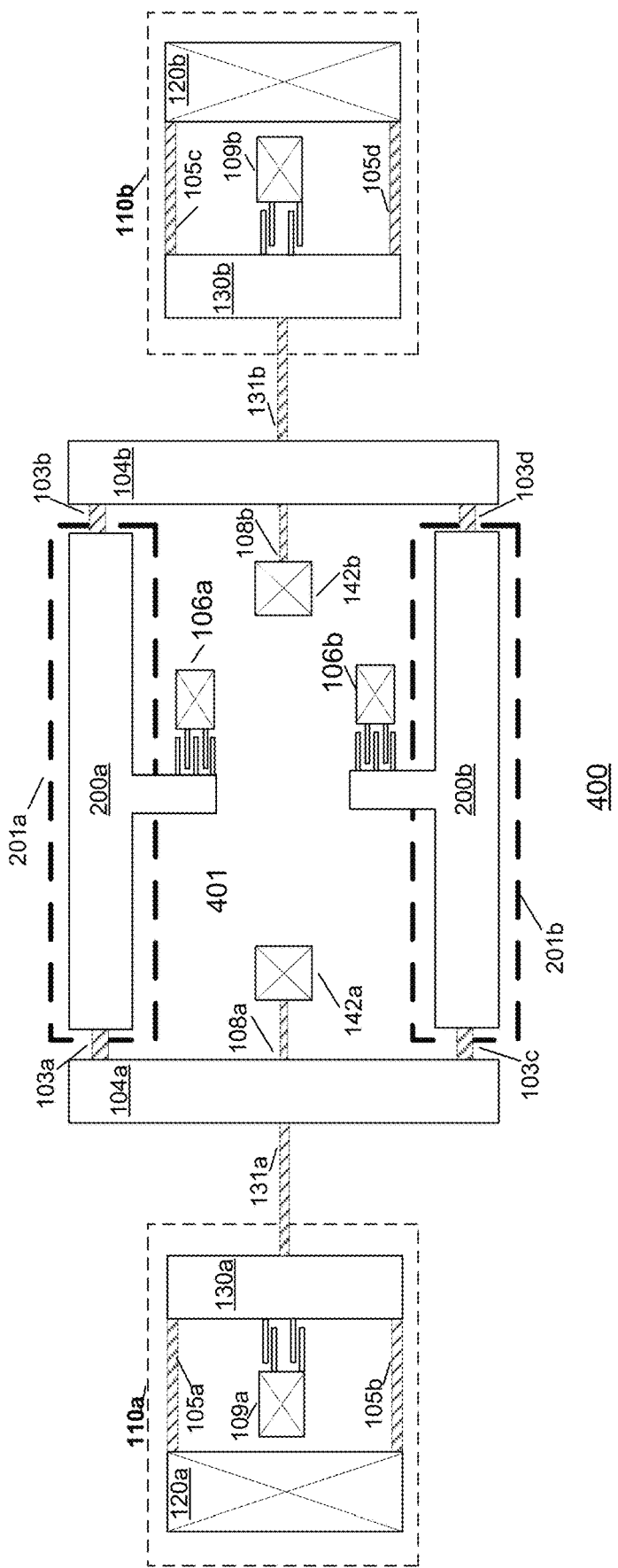
FIG. 4 illustrates a fifth embodiment of a single axis gyroscope in accordance with the present invention.

FIG. 4 illustrates a fifth embodiment of a single axis gyroscope 400 in accordance with the present invention. In the gyroscope 400, a guided mass system 401 is disposed in an X-Y plane parallel to a substrate 101. The guided mass system 401 includes guiding arms 104a and 104b that are flexibly coupled via springs 108a and 108b to the substrate 101 via the anchoring points 142a and 142b, respectively. The two guiding arms 104a and 104b are flexibly coupled to the roll proof-masses 200a-b via springs 103a-d.

The roll proof-masses 200a-b, guiding arms 104a and 104b, anchoring points 142a-b, and springs 103a-d, 108a-b form a planar four-bar linkage. Each spring 103a-d and 108a-b is compliant in-plane about an axis in the Z-direction so that each guiding arm 104a and 104b can rotate in-plane while the proof-masses 200a-b translates anti-phase in an X-direction.

The springs 108a and 108b are compliant about a first roll-sense axis in the X-direction so that the guiding arms 104a and 104b can rotate out-of-plane. The springs 103a-d are stiff in the Z-direction, whereby out-of-plane rotation of the guiding arms 104a and 104b causes the roll proof-masses 200a-b to move anti-phase out-of-plane.

Drive systems 110a and 110b are similar to the drive system 110 described with respect to FIG. 3. Drive systems 110a-b both include anchors 120a-b, drive springs 105a-d, drive masses 130a-b, drive-sense combs 106a and 106b and electrostatic actuators 109a-b and they are coupled to guiding arms 104a and 104b via coupling springs 131a and 131b.

The guided mass system 401 can be driven at a drive frequency by a single drive circuit coupled to the actuators 109a and 109b. The drive frequency can be a resonant frequency of the single-axis gyroscope 400. When the drive masses 130a-b are driven anti-phase in the Y direction with the electrostatic force applied by the actuators 109a-b, the guiding arms 104a and 104b rotate in-plane and the roll proof-masses 200a-b translates in-plane anti-phase in the X-direction which is detected by the drive-sense combs 106a and 106b.

Angular velocity about a roll-input axis in the Y-direction that is in the plane of the substrate and orthogonal to the X-direction will cause Coriolis forces to act on the roll proof-masses 200a-b in the Z-direction. The Coriolis forces cause the guided mass system 401 to rotate out-of-plane about the first roll-sense axis which is parallel to the X-direction. When the guided mass system 401 rotates out-of-plane, the guiding arms 104a and 104b and the roll proof-masses 200a-b rotate out-of-plane about the first roll-sense axis.

The amplitude of the rotation of the guided mass system 401 is proportional to the angular velocity about the roll-input axis. Transducers 201a-b under the roll proof-masses 200a-b are used to detect the rotation of the guided mass system 401 about the roll-sense axis. This rotation provides a measure of the angular velocity about the roll-input axis.

Figure 5:
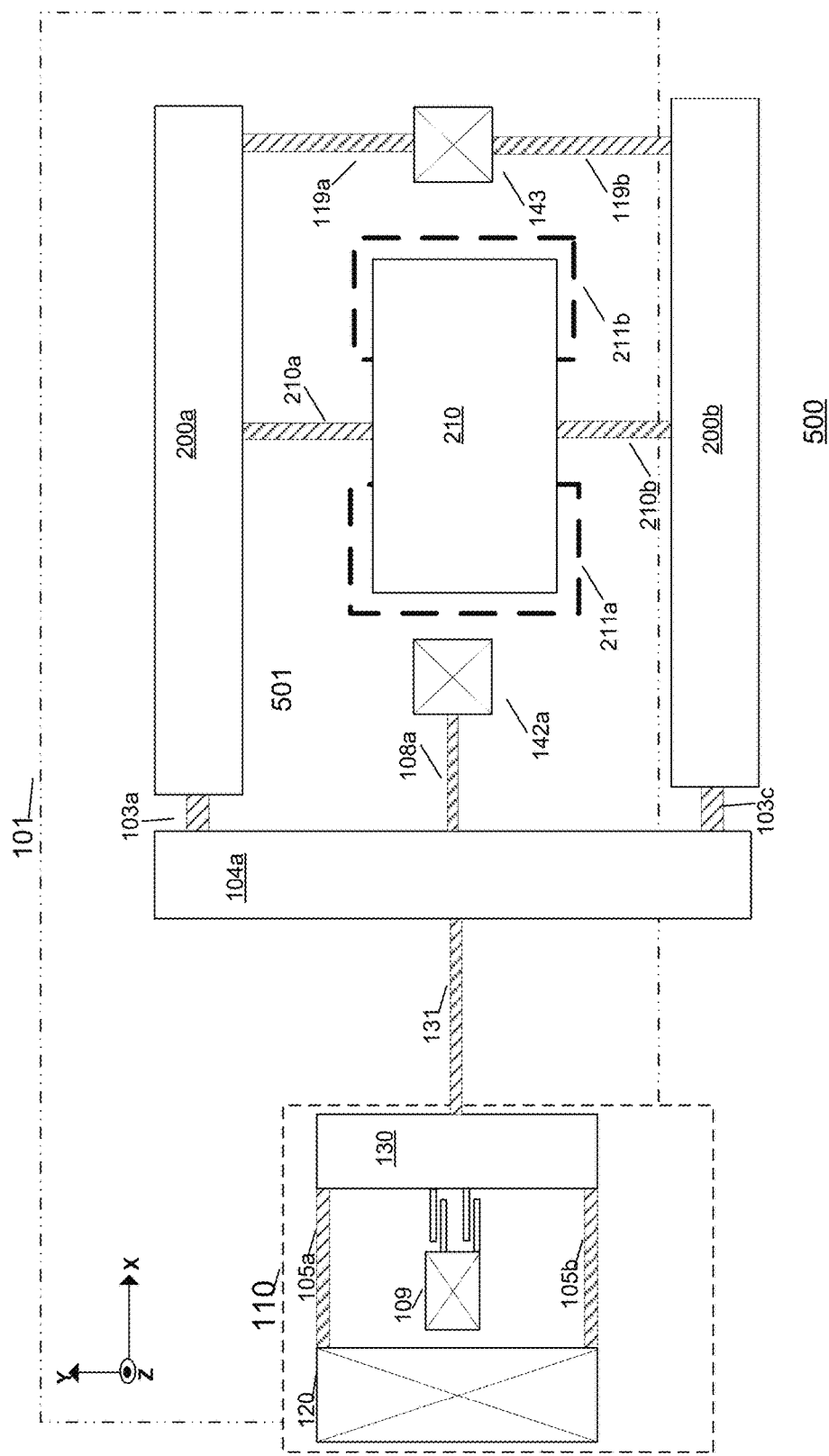
FIG. 5 illustrates a sixth embodiment of a single axis gyroscope in accordance with the present invention.

FIG. 5 illustrates a sixth embodiment of a single axis gyroscope 500 in accordance with the present invention In the gyroscope 500, a guided mass system 501 comprises guided proof masses 200a-b, guiding arm 104a, and pitch proof mass 210. Single axis gyroscope further comprises drive system 110, which is similar to the drive system given in FIG. 1A. Drive system 110 is coupled to the guided mass system 501 via coupling spring 131. Guiding arm 104a is connected to substrate 101 via spring 108a through anchor 142a. Guided proof masses 200a and 200b are coupled to guiding arm 104a via springs 103a and 103c, respectively. Furthermore, guided proof masses 200a-b are coupled to the substrate via springs 119a-b through anchor 143.

The pitch proof-mass 210 is flexibly connected to two guided proof-masses 200a and 200b via springs 210a and 210b, respectively. Springs 210a and 210b are torsionally compliant such that pitch proof-mass 210 can rotate out-of-plane about a pitch sense axis in the Y-direction. During the drive motion of single axis gyroscope 500, drive mass 130 is driven in Y direction by actuator 109. The Y direction motion is transferred to the guided mass system through coupling spring 131 and results in rotation of guiding arm 104a about an axis that is parallel to the Z direction. The in-plane rotation of guided arm 104a causes anti-phase translation of guided proof masses 200a-b in the X direction. Springs 210a and 210b are compliant in-plane such that when the guided proof-masses 200a and 200b are driven anti-phase in the X-direction; the pitch proof-mass 210 rotate in-plane about an axis in the Z-direction.

Angular velocity about the pitch-input axis will cause Coriolis forces to act on the pitch proof-mass 210 resulting in a torque that rotates the pitch proof-mass 210 about the pitch-sense axis. The amplitude of the rotation of the pitch proof-mass 210 is proportional to the angular velocity about the pitch-input axis. Transducers 211a and 211b are disposed on opposite sides along the X-direction under the pitch proof-mass 210 and detect the rotation of the pitch proof-mass about the pitch-sense axis. This rotation provides a measure of the angular velocity about the pitch-input axis.

Figure 6:
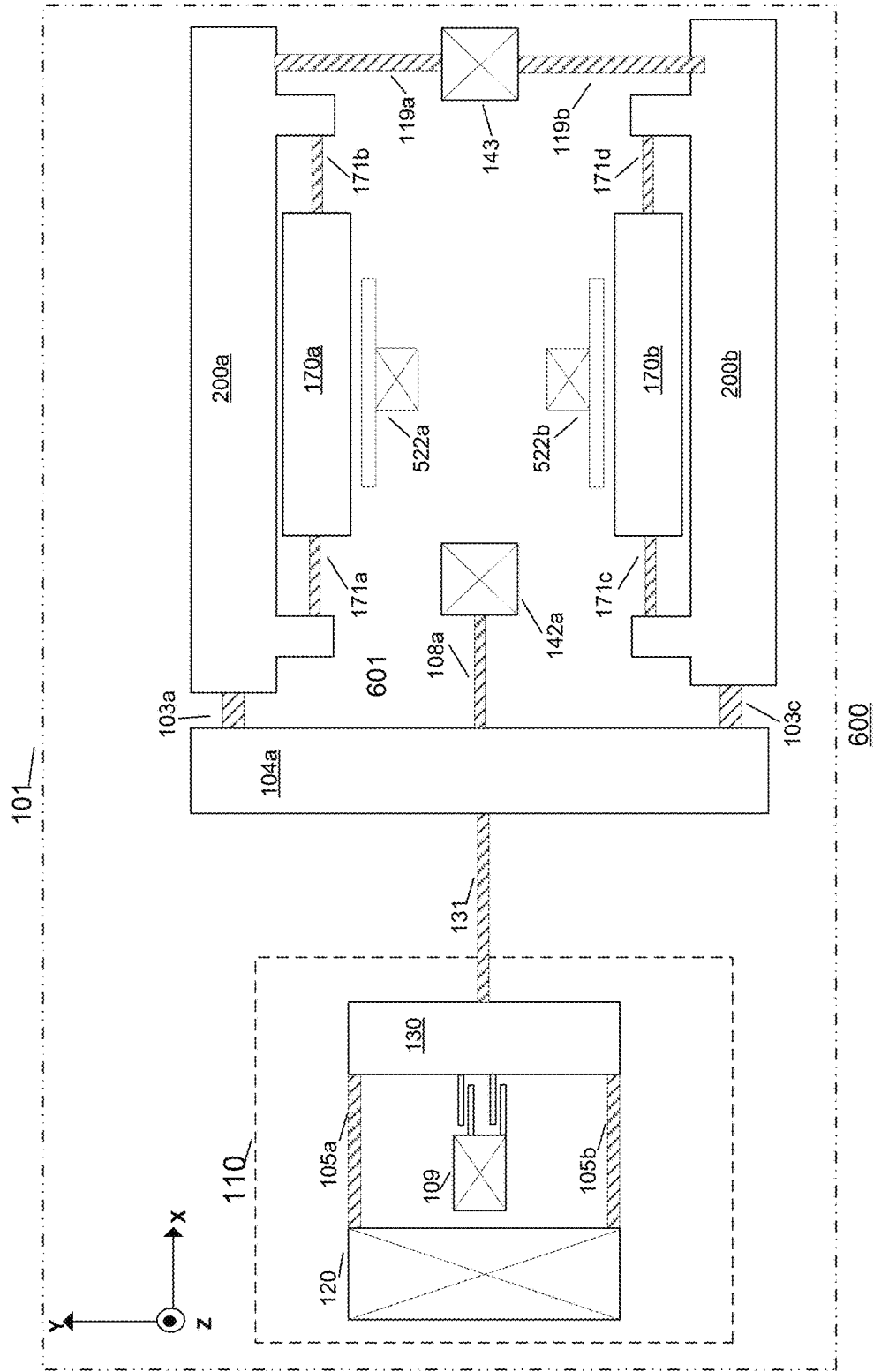
FIG. 6 illustrates a seventh embodiment of a single axis gyroscope in accordance with the present invention.

FIG. 6 illustrates a seventh embodiment of a single axis gyroscope 600 in accordance with the present invention. Single axis gyroscope 600 includes a guided mass system 601 coupled to two yaw proof masses 170a and 170b and a drive system 110.

Drive system 110 is coupled to the guided mass system 601 via coupling spring 131. Guiding arm 104a is connected to substrate 101 via spring 108a through anchor 142a. Guided proof masses 200a and 200b are coupled to guiding arm 104a via springs 103a and 103c, respectively. Furthermore, guided proof masses 200a-b are coupled to the substrate via springs 119a-b through anchor 143.

The yaw proof-masses 170a and 170b are flexibly connected to guided proof masses 200a and 200b via springs 171a-b and 171c-d respectively. Springs 171a-d are compliant in Y direction such that yaw proof-masses 170a and 170b can translate along an axis parallel to the Y direction. During the drive motion of single axis gyroscope 600, drive mass 130 is driven in Y direction by actuator 109. The Y direction motion is transferred to the guided mass system through coupling spring 131 and results in rotation of guiding arm 104a about an axis that is parallel to the Z direction. The in-plane rotation of guided arm 104a causes anti-phase translation of guided proof masses 200a-b in the X direction. Springs 171a-d are axially stiff in the X-direction such that when the guided proof-masses 200a and 200b are driven anti-phase in the X-direction, the yaw proof-masses 170a and 170b also translate anti-phase in the X-direction.

Angular velocity about the yaw-input axis will cause Coriolis forces to act on the yaw proof-masses 170a and 170b resulting in motion of the yaw proof-masses 170a-b anti-phase along the Y-direction. The amplitude of the motion of the yaw proof masses along the Y-direction is proportional to the angular velocity. Transducers 522a and 522b are used to sense the motion of the respective yaw proof masses 170a and 170b along the Y-direction.

Figure 7:
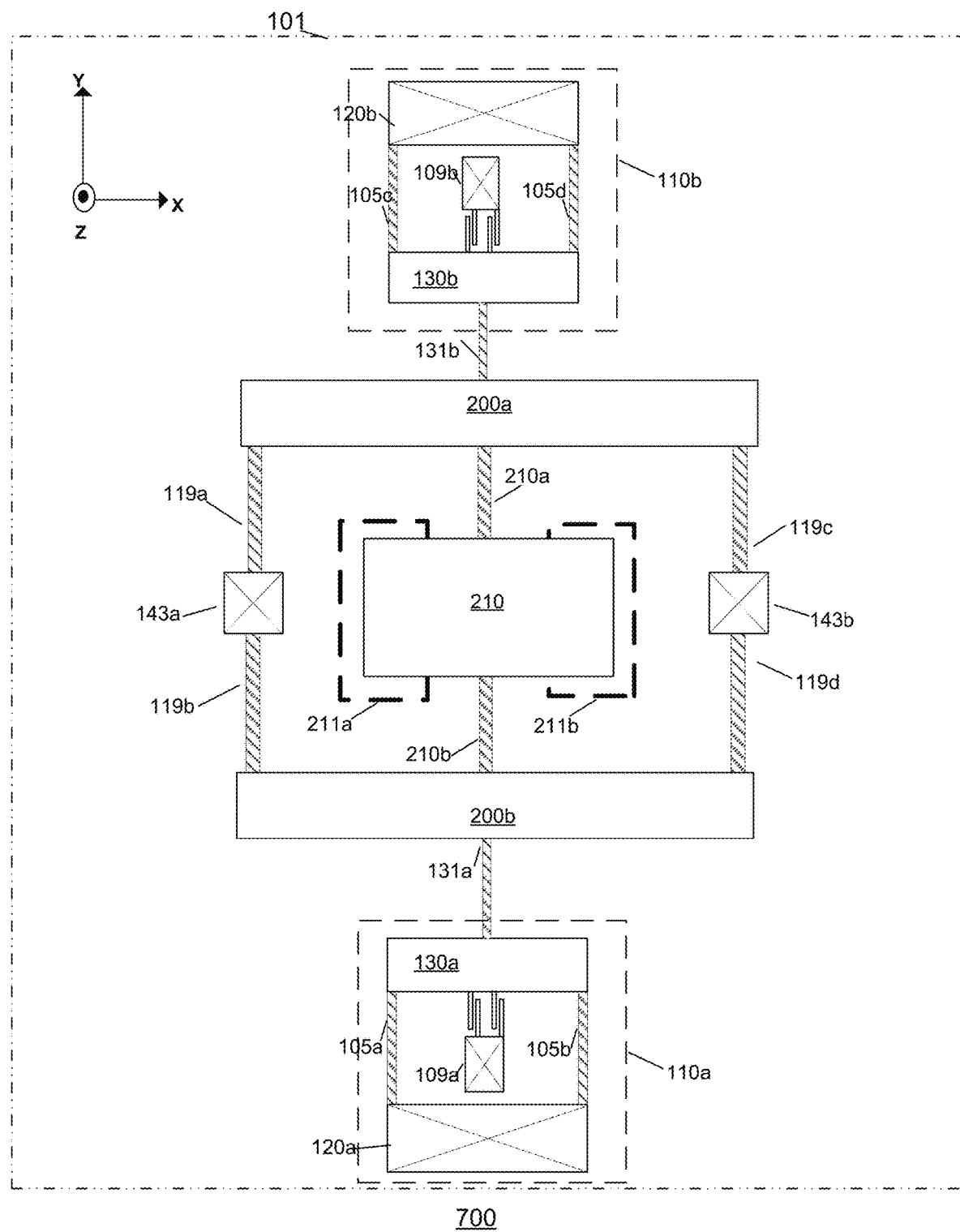
FIG. 7 illustrates a single axis shear mode gyroscope in accordance with the present invention.

FIG. 7 illustrates a single axis shear mode gyroscope 700 in accordance with the present invention. Gyroscope 700 includes shear masses 200a and 200b which are coupled to a substrate 101 via spring elements 119a-b and 119c-d through anchors 143a and 143b. Drive systems 110a-b are connected to the shear proof masses 200a and 200b via coupling springs 131a and 131b, respectively. The pitch proof-mass 210 is flexibly connected to two shear masses 200a and 200b via springs 210a and 210b. Springs 210a and 210b are torsionally compliant such that pitch proof-mass 210 can rotate out-of-plane about a pitch sense axis in the Y-direction.

Each drive system 110a and 110b of FIG. 7 includes a drive mass 130a-b which are coupled to the substrate via drive springs 105a-b and 105c-d through the anchors 120a-b. In the drive motion of single axis shear mode gyroscope 700, the drive masses 130a-b are driven anti-phase in the X direction by the actuators 109a and 109b. X direction motion of the drive masses 130a-b is transferred to the shear masses 200a-b via the coupling springs 131a-b. As a result, the shear masses 200a-b are driven anti-phase in the X-direction. Springs 210a and 210b are compliant in-plane such that when the shear masses 200a and 200b are driven anti-phase in the X-direction; the pitch proof-mass 210 rotate in-plane about an axis in the Z-direction.

Drive motion of the shear masses 200a and 200b is referred to hereinafter as shear mode drive motion. Shear mode drive motion can be generalized by defining a specific motion between the two shear masses 200a and 200b and their coupling relationship. In the shear mode drive motion, the two shear masses 200a and 200b are coupled with a spring or spring-mass system, and the shear masses 200a and 200b translate anti-phase along a direction that is perpendicular to a line that is connecting their geometric center.

Angular velocity about the pitch-input axis will cause Coriolis forces to act on the pitch proof-mass 210 resulting in a torque that rotates the pitch proof-mass 210 about the pitch-sense axis. The amplitude of the rotation of the pitch proof-mass 210 is proportional to the angular velocity about the pitch-input axis. Transducers 211a and 211b are disposed on opposite sides along the X-direction under the pitch proof-mass 210 and detect the rotation of the pitch proof-mass about the pitch-sense axis. This rotation provides a measure of the angular velocity about the pitch-input axis.

Figure 8:
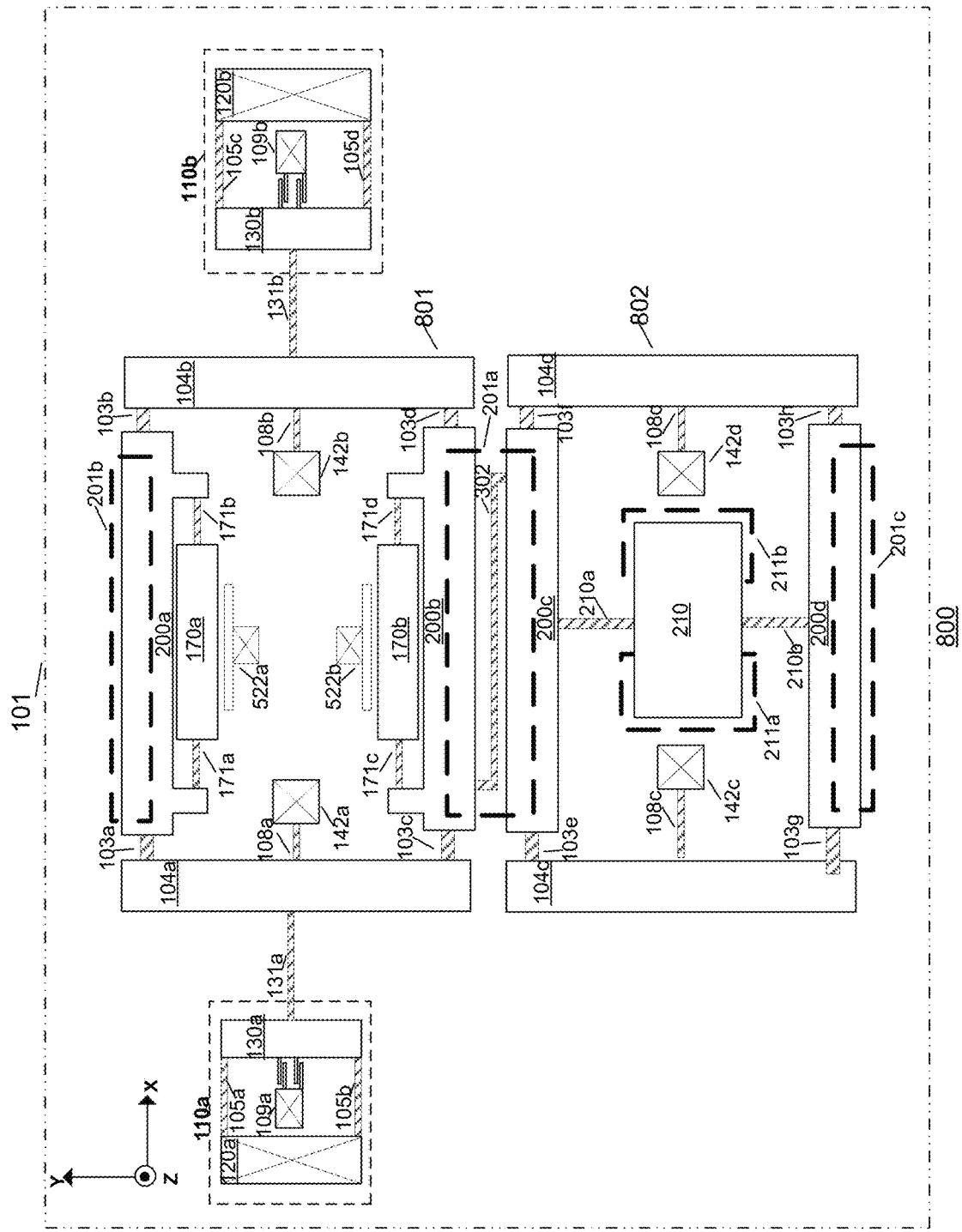
FIG. 8 illustrates a first embodiment of a tri-axis gyroscope in accordance with the present invention.

FIG. 8 illustrates a first embodiment of a tri-axis gyroscope 800 in accordance with the present invention. The gyroscope 800 includes two guided mass systems 801 and 802 coupled together by a coupling spring 302 which connects roll proof-masses 200b and 200c. Guided mass system 801 comprises guided roll proof-masses 200a-b, guiding arms 104a-b, and yaw proof-masses 170a-b. The yaw proof-masses 170a and 170b are flexibly connected to the roll proof-masses 200a and 200b via springs 171a-b and 171c-d respectively. Guided mass system 802 comprises guided roll proof-masses 200c-d, guiding arms 104c-d, and a pitch proof mass 210. The pitch proof-mass 210 is flexibly connected to two guided proof-masses 200a and 200b via springs 210a and 210b, respectively. Springs 210a and 210b are torsionally compliant such that pitch proof-mass 210 can rotate out-of-plane about a pitch sense axis in the Y-direction. Drive systems 110a and 110b are coupled to the guided mass system 801 through guiding arms 104a and 104b via coupling springs 131a and 131b. In different embodiments of tri-axis gyroscope 800, drive systems 110a-b can also be coupled to guided mass system 802.

Tri-axis gyroscope 800 is driven at a drive frequency by a single drive circuit (not shown) coupled to the actuators 109a-b. The drive masses 130a-b are vibrated anti-phase in the Y direction with the electrostatic force applied by the actuators 109a-b. Motion of the drive masses 130a-b transferred to the guiding arms 104a and 104b through the coupling springs 131a and 131b. Guiding arms 104a and 104b rotate in-plane around an axis that is parallel to the Z direction due to the applied torque which is a result of the motion of the drive masses 130a-b. As a result of the in-plane rotation of guiding arms 104a and 104b, the roll proof-masses 200a-b translates in-plane anti-phase in the X-direction. Springs 171a-d are axially stiff in the X-direction such that when the roll proof-masses 200a and 200b are driven anti-phase in the X-direction, the yaw proof-masses 170a and 170b also translate anti-phase in the X-direction.

The coupling spring 302 is stiff in the X-direction such that roll proof-masses 200b and 200c move together in the X-direction. The roll proof-masses 200a and 200d move in opposite direction of roll proof-masses 200b and 200c. Springs 210a and 210b are compliant in-plane such that when the roll proof-masses 200c-d are driven, the pitch proof-mass 210 rotate in-plane about an axis parallel to the Z-direction.

Angular velocity about the pitch-input axis will cause Coriolis forces to act on the pitch proof-mass 210 resulting in a torque that rotates the pitch proof-mass 210 about the pitch-sense axis. The amplitude of the rotation of the pitch proof-mass 210 is proportional to the angular velocity about the pitch-input axis. Transducers 211a and 211b are disposed on opposite sides along the X-direction under the pitch proof-mass 210 and detect the rotation of the pitch proof-mass 210 about the pitch-sense axis. This rotation provides a measure of the angular velocity about the pitch-input axis.

Angular velocity about the roll-input axis causes Coriolis forces to act on the roll proof-masses 200a-d in the positive and negative Z-direction. The coupling spring 302 is torsionally compliant about an axis in the X-direction so that the guided mass systems 801 and 802 can rotate anti-phase out-of-plane about the first and second roll-sense axes. The coupling spring 302 is stiff in the Z-direction which prevents the guided mass systems 801 and 802 from rotating in-phase out-of-plane. Transducers 201a-c under the roll proof masses 200a-d are used to detect the rotations of the guided mass systems 801 and 802 about the first and second roll-sense axes.

Angular velocity about the yaw-input axis will cause Coriolis forces to act on the yaw proof-masses 170a and 170b resulting in motion of the yaw proof-masses 170a and 170b anti-phase along the Y-direction. The amplitude of the motion of the yaw proof-masses along the Y-direction is proportional to the angular velocity. Transducers 522a and 522b are used to sense the motion of the respective yaw proof masses 170a and 170b along the Y-direction.

Figure 9:
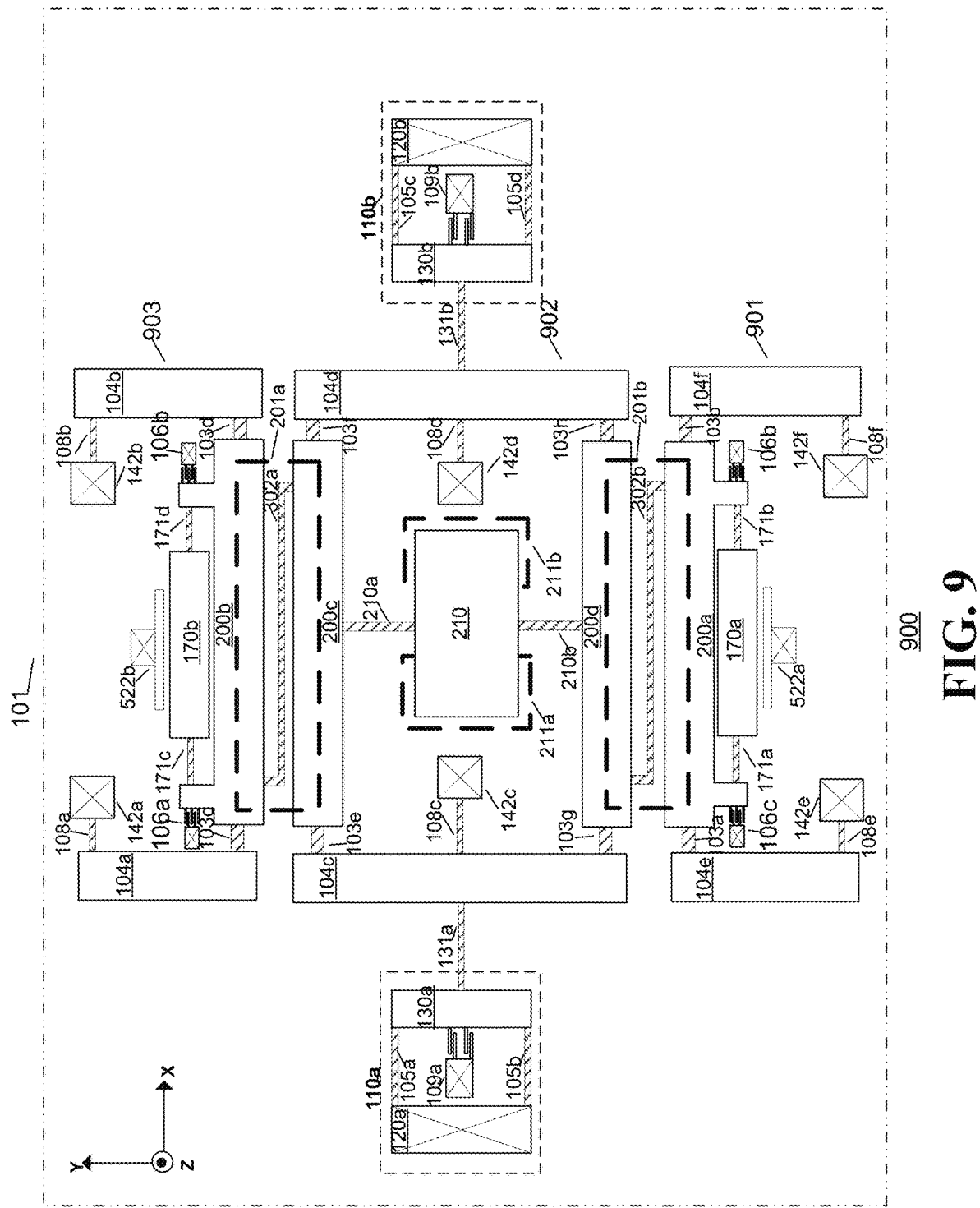
FIG. 9 illustrates a second embodiment of a tri-axis gyroscope in accordance with the present invention.

FIG. 9 illustrates a second embodiment of a tri-axis gyroscope 900 in accordance with the present invention. Tri-axis gyroscope 900 comprises three guided mass systems 901, 902, 903 and two drive mass systems 110a-b. Guided mass systems 901 and 903 are coupled to guided mass system 902 by coupling springs 302a and 302b. And drive mass systems 110a and 110b are coupled to the guided mass system 902 via coupling springs 131a and 131b.

The guided mass systems 901, 902 and 903 are arranged so that the roll proof-masses 200a-d all move in the X-direction, the pitch proof-mass 210 rotates about an axis in the Z-direction, and the yaw proof-masses 170a and 170b move anti-phase in the X-direction. The guided mass system 901 rotates out-of-plane about a first roll-sense axis. The guided mass system 902 rotates out-of-plane about a second roll-sense axis parallel to the first roll-sense axis. The guided mass system 903 rotates out-of-plane about a third roll-sense axis parallel to the first and second roll-sense axes.

The first coupling spring 302a is connected to roll proof-masses 200b and 200c. The coupling spring 302a is stiff in the X-direction such that roll proof-mass 200b and 200c move together in the X-direction. The second coupling spring 302b is connected to roll proof-masses 200a and 200d. The coupling spring 302b is stiff in the X-direction such that roll proof-mass 200a and 200d move together in the X-direction. In this way the guided mass systems 901, 902, and 903 are driven together at a drive frequency by a single drive circuit coupled to the actuators 109a-b. During the drive motion, drive masses 130a-b are vibrated anti-phase in the Y direction with the electrostatic force applied by the actuators 109a-b. Motion of the drive masses 130a-b transferred to the guiding arms 104a and 104b through the coupling springs 131a and 131b, and the guiding arms 104a-b rotate in-plane around an axis that is parallel to the Z direction. As a result of the in-plane rotation of guiding arms 104a and 104b, the roll proof-mass pair 200b and 200c and roll proof-mass pair 200a and 200d translate anti-phase in-plane in the X-direction which is detected by the drive-sense combs 106a, 106b, 106c, and 106d.

Moreover, during the drive motion, the guided mass systems 901, 902 and 903 are arranged so that when the roll proof-masses 102a-d all move in the X-direction, the pitch proof-mass 210 rotates about an axis in the Z-direction, and the yaw proof-masses 170a and 170b move anti-phase in the X-direction.

The coupling spring 302a is torsionally compliant about an axis in the X-direction so that the guided mass systems 901 and 902 can rotate out-of-plane about the first and second roll-sense axes anti-phase. The coupling spring 302a prevents the symmetric guided mass systems 901 and 902 from rotating out-of-plane in-phase.

The coupling spring 302b is also torsionally compliant about an axis in the X-direction so that the guided mass systems 902 and 903 can rotate out-of-plane about the second and third roll-sense axes anti-phase. The coupling spring 302b prevents the symmetric guided mass systems 902 and 903 from rotating out-of-plane in-phase.

Angular velocity about the pitch-input axis will cause Coriolis forces to act on the pitch proof-mass 210 resulting in a torque that rotates the pitch proof-mass 210 about the pitch-sense axis. The amplitude of the rotation of the pitch proof-mass 210 is proportional to the angular velocity about the pitch-input axis. Transducers 211a and 211b are disposed on opposite sides along the X-direction under the pitch proof-mass 210 and detect the rotation of the pitch proof-mass about the pitch-sense axis. The rotation provides a measure of the angular velocity about the pitch-input axis.

Angular velocity about the roll-input axis will cause Coriolis forces to act on the roll proof-masses 200b and 200c in a Z-direction and on roll proof-masses 200*a* and 200*d* in the opposite Z-direction. The Coriolis forces cause the guided mass systems 901, 902, and 903 to rotate out-of-plane about the first, second, and third roll-sense axis respectively. Transducer 201*a* under the roll proof masses 200*b* and 102*c* and transducer 201*a* under the roll proof masses 200*a* and 200*d* are used to detect the rotation of the guided mass systems 901,902 and 903. This rotation provides a measure of the angular velocity about the roll-input axis.

Angular velocity about the yaw-input axis will cause Coriolis forces to act on the yaw proof-masses 170*a* and 170*b* resulting in motion of the yaw proof-masses 170*a* and 170*b* anti-phase along the Y-direction. The amplitude of the motion of the yaw proof-masses along the Y-direction is proportional to the angular velocity. Transducers 522*a* and 522*b* are used to sense the motion of the respective yaw proof masses 170*a* and 170*b* along the Y-direction.

In all of the above embodiments of the gyroscope, the drive mass is separated from the rotating proof mass and the electrostatic actuators are attached to the drive mass. In so doing, the effect of the non-idealities of the electrostatic actuator on the rotating proof mass is minimized thereby enhancing the overall sensitivity of the gyroscope.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

As noted above, conventional MEMS vibratory rate gyroscopes may not provide adequate solutions that reduce sensitivity to vibration (e.g., linear vibration and/or angular vibration) and part-to-part coupling, reduce electrostatic levitation force induced in-phase offset shift, and/or reduce sensitivity to package stress. Various embodiments described herein can overcome one or more of these and/or related drawbacks of conventional MEMS vibratory rate gyroscopes.

The subject disclosure provides exemplary 3-axis (e.g., GX, GY, and GZ) linear and angular momentum balanced vibratory rate gyroscope architecture with semi-coupled sense modes. In a non-limiting aspect, various exemplary embodiments can employ balanced drive and/or balanced sense components to reduce induced vibrations and/or part to part coupling, as described herein. In another non-limiting aspect, various exemplary embodiments can employ a stress isolation frame to reduce package induced stress (e.g., bend in the GZ direction), as further described herein. In yet another non-limiting aspect, various exemplary embodiments can employ mechanical coupling to facilitate linear vibration rejection. In still another non-limiting aspect, various exemplary embodiments can employ one or more drive shuttles to reject electrostatic levitation force induced in-phase offset (e.g., GX/GY bend). As a result, various exemplary embodiments can facilitate fabrication of gyroscopes having improvements in cross-axis sensitivity due to decoupling of in-plane and out-of-plane gyroscopes, as described herein.

As a non-limiting example, exemplary embodiments can comprise two GY (e.g., frame) gyroscopes, wherein frame gyroscopes facilitate GY sense mode and drive system coupling, two GX (center proof mass (CPM) or paddle) gyroscopes, four drive shuttles coupled to the two frame gyroscopes, four GZ proof masses coupled to the drive shuttles, and/or two lever arms that facilitate coupling GZ proof masses. In still further non-limiting aspects, various exemplary embodiments can be configured such that components can be removed from an exemplary overall architecture to fabricate a single axis or two axis gyroscope and/or can be configured such that a number of proof-masses can be reduced in half from an exemplary overall architecture to fabricate a half-gyroscope, as further described herein. For instance, according to a non-limiting aspect, an exemplary 3-axis (e.g., GX, GY, and GZ) gyroscope can be reduced to a 2-axis or 1-axis gyroscope by removing components from the architecture, employing fewer sense transducers, etc., and exemplary gyroscope architectures as described herein can be functionally cut in half to create a more compact 3-axis (e.g., GX, GY, and GZ) gyroscope, by forgoing drive and/or sense balanced aspects of the exemplary 3-axis (e.g., GX, GY, and GZ) gyroscope architectures.

Figure 10:
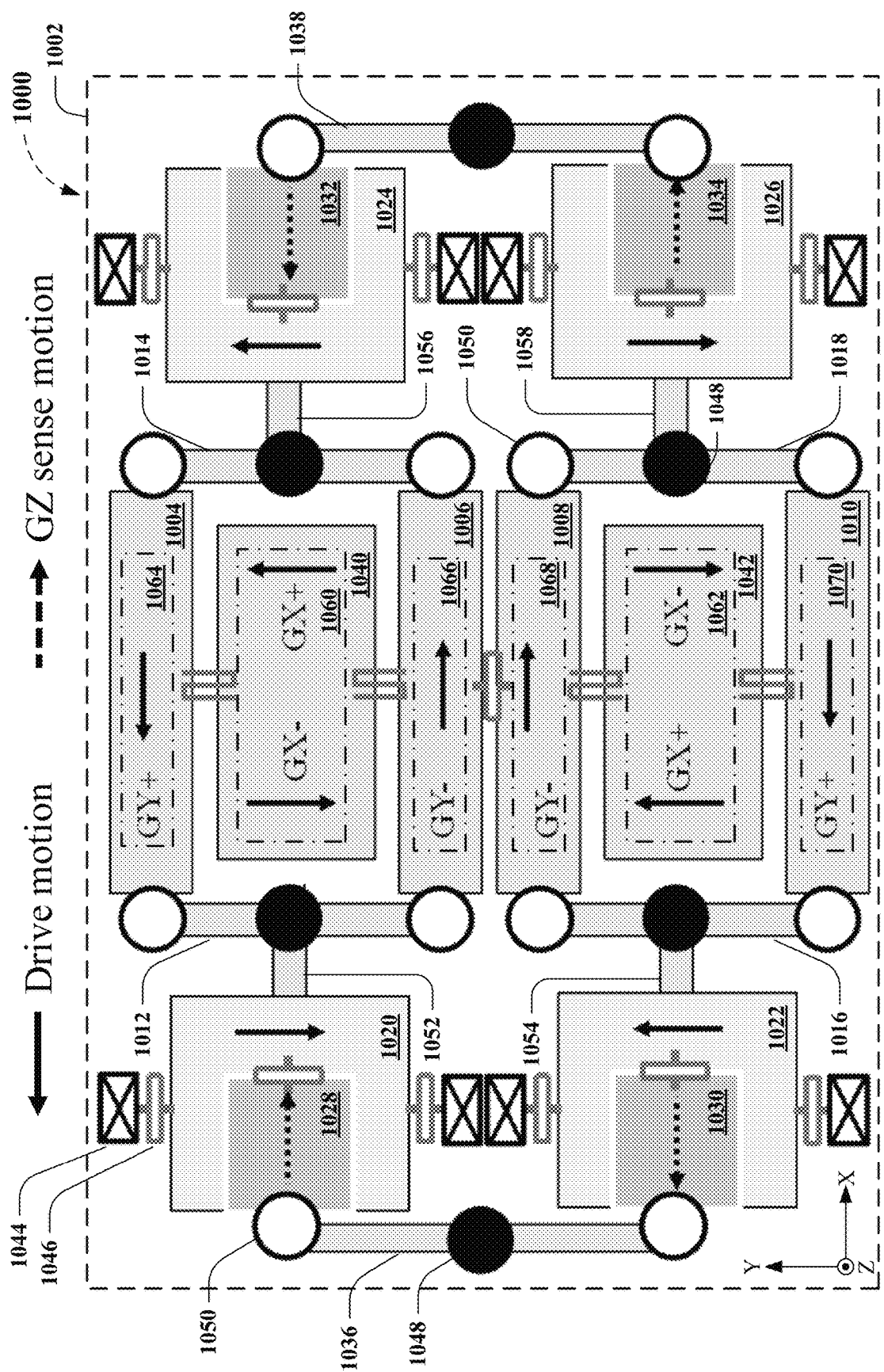
FIG. 10 illustrates a functional block diagram of non-limiting embodiments of an exemplary gyroscope architecture, according to non-limiting aspects of the subject disclosure.

FIG. 10 illustrates a functional block diagram of non-limiting embodiments of an exemplary gyroscope architecture 1000, according to non-limiting aspects of the subject disclosure. As a non-limiting example, exemplary embodiments of a gyroscope architecture 1000 can comprise a MEMS device disposed in an X-Y plane parallel to a substrate 1002 and can comprise two GY (e.g., frame) gyroscopes, that can each comprise two GY proof masses (e.g., GY proof masses 1004, 1006, 1008, 1010), coupled with lever arms 1012, 1014, 1016, 1018, wherein frame gyroscopes are configured to facilitate providing a GY sense mode, or measuring a component of angular velocity associated with the MEMS device around an axis (e.g., Y axis), and configured to couple the drive system to the frame gyroscopes. In a further non-limiting aspect, exemplary embodiments of a gyroscope architecture 1000 can comprise a drive system comprising four drive shuttles 1020, 1022, 1024, 1026, comprising guided masses and configured to be coupled to the two frame gyroscopes, respectively.

In another non-limiting aspect, exemplary gyroscope architecture 1000 can comprise four GZ proof masses (e.g., GZ proof masses 1028, 1030, 1032, 1034), configured to be coupled (e.g., via a spring or other coupling structure) to the four drive shuttles 1020, 1022, 1024, 1026, respectively, wherein respective pairs of the four GZ proof masses (e.g., GZ proof masses 1028, 1030, 1032, 1034) are coupled to each other via coupling mechanisms or lever arms 1036, 1038 that are configured to couple the respective pairs of the four proof masses' (e.g., GZ proof masses 1028, 1030, 1032, 1034) motions, and wherein the four GZ proof masses (e.g., GZ proof masses 1028, 1030, 1032, 1034) can be configured to facilitate providing a GZ sense mode, or measuring a component of angular velocity associated with the MEMS device around another axis (e.g., Z axis). In still another non-limiting aspect, exemplary gyroscope architecture 1000 can comprise two GX (CPM or paddle) gyroscopes (e.g., GX, CPM, or paddle gyroscopes) that can each comprise one GX proof mass (e.g., GX proof mass 1040, 1042), wherein the GX, paddle, or CPM gyroscopes can be configured to facilitate providing a GX sense mode, or measuring a component of angular velocity associated with the MEMS device around another axis (e.g., X axis), and configured to be coupled to the frame gyroscopes, respectively.

In still other non-limiting aspects, exemplary gyroscope architecture 1000 can comprise exemplary anchor points 1044 (e.g., rectangles with X), which can facilitate anchoring various components to the substrate 1002 and/or to an exemplary stress isolation frame (not shown) configured to be attached to the substrate 1002 or package. In further non-limiting aspects, exemplary gyroscope architecture 1000 of FIG. 10 is depicted comprising exemplary fixed pivot points 1048 (e.g., black-filled circles), which can functionally represent a center about which various components can be configured to rotate (e.g., generally in a plane parallel to the X-Y plane of the substrate 1002), and comprising exemplary translating pivot points 1050 (e.g., white-filled circles), which can functionally represent a pivot point or hinge about which various components can be configured to rotate and translate (e.g., generally in a plane parallel to the X-Y plane of the substrate 1002). These exemplary pivot points can be understood to be a functional representation of the centers of rotational motions as a result of the processes required to create such devices via MEMS fabrication, which typically comprise a set of springs, flexures, or subtension mechanisms or components arranged to produce the desired motion.

Accordingly, exemplary gyroscope architecture 1000 of FIG. 10 is depicted comprising exemplary springs (e.g., spring 1046), suspension elements, or coupling mechanisms, which can comprise flexures or other structures that are particularly rigid, or flexibly and/or torsionally compliant in particular directions to constrain or define motions (e.g., anti-phase motion, in-plane motion, motions of guided masses, etc.) and/or transfer motions of the various components of exemplary gyroscope architecture 1000, suspend various components of exemplary gyroscope architecture 1000 to exemplary anchor points 1044, function as exemplary fixed pivot points 1048 and/or exemplary translating pivot points 1050, and so on, as further described herein.

As a non-limiting example, exemplary gyroscope architecture 1000 of FIG. 10 is depicted as comprising drive shuttles comprising four drive shuttles 1020, 1022, 1024, 1026, comprising guided masses and configured to be coupled (e.g., via coupling 1052/1056) to the two frame gyroscopes, respectively. For instance, exemplary drive shuttle 1020/1024 is configured to be coupled (e.g., via coupling 1052/1056) to lever arm 1012/1014 of exemplary GY frame gyroscope comprising GY proof masses 1004, 1006, thereby facilitating providing a fixed pivot point between lever arm 1012/1014 of exemplary GY frame gyroscope and exemplary drive shuttle 1020/1024. Likewise, exemplary drive shuttle 1022/1026 is configured to be coupled (e.g., via coupling 1054/1058) to lever arm 1016/1018 of exemplary GY frame gyroscope comprising GY proof masses 1008, 1010, thereby facilitating providing a fixed pivot point between lever arm 1016/1018 of exemplary GY frame gyroscope and exemplary drive shuttle 1022/1026. Such exemplary coupling is shown schematically in FIGS. 12-15, for example.

As another non-limiting example, respective pairs of the four exemplary GZ proof masses (e.g., GZ proof masses 1028, 1030, 1032, 1034) can be coupled to each other via coupling mechanisms or lever arms 1036, 1038 that are configured to coupled the respective pairs of the four proof masses' (e.g., GZ proof masses 1028, 1030, 1032, 1034) motions. For instance, exemplary GZ proof mass 1028 is coupled to exemplary GZ proof mass 1030 via coupling mechanisms or lever arm 1036 and configured to force the respective pair of the four proof masses (e.g., exemplary GZ proof mass 1028/1030) into anti-phase motion as a result of a component of angular velocity associated with the MEMS device around the Z-axis. Such exemplary coupling is shown in FIG. 10 functionally as a rotation of coupling mechanisms or lever arm 1036 about a fixed pivot point 1048 via translating pivot points 1050 and is shown schematically in FIGS. 12-15, for example.

As another non-limiting example, the two exemplary GY or frame gyroscopes can be configured to be coupled to each other (e.g., shown functionally via an exemplary spring (e.g., such as described above regarding one or more exemplary springs 1046, suspension elements, or coupling mechanisms, which can comprise flexures or other structures that are particularly rigid, or flexibly and/or torsionally compliant in particular directions to constrain or define motions, etc.) depicted between and coupling exemplary GY proof mass 1006 to exemplary GY proof mass 1008) to facilitate constraining a motion associated with the two frame gyroscopes into a condition of linear momentum balance. For instance, as further described herein exemplary GY proof mass 1006 can be coupled to exemplary GY proof mass 1008 via an exemplary spring (e.g., such as described above regarding one or more exemplary springs 1046, suspension elements, or coupling mechanisms, which can comprise flexures or other structures that are particularly rigid, or flexibly and/or torsionally compliant in particular directions to constrain or define motions, etc.) or other structure or combination of structures that can facilitate constraining a motion associated with the two frame gyroscopes into a condition of linear momentum balance, as further described herein. Such coupling is shown schematically in FIGS. 12-15, for example. In another non-limiting example, the two exemplary GX, CPM, or paddle gyroscopes, each comprising one GX proof mass (e.g., GX proof mass 1040, 1042) can be coupled, respectively, to the two exemplary GY or frame gyroscopes, which, in turn can be configured to couple the two exemplary GX, CPM, or paddle gyroscopes to the four drive shuttles 1020, 1022, 1024, 1026, respectively. For instance, such a coupling is shown in FIG. 10, functionally, as a suspension of the GX proof mass 1040(1042) between GY proof masses 1004 and 1006 (1008 and 1010) (e.g., via springs), thereby providing an axis of rotation for the GX proof masses 1040, 1042 transverse across the GX proof masses 1040 and 1042, while transferring respective motions of the GY proof masses 1004 and 1006 (1008 and 1010) to the GX proof masses 1040 and 1042. Such exemplary coupling is shown schematically in FIGS. 12-15, for example.

In addition, exemplary gyroscope architecture 1000 of FIG. 10 is depicted comprising various sense electrodes or transducer elements, which can be respectively configured to detect motions of the various proof masses or other components of the exemplary gyroscope architecture 1000, for example, to detect motions as a result of Coriolis forces induced on the various proof masses to provide a measure of the angular velocity about the X, Y, or Z axes, to detect drive motions, etc. Although electrostatic actuators and transducers are described throughout this specification, one of ordinary skill in the art recognizes that a variety of actuators and/or transducers could be utilized for these functions, and that use would be within the spirit and scope of the subject disclosure. For example, exemplary actuators and/or transducers could comprise piezoelectric, thermal, electromagnetic, actuators and/or transducers, or the like. In a non-limiting aspect, exemplary gyroscope architecture 1000 can comprise capacitive electrodes 1060, 1062, configured to respectively detect motions of exemplary GX proof masses 1040, 1042, can comprise capacitive electrodes 1064, 1066, configured to respectively detect motions of exemplary GY proof masses 1004, 1006, can comprise capacitive electrodes 1068, 1070, configured to respectively detect motions of exemplary GY proof masses 1008, 1010, and so on. As further described herein, it can be understood that exemplary capacitive electrodes 1060, 1062, 1064, 1066, 1068, 1070 can be configured to primarily facilitate detection of Coriolis forces acting on respective proof masses as a result of angular velocity associated with the MEMS device about respective axes (e.g., X or Y axes). As further described herein, these Coriolis forces acting on respective proof masses as a result of angular velocity associated with the MEMS device about respective axes (e.g., X or Y axes) can result in out-of-plane motions of the respective proof masses, wherein the out-of-plane motion is defined as motion in the direction of the Z axis (e.g., out of the X-Y plane).

Figure 11:
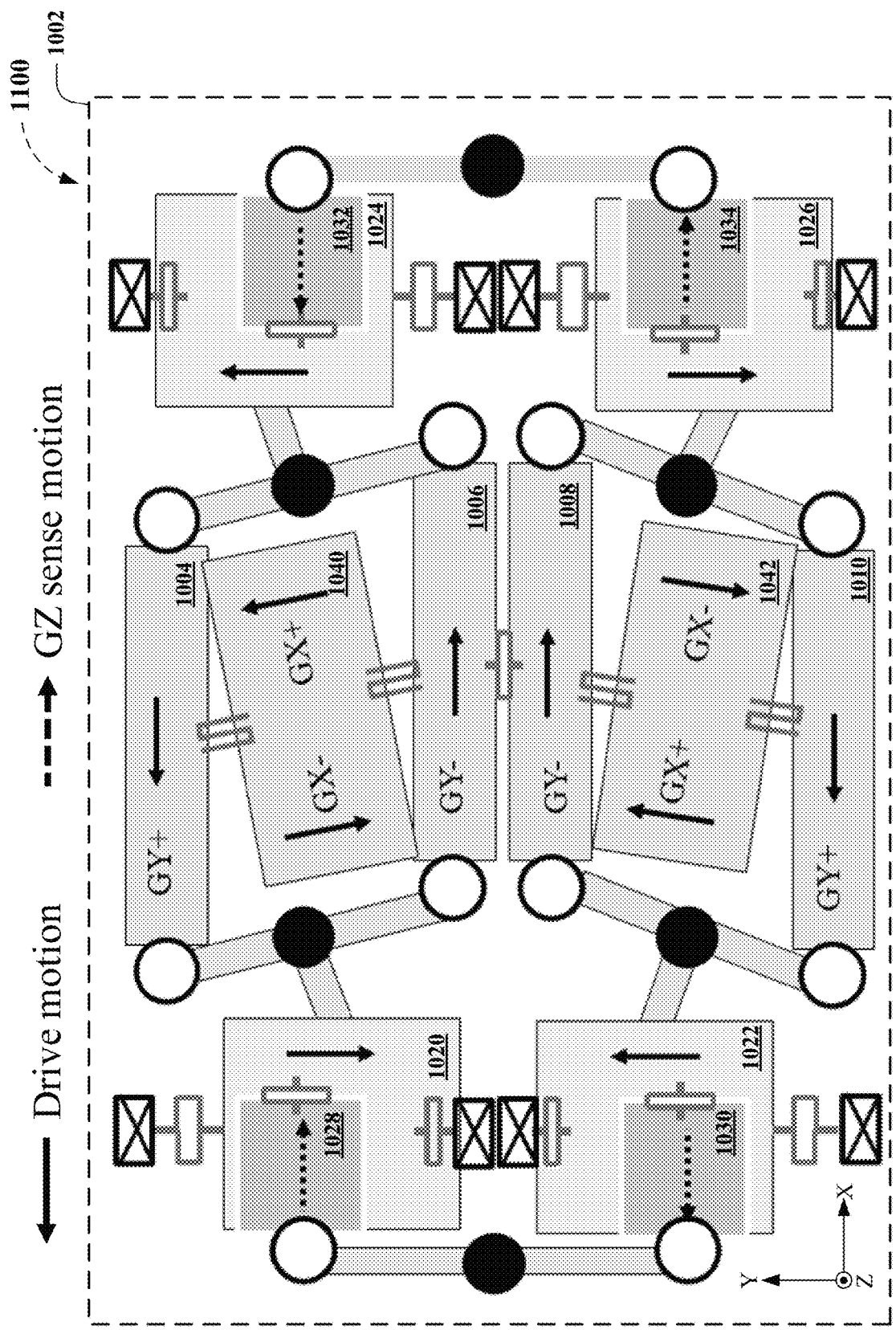
FIG. 11 illustrates a functional block diagram of non-limiting embodiments (e.g., corresponding FIG. 10) of an exemplary gyroscope architecture in driven motion, which demonstrates further non-limiting aspects of the subject disclosure.

In addition, exemplary gyroscope architecture 1000 of FIG. 10 is depicted as undergoing drive motion, at a particular instance in time, which is indicated by a solid arrow in the direction of the respective various components of exemplary gyroscope architecture 1000. As further described herein, to generate the drive motion, an electrostatic force can be applied with exemplary drive combs (not shown) that can be coupled to the four exemplary drive shuttles 1020, 1022, 1024, 1026, respectively, which exemplary drive shuttles 1020, 1022, 1024, 1026 can comprise the guided masses configured to be coupled to the two frame gyroscopes, as described herein. By applying an alternating current (AC) voltage to the respective exemplary drive combs (not shown) at a drive frequency, an electrostatic force can be applied via the exemplary drive combs (not shown) to the exemplary drive shuttles 1020, 1022, 1024, 1026 to generate the drive force at the drive frequency, which can result in the drive motions of the respective various components of exemplary gyroscope architecture 1000 as indicated in FIG. 10. This drive force applied to respective exemplary drive shuttles 1020, 1022, 1024, 1026 is configured to be transferred to the various components of exemplary gyroscope architecture 1000, via the above described coupling mechanisms, lever arms, pivot points, and springs, as described above, which results in the drive motions of the various components of exemplary gyroscope architecture 1000, as depicted in FIG. 10, and which results in the translation of the various components of exemplary gyroscope architecture 1000, as depicted in FIG. 11. Note that FIG. 10 depicts deflection of various components of exemplary gyroscope architecture 1000 as a result of a Coriolis force from angular velocity about the respective axes with the given direction of drive motion as positive (e.g., GX+, GY+), or above the X-Y plane of the MEMS device, and as negative (e.g., GX−, GY−), or below the X-Y plane of the MEMS device.

Note that, as described above, the four exemplary GZ proof masses (e.g., GZ proof masses 1028, 1030, 1032, 1034) are configured to be coupled (e.g., via a spring or other coupling structure) to the four drive shuttles 1020, 1022, 1024, 1026, respectively, wherein respective pairs of the four GZ proof masses (e.g., GZ proof masses 1028, 1030, 1032, 1034) are coupled to each other via coupling mechanisms or lever arms 1036, 1038 that are configured to coupled the respective pairs of the four proof masses' (e.g., GZ proof masses 1028, 1030, 1032, 1034) motions. As further described herein, a Coriolis force acting on respective GZ proof masses (e.g., GZ proof masses 1028, 1030, 1032, 1034) as a result of angular velocity associated with the MEMS device about the Z axis can result in motions of the respective GZ proof masses (e.g., GZ proof masses 1028, 1030, 1032, 1034), in-plane, wherein the in-plane motion is defined as motion in the direction of the X axis (e.g., in the X-Y plane). Accordingly, respective GZ proof masses (e.g., GZ proof masses 1028, 1030, 1032, 1034) of exemplary gyroscope architecture 1000 of FIG. 10 is depicted as experiencing drive motion, at a particular instance in time, which is indicated by a solid arrow in the direction of the respective various components of exemplary gyroscope architecture 1000.

Thus, as a further non-limiting example, exemplary gyroscope architecture 1000 can comprise further capacitive electrodes (not shown) that can be configured to respectively detect motions of respective GZ proof masses (e.g., GZ proof masses 1028, 1030, 1032, 1034). As further described herein, it can be understood that such exemplary capacitive electrodes can be configured to primarily facilitate detection of Coriolis forces acting on respective proof masses as a result of angular velocity associated with the MEMS device about the Z axis. As described above, although the transducers, electrodes, or actuators (e.g., drive combs) are described above as capacitive transducers, electrodes, or actuators, various types of transducers, electrodes, or actuators could be utilized including, but not limited to piezoelectric, thermal, electromagnetic, optical, or the like, as appropriate, and its use would be within the spirit and scope of the disclosed subject matter.

FIG. 11 illustrates a functional block diagram 1100 of non-limiting embodiments (e.g., corresponding FIG. 10) of an exemplary gyroscope architecture in driven motion, which demonstrates further non-limiting aspects of the subject disclosure. FIG. 11 depicts resulting translation and rotation motions of the various components of exemplary gyroscope architecture 1000 as a result of drive force applied to respective exemplary drive shuttles 1020, 1022, 1024, 1026 and transferred to the various components of exemplary gyroscope architecture 1000, via the above described coupling mechanisms, lever arms, pivot points, and springs, as described above. Note further that some reference characters and/or components of exemplary gyroscope architecture 1000, as depicted in FIG. 10, are not shown in functional block diagram 1100, for clarity.

Several points are apparent from a review of FIGS. 10-11. First, note that the drive motions of the respective proof masses and components are linear and/or angular momentum balanced, according to various non-limiting embodiments. That is, drive motion of exemplary drive shuttles 1020 and 1022 and drive motion of exemplary drive shuttles 1024 and 1026 are in anti-phase motion or opposite directions. Secondly, drive motions of the two GY frame gyros are also anti-phase or in opposite directions, which is facilitated by the coupling of the anti-phase drive motion of the four exemplary drive shuttles 1020, 1022, 1024, 1026 to the GY proof masses (e.g., GY proof masses 1004, 1006, 1008, 1010) via the respective exemplary lever arms 1012, 1014, 1016, 1018 that provides rotation about the fixed pivot points and translation of the Y proof masses (e.g., GY proof masses 1004, 1006, 1008, 1010) via the translating pivot points, and which is facilitated by coupling the two exemplary GY or frame gyroscopes to each other (e.g., shown functionally via a spring 1046 coupling exemplary GY proof mass 1006 to exemplary GY proof mass 1008). Thus, the two GY frame gyros comprise a four bar system that deforms into a parallelogram under applied drive motion. In addition, the coupling of the exemplary GX, paddle, or CPM gyroscopes 1040, 1042 to the respective GY or frame gyroscopes ensures that the drive motions of the GX, paddle, or CPM gyroscopes 1040, 1042 are also anti-phase or in opposite directions. Lastly, note that drive motions of the four exemplary GZ proof masses (e.g., GZ proof masses 1028, 1030, 1032, 1034) coupled (e.g., via a spring or other coupling structure) to the four drive shuttles 1020, 1022, 1024, 1026, respectively, are also anti-phase or in opposite directions. As a result, the drive motion of the 3-axis (e.g., GX, GY, and GZ) gyroscope depicted in FIGS. 10-11 can benefit from linear and angular momentum balance, according to exemplary aspects described herein.

According to various non-limiting embodiments, by employing balanced masses, arranged such that their drive motions are opposite to each other and such that their net linear momentum and angular momentum from drive motion are zero, vibration rejection can be improved. For example, by coupling various components of exemplary gyroscope architecture 1000, these various components do not move independently of each other. As used herein, motion in same direction is referred to as common motion, or common mode and motion in opposite direction is referred to as anti-phase motion, or differential motion. It can be that understood common motion is susceptible to acceleration from outside sources, such as vibration, where acceleration can be thought of as a uniform body load. And because it is uniform, it is by definition in one direction, or linear acceleration. This linear acceleration will excite common motion. However, because the various drive motions are coupled, physically, to ensure it is anti-phase (not common) or in opposite directions, a uniform body load or linear acceleration will not create a motion in the sense mode, which improves ability to reject vibration, in various non-limiting aspects. Moreover, by employing balanced masses, arranged such that their drive motions are opposite to each other and such that their net linear momentum and angular momentum from drive motion are zero torque applied to a device package at the drive frequency to the printed circuit board (PCB) can be minimized. Thus, in exemplary implementations where multiple MEMS gyroscope devices are mounted to the same PCB, where resonant frequencies are close to each other, exemplary devices as described herein can minimize cross-talk, or part to part coupling, that might otherwise result in undesirable noise and offsets on the devices experiencing cross-talk as a result of unbalanced masses or momentum.

Note that, as in FIG. 10, FIG. 11 depicts deflection of various components of exemplary gyroscope architecture 1000 as a result of a Coriolis force from angular velocity about the respective axes with the given direction of drive motion as positive (e.g., GX+, GY+), or above the X-Y plane of the MEMS device, and as negative (e.g., GX−, GY−), or below the X-Y plane of the MEMS device. Thus, it can be seen in FIGS. 10-11, under the given drive motion, a Coriolis force from angular velocity about the respective axes with the given direction of drive motions will result in out-of-plane (e.g., out of X-Y plane) deflection of the GY or frame gyroscopes and the GX, paddle, or CPM gyroscopes 1040, 1042. As described above, exemplary capacitive electrodes 1060, 1062, 1064, 1066, 1068, 1070 can be configured to primarily facilitate detection of Coriolis forces acting on respective proof masses as a result of angular velocity associated with the MEMS device about respective axes (e.g., X or Y axes).

However, note further that the four exemplary GZ proof masses (e.g., GZ proof masses 1028, 1030, 1032, 1034) are coupled (e.g., via a spring or other coupling structure) to the four drive shuttles 1020, 1022, 1024, 1026, respectively, wherein respective pairs of the four exemplary GZ proof masses (e.g., GZ proof masses 1028, 1030, 1032, 1034) are coupled to each other via coupling mechanisms or lever arms 1036, 1038 that are configured to couple the respective pairs of the four proof masses' (e.g., GZ proof masses 1028, 1030, 1032, 1034) motions. Thus, the drive motions of the four exemplary GZ proof masses (e.g., GZ proof masses 1028, 1030, 1032, 1034) is in the Y direction, and a Coriolis force from angular velocity about the Z axis with the given direction of drive motions will result in-plane (e.g., in the X-Y plane) deflection in the X direction. Thus, exemplary gyroscope architecture 1000 can comprise further capacitive electrodes (not shown) that can be configured to respectively detect motions of respective GZ proof masses (e.g., GZ proof masses 1028, 1030, 1032, 1034) to primarily facilitate detection of Coriolis forces acting on respective proof masses as a result of angular velocity associated with the MEMS device about the Z axis.

Figure 21:
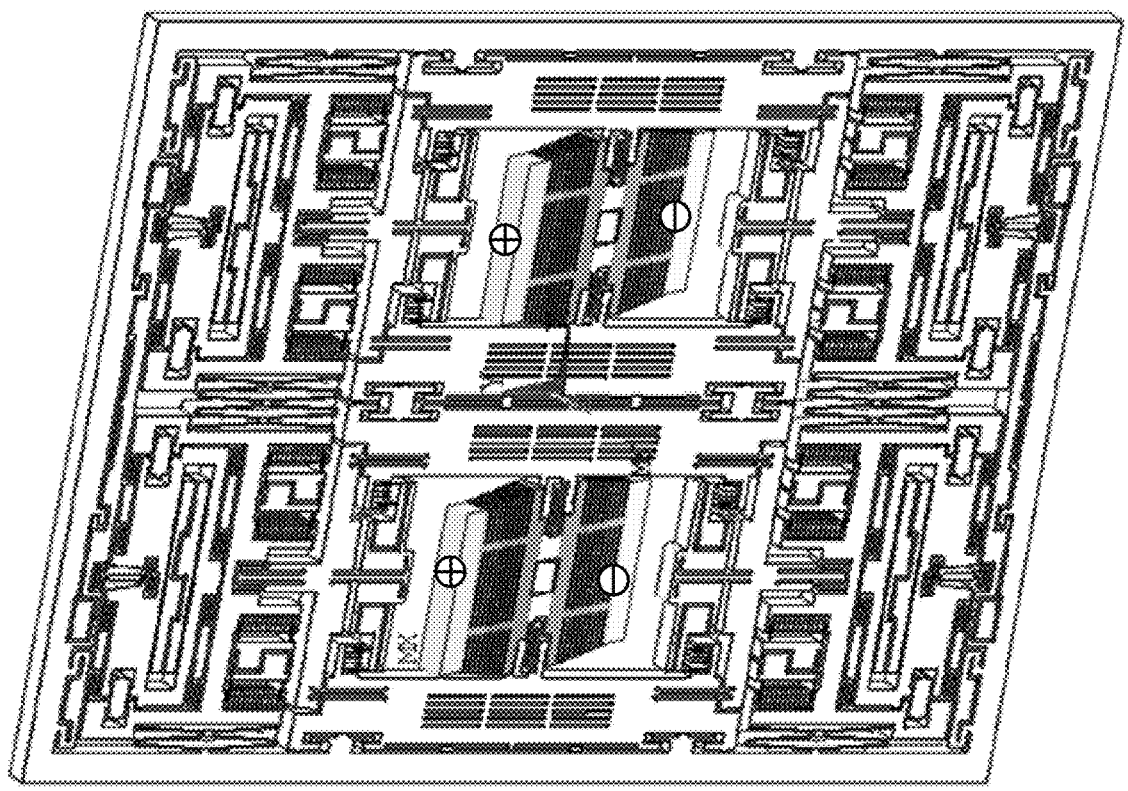
FIG. 21 depicts an exemplary GX mode (center proof mass (CPM) parasitic mode shape of a non-limiting embodiment of an exemplary gyroscope architecture, according to still further non-limiting aspects.
Figure 21:
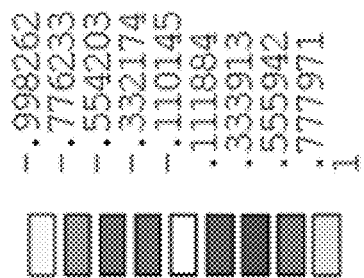
Figure 22:
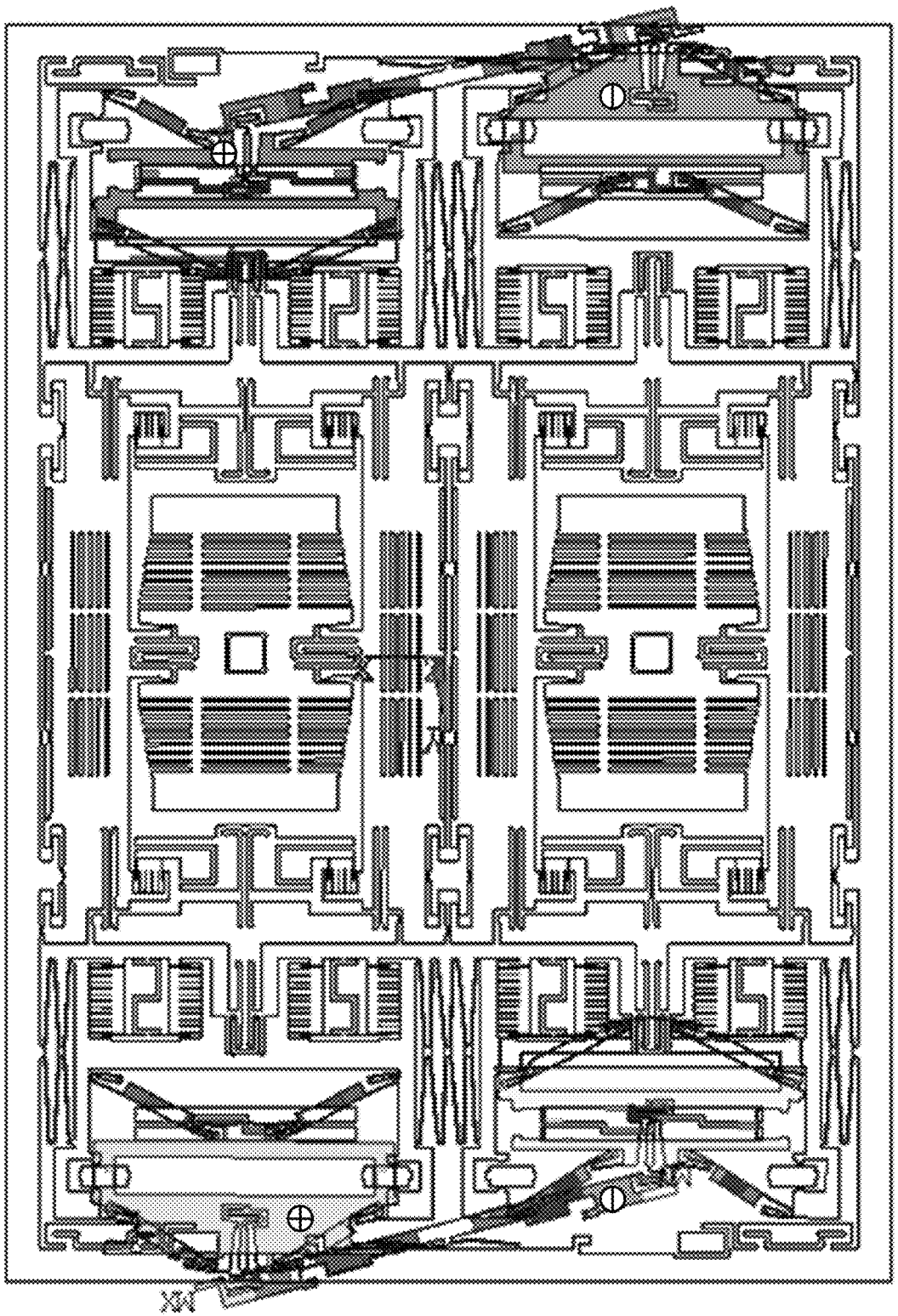
FIG. 22 depicts an exemplary GZ parasitic mode shape of a non-limiting embodiment of an exemplary gyroscope architecture, according to still further non-limiting aspects described herein.

Note regarding FIGS. 10-11 that an exemplary drive system can be decoupled from exemplary GX, paddle, or CPM gyroscopes 1040, 1042 and the exemplary GY or frames gyroscopes, both the exemplary GX, paddle, or CPM gyroscopes 1040, 1042 and the exemplary GY or frames gyroscopes can be symmetric, and/or the GZ gyroscopes comprising the GZ proof masses (e.g., GZ proof masses 1028, 1030, 1032, 1034) can be configured such that compliance to out-of-plane motion can be made very stiff, according to various non-limiting aspects. However, as depicted in FIGS. 21-22, for example, note that exemplary embodiments as described herein can experience parasitic modes on GX or CPM sense and GZ sense modes and lack of angular momentum balance on GX or CPM sense and GZ sense modes, in a further non-limiting aspect.

As noted above, conventional MEMS vibratory rate gyroscopes may not provide adequate solutions that reduce sensitivity to vibration (e.g., linear vibration and/or angular vibration) and part-to-part coupling, reduce levitation force induced in-phase offset shift, and/or reduce sensitivity to package stress. However, according to various non-limiting implementations, as described herein, by placing the exemplary drive system in exemplary drive shuttles 1020, 1022, 1024, 1026, and by employing weak coupling between the out-of-plane gyroscopes (e.g., GY or frame gyroscopes and GX, CPM, or paddle gyroscopes), various non-limiting embodiments can facilitate minimizing the out-of-plane or electrostatic levitation force transferred to the out-of-plane gyroscopes, and/or it can be rejected, versus a drive system connected to the out-of-plane gyroscopes. In addition, decoupling of in-plane and out-of-plane gyroscopes can result in improvements in cross-axis sensitivity.

This can result in better offset stability, because, being a sensor that measures a quantity of interest, e.g., angular velocity about the Z axis by detection of the Coriolis force on the four exemplary GZ proof masses (e.g., GZ proof masses 1028, 1030, 1032, 1034), the sensor is expected to output a signal that is proportional to the angular velocity. By decoupling or employing weak coupling between the out-of-plane gyroscopes (e.g., GY or frame gyroscopes and GX, CPM, or paddle gyroscopes) and the drive shuttles, combs, the offset or bias error, which is how much shift there is between the quantity of interest and the quantity being reported (e.g., Coriolis force as a result of angular velocity about the z-axis), there will be reduced out-of-plane force (or levitation force) transferred to the GZ gyroscope from the out-of-plane gyroscopes (e.g., GY or frame gyroscopes and GX, CPM, or paddle gyroscopes), which might otherwise be sensed as an applied angular velocity in the GZ gyroscope.

For example, various embodiments described herein can reduce electrostatic levitation force induced in-phase offset shift via employment of exemplary drive shuttles 1020, 1022, 1024, 1026. For instance, as described above GY or frame gyroscopes and GX, CPM, or paddle gyroscopes are out-of plane gyroscopes, where MEMS device rotation around the X or Y axes will result in out-of-plane motion of the GY proof masses (e.g., GY proof masses 1004, 1006, 1008, 1010) and GX proof masses (e.g., GX proof masses 1040, 1042). Rotation of the MEMS device around the Z axis will only result in motion of the four exemplary GZ proof masses (e.g., GZ proof masses 1028, 1030, 1032, 1034) in the X-Y plane, which is the plane of the MEMS device. The four exemplary GZ proof masses (e.g., GZ proof masses 1028, 1030, 1032, 1034) motion is also coupled to the respective four drive shuttles 1020, 1022, 1024, 1026 and, thus, moves with the respective four drive shuttles 1020, 1022, 1024, 1026, which is also an in-plane motion. By locating the in-plane motion components (GZ) separately from the out-of-plane motion components (GX, GY), and by connecting the out-of-plane motion components (GX, GY) with the flexible coupling mechanism (e.g., via coupling 1052, 1054, 1056, 1058) to the two GY or frame gyroscopes, which can be configured to constrain transmission of out-of-plane motion to the in plain motion components (GZ) (e.g., four drive shuttles 1020, 1022, 1024, 1026, GZ proof masses 1028, 1030, 1032, 1034), the transmission of the electrostatic levitation force (and associated offset shift) associated with the out-of-plane motion components (GX, GY) can be minimized.

Figure 12:
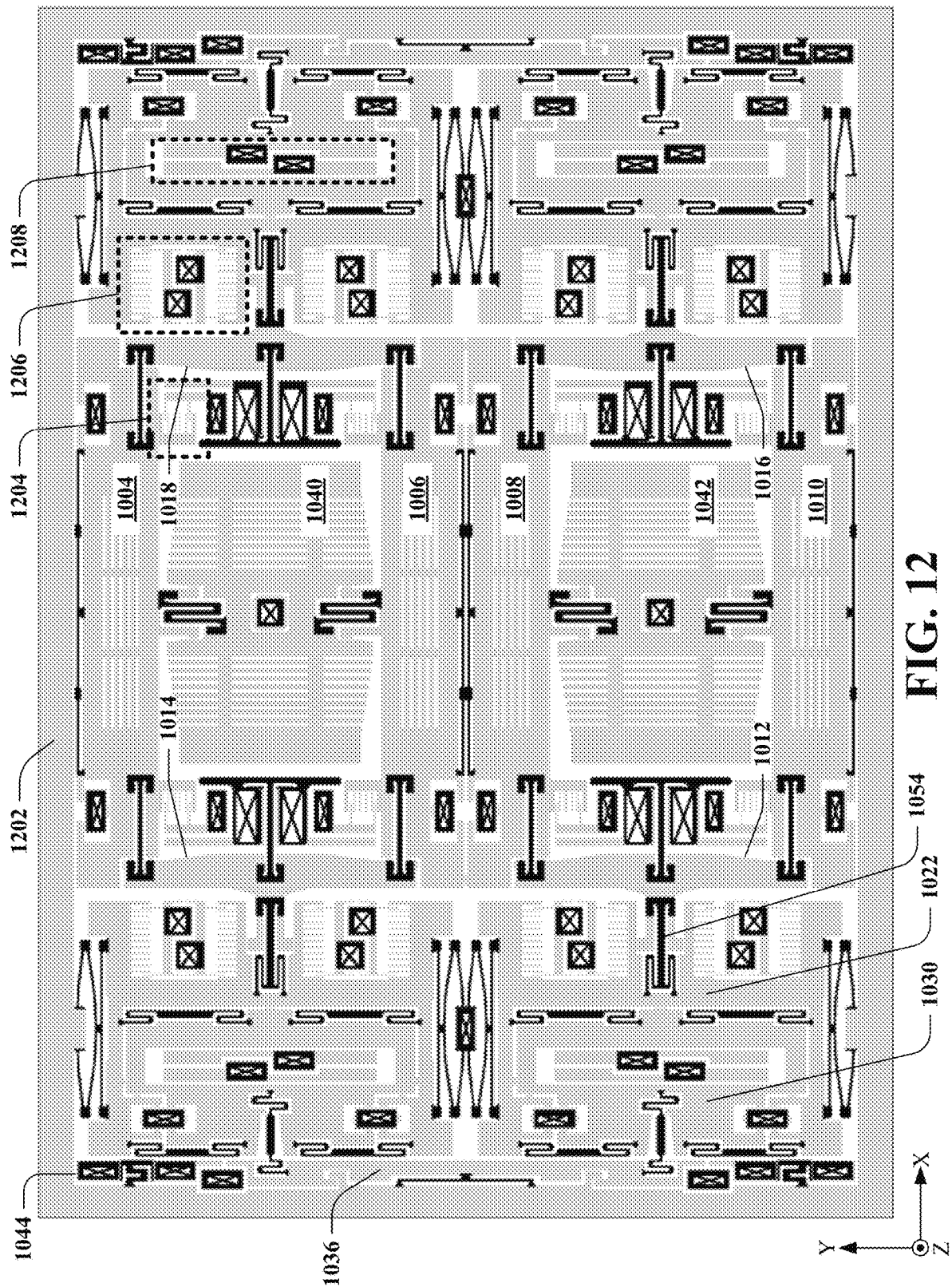
FIG. 12 depicts further aspects of non-limiting embodiments of an exemplary gyroscope architecture, as described herein.

FIG. 12 depicts further aspects of non-limiting embodiments of an exemplary gyroscope architecture 1000, as described herein. Note the relative locations and configurations of the exemplary GY proof masses (e.g., GY proof masses 1004, 1006, 1008, 1010), exemplary GX proof masses (e.g., GX proof masses 1040, 1042), the coupling there between, exemplary lever arms 1012, 1014, 1016, 1018, anchors 1044, and various couplings, springs, suspension elements depicted therein.

In addition, FIG. 12 depicts an exemplary stress isolation frame 1202, according to further non-limiting aspects. Recall that offset shift can be induced by electrostatic levitation force induced in the drive shuttles or transferred to the in-plane GZ gyroscopes. Offset shift can also be affected by other sources such as package stress, temperature effects, etc. In order to decouple packaged deformation from exemplary devices and, thus, minimized package deformation induced offset, an exemplary stress isolation frame 1202 can be employed in various non-limiting embodiments. While not shown in FIG. 10, an exemplary stress isolation frame 1202 can be function shown connected to all the outer anchor points 1044 illustrated in FIG. 10. Here, note that the exemplary stress isolation frame 1202 can be connected to the package or the substrate 1002, and the peripheral components of the components of exemplary gyroscope architecture 1000 can be suspended therefrom and/or anchored thereto, including, but not limited to the four exemplary drive shuttles 1020, 1022, 1024, 1026, exemplary coupling mechanisms or lever arms 1036, 1038, etc. As a result, package bend or deformation sensitivity can be improved, according to further non-limiting aspects, wherein offset resulting bending of a package associated with the MEMS device can be enhanced by employing one or more of an exemplary stress isolation frame 1202, along with exemplary drive shuttles 1020, 1022, 1024, 1026, etc., as described herein.

FIG. 12 further depicts exemplary drive-sense combs 1204, which can be configured to detect drive motion. Note that, while exemplary drive sense combs 1204 are depicted as coupled to GY or frame gyroscope components, GY proof masses (e.g., GY proof masses 1004, 1006, 1008, 1010), in non-limiting embodiments, in further non-limiting embodiments, exemplary drive sense combs 1204 can be coupled to other of the various components of the exemplary gyroscope architecture 1000, including, but not limited to, one or more of the four exemplary drive shuttles 1020, 1022, 1024, 1026, etc. FIG. 12 further depicts exemplary drive combs 1206, which can be coupled to the exemplary drive shuttles 1020, 1022, 1024, 1026 to generate the drive force at the drive frequency, and which can result in the drive motions of the respective various components of exemplary gyroscope architecture 1000, as described above regarding FIGS. 10-11. In addition, FIG. 12 depicts further capacitive electrodes 1208 that can be configured to respectively detect motions of respective GZ proof masses (e.g., GZ proof masses 1028, 1030, 1032, 1034), as further described above regarding FIGS. 10-11.

Figure 13:
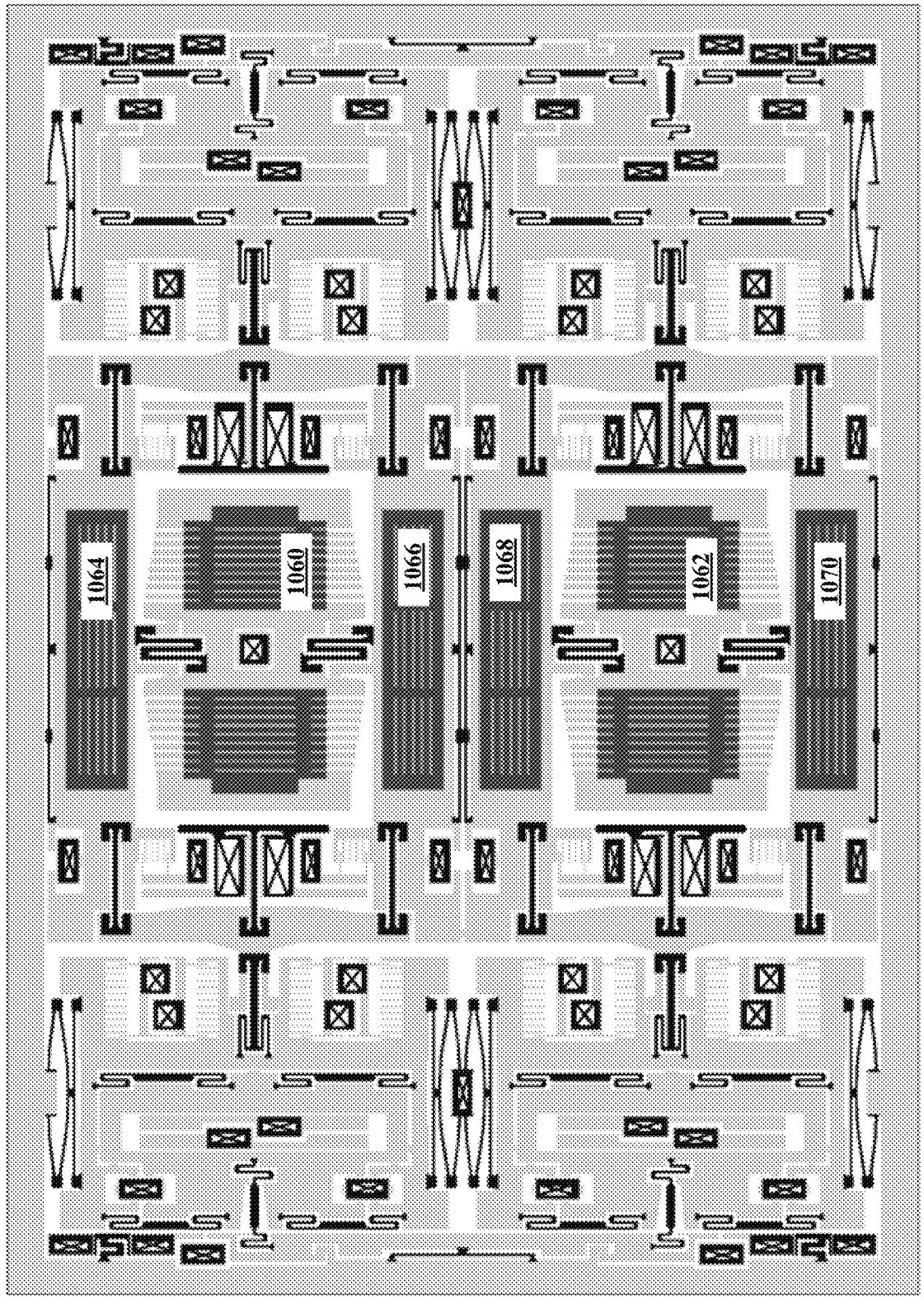
FIG. 13 depicts still further exemplary aspects of non-limiting embodiments of an exemplary gyroscope architecture.

FIG. 13 depicts still further exemplary aspects of non-limiting embodiments of an exemplary gyroscope architecture 1000. For instance, FIG. 13 depicts relative locations of exemplary capacitive electrodes 1060, 1062, 1064, 1066, 1068, 1070, in the depiction of FIG. 12, which can be configured to primarily facilitate detection of Coriolis forces acting on respective proof masses as a result of angular velocity associated with the MEMS device about respective axes (e.g., X or Y axes), for example, as further described above regarding FIG. 10.

Figure 14:
FIG. 14 depicts still further exemplary aspects of non-limiting embodiments of an exemplary gyroscope architecture.
Figure 15:
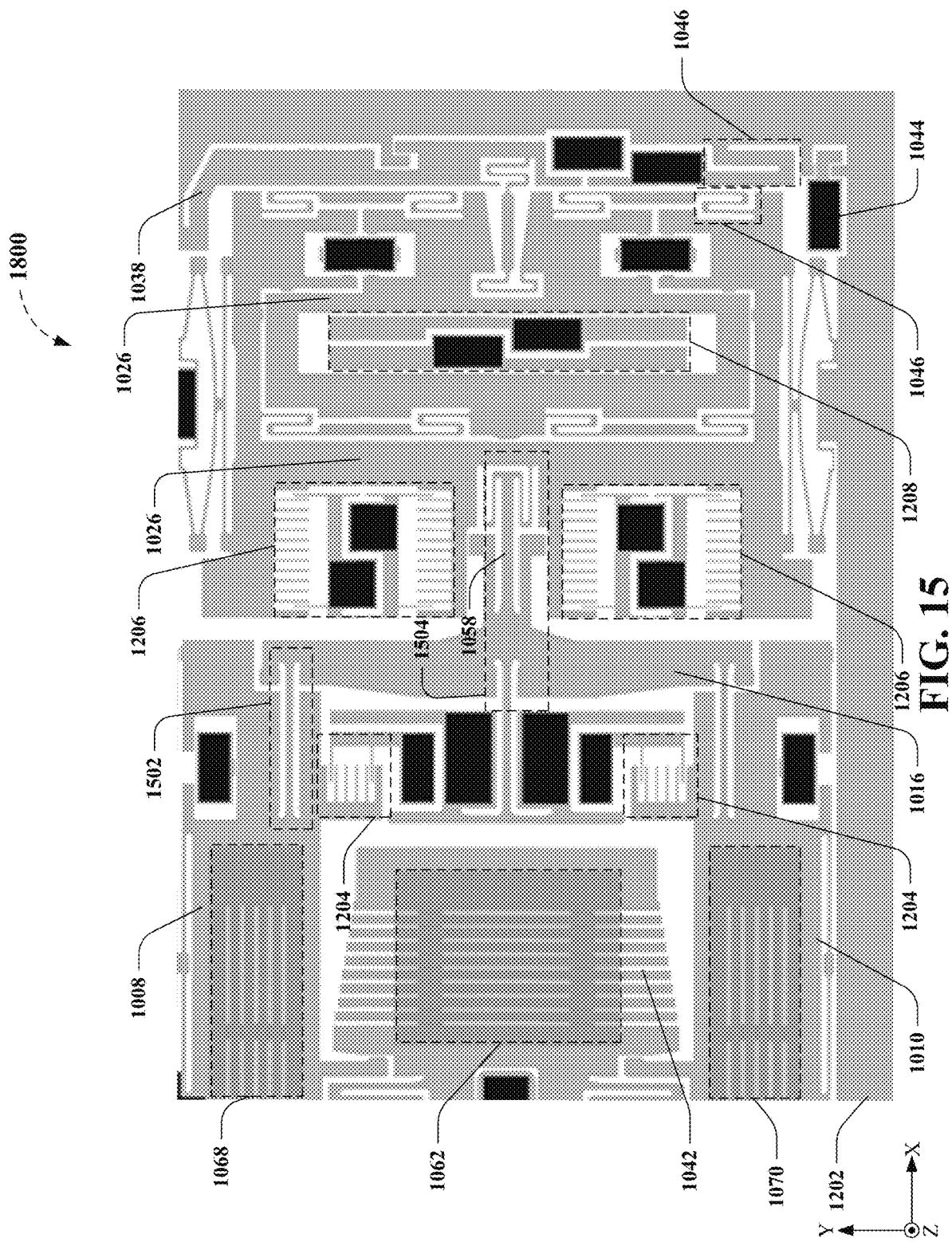
FIG. 15 depicts still further exemplary aspects of non-limiting embodiments of an exemplary gyroscope architecture.
Figure 16:
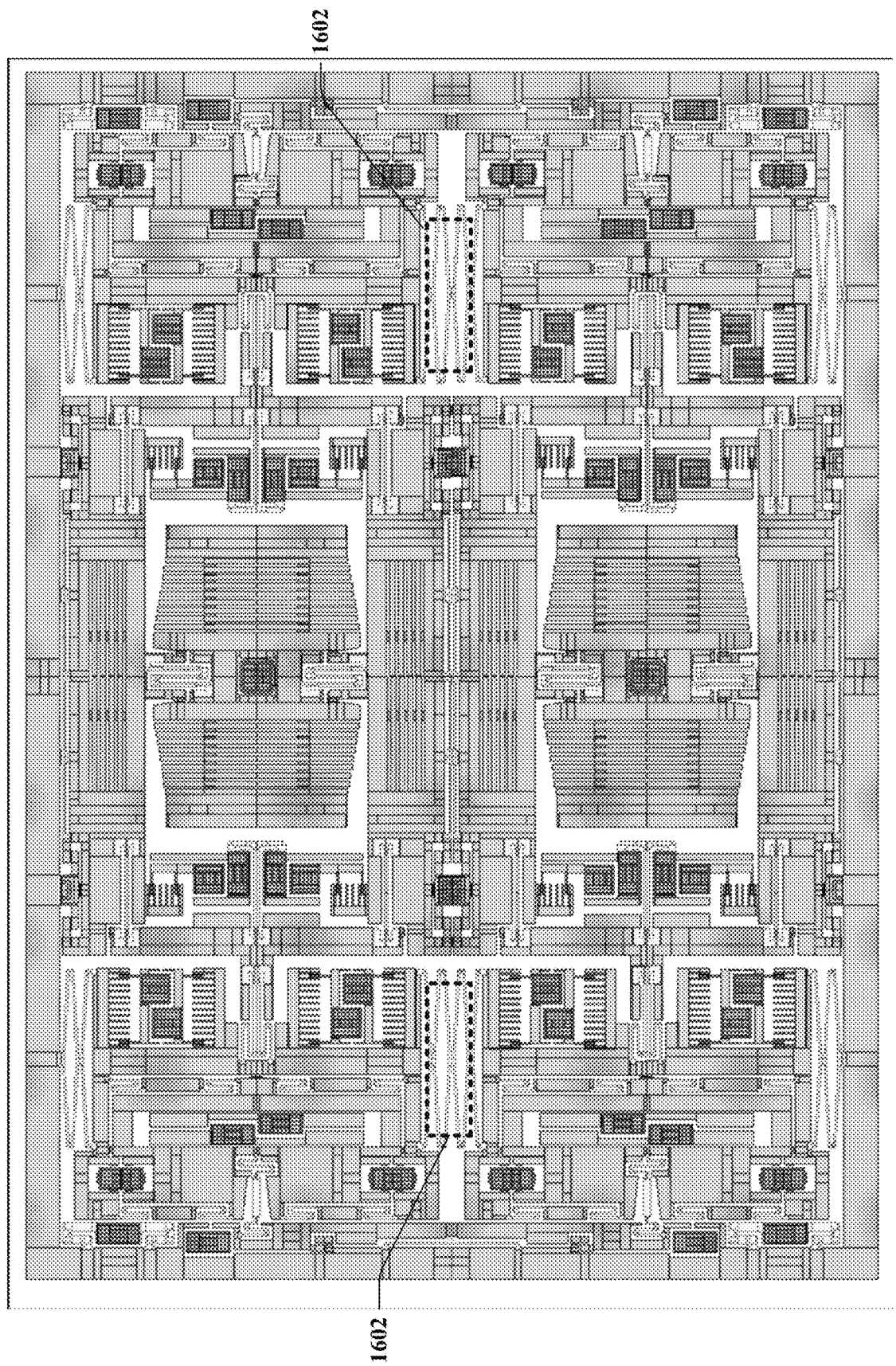
FIG. 16 depicts yet another non-limiting embodiment of an exemplary gyroscope architecture, according to non-limiting aspects of the subject disclosure.

FIG. 14 depicts still further exemplary aspects of non-limiting embodiments of an exemplary gyroscope architecture 1000. Note that in FIG. 14, anchor 1044 locations are depicted as black boxes, instead of as in FIGS. 10-13. FIG. 14 depicts inset 1402, which is further described, regarding FIG. 15. For example, FIG. 15 depicts still further exemplary aspects of non-limiting embodiments of an exemplary gyroscope architecture 1000. FIG. 15 depicts the relative locations and configurations of various components of exemplary gyroscope architecture 1000, as depicted in FIGS. 10-14, for inset 1402. FIG. 16 depicts yet another non-limiting embodiment of an exemplary gyroscope architecture 1000, according to non-limiting aspects of the subject disclosure. Note the lack of anchor 1044 between respective pairs of exemplary drive shuttles 1020, 1022, 1024, 1026 (e.g., in region 1602). Note further the fabrication design of the coupling mechanisms at 1502 and 1504, which corresponds respectively to construction of a functional translating pivot point 1050 and a functional fixed pivot point 1048, as described above regarding FIG. 15.

Figure 17:
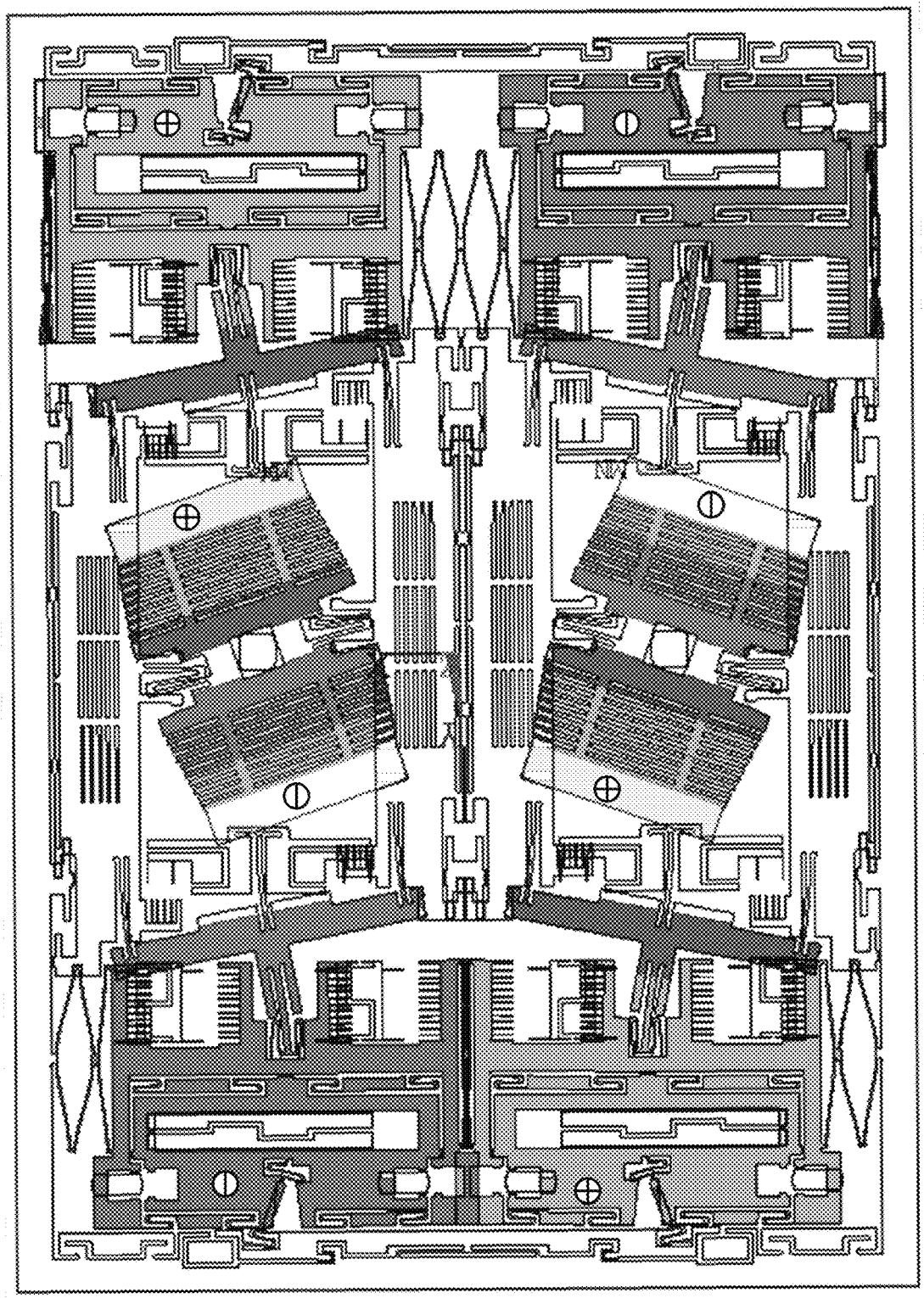
FIG. 17 depicts an exemplary drive mode shape of a non-limiting embodiment of an exemplary gyroscope architecture, according to further non-limiting aspects described herein.

FIG. 17 depicts an exemplary drive mode shape of a non-limiting embodiment of an exemplary gyroscope architecture 1000, according to further non-limiting aspects described herein. As depicted in FIG. 11, drive motion applied via the four exemplary drive shuttles 1020, 1022, 1024, 1026 as described above result in deflection and translation of the various components of exemplary gyroscope architecture 1000, as described herein. FIG. 17 depicts the relative displacement above and below X-Y plane, where the "+" symbol indicates above plane X-Y plane displacement and the "−" symbol indicates below plane displacement, in lieu of color heat map or adequate grey scale resolution. It can be seen in FIG. 17 from the relative lack of displacement of the in-plane motion components (GZ), which are separated from the out-of-plane motion components (GX, GY) by connecting the out-of-plane motion components (GX, GY) with the flexible coupling mechanisms via drive shuttles, various embodiments as described herein can be configured to constrain transmission of the out-of-plane motion components (GX, GY) to the in plain motion components (GZ) (drive shuttle, Z proof masses), and, thus, the transmission of the levitation force associated with the out-of-plane motion components (GX, GY) can be minimized.

Figure 18:
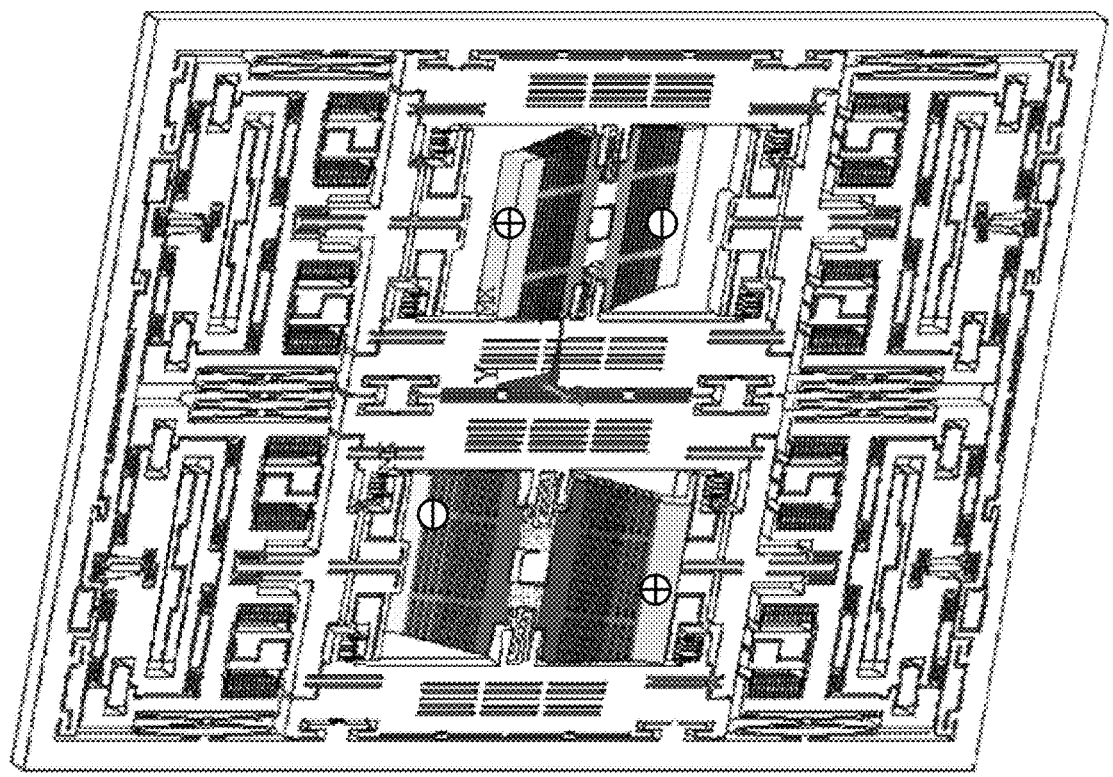
FIG. 18 depicts an exemplary GX mode shape of a non-limiting embodiment of an exemplary gyroscope architecture, according to still further non-limiting aspects described herein.

FIG. 18 depicts an exemplary GX mode shape of a non-limiting embodiment of an exemplary gyroscope architecture 1000, according to still further non-limiting aspects described herein. FIG. 18 depicts the relative displacement above and below X-Y plane, where the "+" symbol indicates above plane X-Y plane displacement and the "−" symbol indicates below plane displacement, in lieu of color heat map or adequate grey scale resolution. It can be seen in FIG. 18, that the GX, CPM, or paddle gyroscope sense mode is a balanced sense mode, where each of the GX proof masses are in anti-phase motion, but not angular momentum balanced, as further depicted in FIG. 21. It is noted that differential rejection (e.g., electrical rejection) can be employed to minimize effects of angular vibration on the GX, CPM, or paddle gyroscope sense mode, in a further non-limiting aspect.

Figure 19:
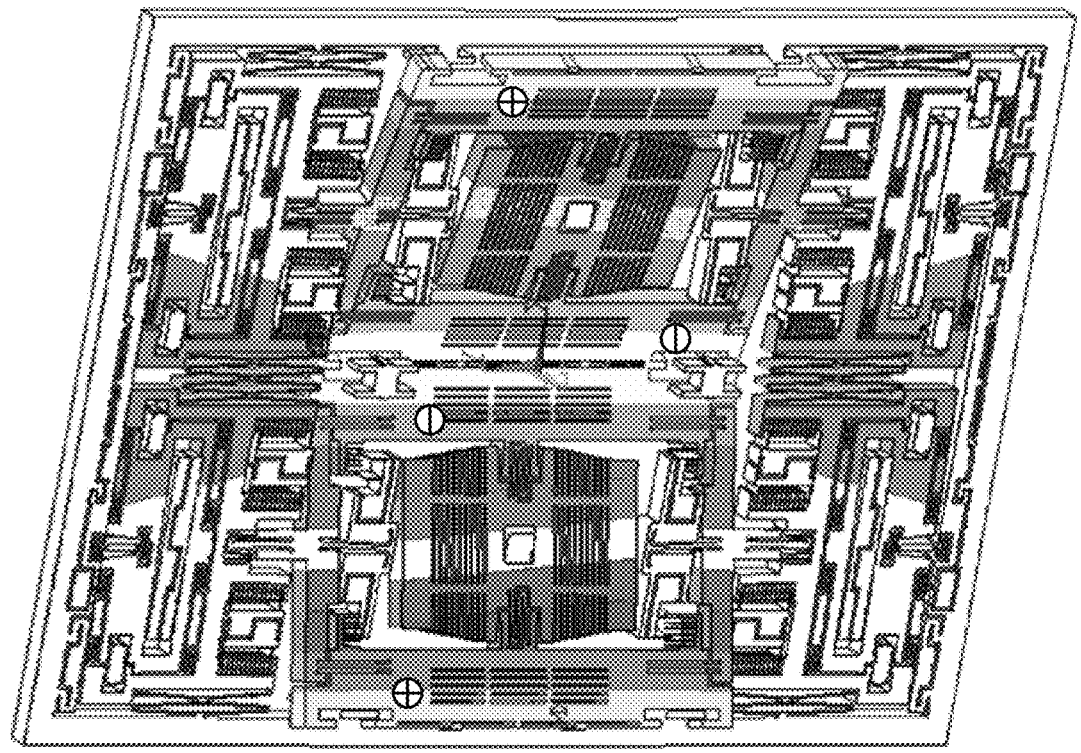
FIG. 19 depicts an exemplary GY mode shape of a non-limiting embodiment of an exemplary gyroscope architecture, according to still further non-limiting aspects described herein.

FIG. 19 depicts an exemplary GY mode shape of a non-limiting embodiment of an exemplary gyroscope architecture, according to still further non-limiting aspects described herein. FIG. 19 depicts the relative displacement above and below X-Y plane, where the "+" symbol indicates above plane X-Y plane displacement and the "−" symbol indicates below plane displacement, in lieu of color heat map or adequate grey scale resolution. It can be seen in FIG. 19, that GY or frame gyroscope sense mode is a balanced sense mode, where each of the GY proof masses are in anti-phase motion (e.g., both linear and angular momentum balanced). It can be further seen in FIG. 19 from the relative lack of displacement of the in-plane motion components (GZ), which are separated from the out-of-plane motion components (GX, GY) by connecting the out-of-plane motion components (GX, GY) with the flexible coupling mechanisms via drive shuttles, various embodiments as described herein can be configured to constrain transmission of the out-of-plane motion components (GX, GY) to the in-plane motion components (GZ) (drive shuttle, Z proof masses), and, thus, the transmission of the levitation force associated with the out-of-plane motion components (GX, GY) can be minimized.

Figure 20:
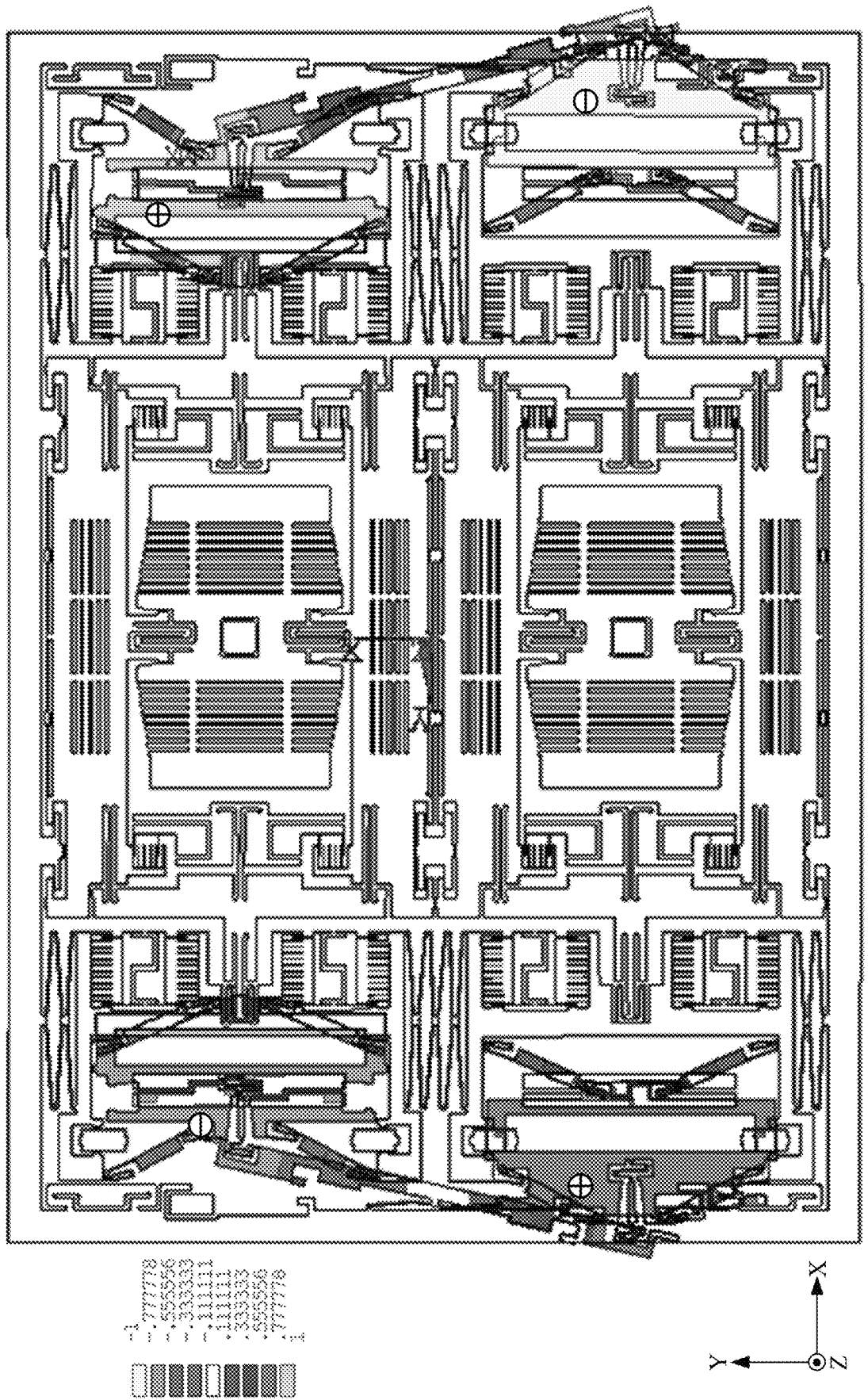
FIG. 20 depicts an exemplary GZ sense mode shape of a non-limiting embodiment of an exemplary gyroscope architecture, according to non-limiting aspects described herein.

FIG. 20 depicts an exemplary GZ sense mode shape of a non-limiting embodiment of an exemplary gyroscope architecture, according to non-limiting aspects described herein. FIG. 20 depicts the relative displacement in the X-Y plane, where the "+" symbol indicates one direction of X-Y plane displacement and the "−" symbol indicates opposite direction in-plane displacement, in lieu of color heat map or adequate grey scale resolution. It can be seen in FIG. 20, that the GZ gyroscope sense mode is a balanced sense mode, where each of the GX proof masses are in anti-phase motion, but not angular momentum balanced, as further depicted in FIG. 22. It is noted that differential rejection (e.g., electrical rejection) can be employed to minimize effects of angular vibration on the GZ sense mode, in a further non-limiting aspect.

FIG. 21 depicts an exemplary GX mode (center proof mass (CPM) parasitic mode shape of a non-limiting embodiment of an exemplary gyroscope architecture, according to still further non-limiting aspects. FIG. 21 depicts the relative displacement in the X-Y plane, where the "+" symbol indicates one direction of X-Y plane displacement and the "−" symbol indicates opposite direction in-plane displacement, in lieu of color heat map or adequate grey scale resolution. It can be seen in FIG. 21, that the GX, CPM, or paddle gyroscope has an unbalanced mode or parasitic mode, where each of the GX proof masses are in not anti-phase motion.

FIG. 22 depicts an exemplary GZ parasitic mode shape of a non-limiting embodiment of an exemplary gyroscope architecture, according to still further non-limiting aspects described herein. FIG. 22 depicts the relative displacement above and below X-Y plane, where the "+" symbol indicates above plane X-Y plane displacement and the "−" symbol indicates below plane displacement, in lieu of color heat map or adequate grey scale resolution. It can be seen in FIG. 22, that the GZ gyroscope has an unbalanced mode or parasitic mode, where each of the GZ proof masses are in not anti-phase motion.

Accordingly, exemplary non-limiting embodiments can comprise a 3-axis Coriolis vibratory rate gyroscope, in a roughly 2 dimensional device architecture, with the geometry largely being flat, and capable of being fabricated in silicon. In non-limiting aspects, exemplary embodiments as described herein can comprise two GY (e.g., frame) gyroscopes, wherein frame gyroscopes facilitate GY sense mode and drive system coupling, two GX, center proof mass, or paddle gyroscopes, four drive shuttles coupled to the two frame gyroscopes, four GZ proof masses coupled to the drive shuttles, and/or two lever arms that facilitate coupling GZ proof masses. In still further non-limiting aspects, various exemplary embodiments can be configured such that components can be removed from an exemplary overall architecture to fabricate a single axis or two axis gyroscope and/or can be configured such that a number of proof-masses can be reduced in half from an exemplary overall architecture to fabricate a half-gyroscope, as further described herein.

Figure 23:
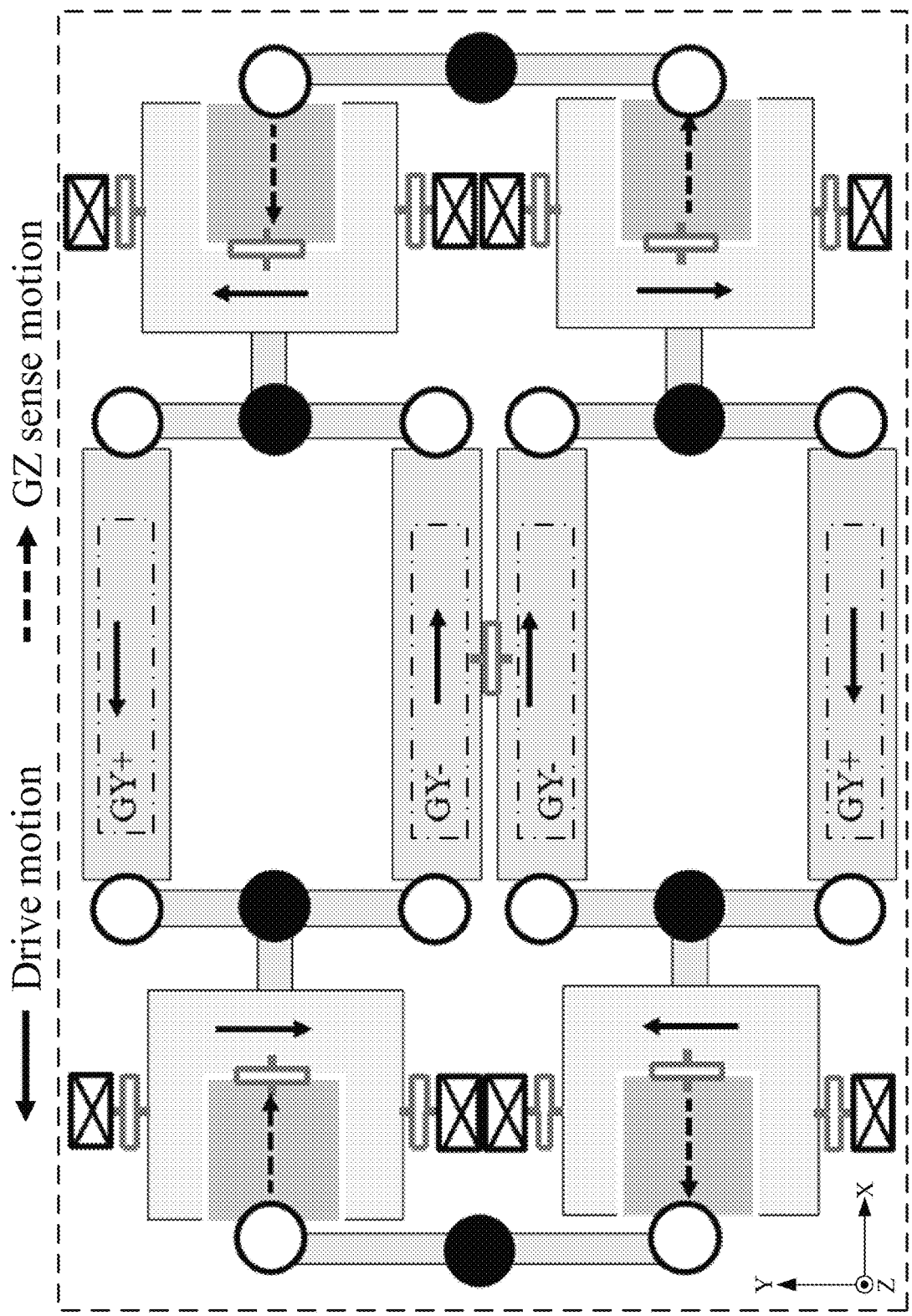
FIG. 23 illustrates a functional block diagram of other non-limiting embodiments of an exemplary gyroscope architecture, according to further non-limiting aspects of the subject disclosure.

For example, FIG. 23 illustrates a functional block diagram of other non-limiting embodiments of an exemplary gyroscope architecture 1000, according to further non-limiting aspects of the subject disclosure. For instance, according to a non-limiting aspect, an exemplary 3-axis (e.g., GX, GY, and GZ) gyroscope architecture 1000 can be reduced to a 2-axis or 1-axis gyroscope by removing components from the architecture, employing fewer sense transducers, etc., and exemplary gyroscope architectures as described herein can be functionally cut in half to create a more compact 3-axis (e.g., GX, GY, and GZ) gyroscope, by forgoing drive and/or sense balanced aspects of the exemplary 3-axis (e.g., GX, GY, and GZ) gyroscope architectures. For instance, as depicted in FIG. 23, two GX, center proof mass, or paddle gyroscopes can be omitted from the fabrication to yield a 2-axis gyroscope. In other non-limiting aspects, GY electrodes capacitive electrodes 1064, 1066, 1068, 1070 can be omitted from the fabrication or electrical connection, such that variants of exemplary gyroscope architecture 1000 could yield a 1-axis gyroscope. Other variants can include omission of the GZ proof masses to yield a 2-axis, X-Y gyroscope with drive system coupled to the GY or frame gyros.

Figure 24:
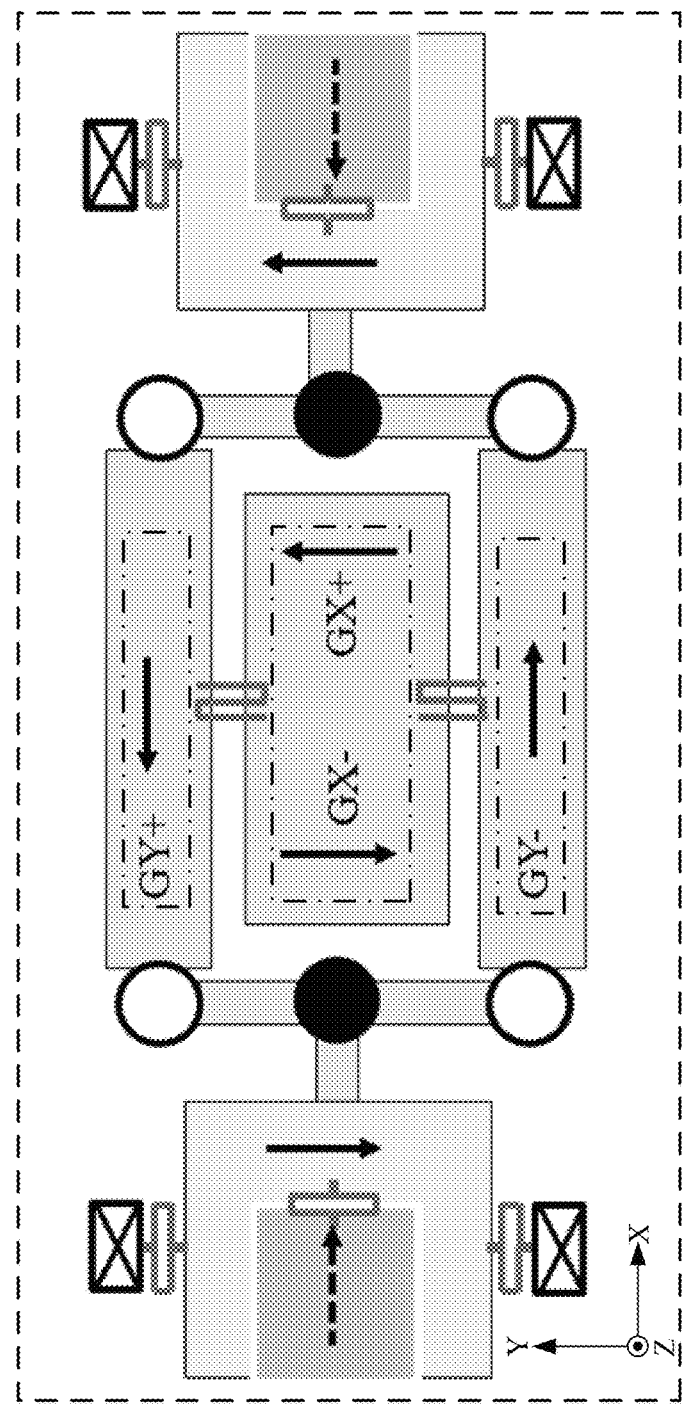
FIG. 24 illustrates another functional block diagram of still other non-limiting embodiments of an exemplary gyroscope architecture, according to further non-limiting aspects of the subject disclosure.

In another non-limiting example, FIG. 24 illustrates another functional block diagram of still other non-limiting embodiments of an exemplary gyroscope architecture 1000, according to further non-limiting aspects of the subject disclosure. For instance, exemplary gyroscope architecture 1000 could yield a more compact but non-balanced drive and sense 3-axis gyroscope by omitted one half of the components of exemplary gyroscope architecture 1000 and coupling mechanisms or lever arms 1036, 1038.

Accordingly, in other non-limiting implementations, an exemplary MEMS device (e.g., comprising exemplary gyroscope architecture 1000, or portions thereof) comprising one or more frame gyroscope (e.g., GY or frame gyroscope comprising two GY proof masses 1004, 1006, 1008, 1010, etc.) configured to sense a first component of angular velocity associated with the MEMS device (e.g., comprising exemplary gyroscope architecture 1000, or portions thereof) around a first axis (e.g., Y axis), for example, as described herein. As further described herein, an exemplary MEMS device (e.g., comprising exemplary gyroscope architecture 1000, or portions thereof) can further comprise two or more drive shuttles (e.g., of drive shuttles 1020, 1022, 1024, 1026) comprising respective guided masses and coupled to the one or more frame gyroscope (e.g., GY or frame gyroscope comprising two GY proof masses 1004, 1006, 1008, 1010, etc.).

An exemplary MEMS device (e.g., comprising exemplary gyroscope architecture 1000, or portions thereof) can further comprise, two or more proof masses (e.g., of GZ proof masses 1028, 1030, 1032, 1034) coupled with respective ones of the two or more drive shuttles (e.g., of drive shuttles 1020, 1022, 1024, 1026) and configured to sense a second component of angular velocity associated with the MEMS device (e.g., comprising exemplary gyroscope architecture 1000, or portions thereof) around a second axis (e.g., Z axis) that is orthogonal to the first axis (e.g., Y axis), wherein the two or more drive shuttles (e.g., of drive shuttles 1020, 1022, 1024, 1026) can be constrained to not respond to angular velocity (e.g., via one or more of drive shuttles 1020, 1022, 1024, 1026, via one or more coupling 1052, 1054, 1056, 1058, and/or combinations thereof) associated with the MEMS device (e.g., comprising exemplary gyroscope architecture 1000, or portions thereof) around the first axis (e.g., Y axis) and the second axis (e.g., Z axis).

In addition, an exemplary MEMS device (e.g., comprising exemplary gyroscope architecture 1000, or portions thereof) as described herein can further comprise one or more paddle gyroscope (e.g., GX, CPM, or paddle gyroscopes that can each comprise one of GX proof mass GX proof mass 1040, 1042) coupled to respective ones of the one or more frame gyroscope (e.g., GY or frame gyroscope comprising two GY proof masses 1004, 1006, 1008, 1010, etc.) and configured to sense a third component of angular velocity associated with the MEMS device (e.g., comprising exemplary gyroscope architecture 1000, or portions thereof) around a third axis (e.g., X axis) that is orthogonal to the first axis (e.g., Y axis) and the second axis (e.g., Z axis). As a non-limiting example, exemplary MEMS device (e.g., comprising exemplary gyroscope architecture 1000, or portions thereof) can be configured to operate as one or more of a two axis gyroscope or a three axis gyroscope, as further described above, regarding FIGS. 23-24. In a further non-limiting example, an exemplary MEMS device (e.g., comprising exemplary gyroscope architecture 1000, or portions thereof) can comprise two frame gyroscopes (e.g., two GY or frame gyroscopes, each comprising two of GY proof masses 1004, 1006, 1008, 1010, etc.), can comprise four drive shuttles (e.g., drive shuttles 1020, 1022, 1024, 1026) comprising the respective guided masses and coupled (e.g., via respective coupling 1052, 1054, 1056, 1058) to associated ones of the two frame gyroscopes (e.g., two GY or frame gyroscopes, each comprising two of GY proof masses 1004, 1006, 1008, 1010, etc.), and can comprise four proof masses (e.g., GZ proof masses 1028, 1030, 1032, 1034) coupled with respective ones of the four drive shuttles (e.g., drive shuttles 1020, 1022, 1024, 1026), as described above regarding FIGS. 10-16, for example.

In a further non-limiting aspect of exemplary MEMS device (e.g., comprising exemplary gyroscope architecture 1000, or portions thereof), ones of respective pairs of the four drive shuttles (e.g., drive shuttles 1020, 1022, 1024, 1026) can be coupled to each other via one or more spring. In still another non-limiting aspect of exemplary MEMS device (e.g., comprising exemplary gyroscope architecture 1000, or portions thereof), the two frame gyroscopes (e.g., two GY or frame gyroscopes, each comprising two of GY proof masses 1004, 1006, 1008, 1010, etc.) can be further configured to couple two paddle gyroscopes (e.g., GX, CPM, or paddle gyroscopes that can each comprise one of GX proof mass GX proof mass 1040, 1042) of the one or more paddle gyroscope (e.g., GX, CPM, or paddle gyroscopes that can each comprise one of GX proof mass GX proof mass 1040, 1042) to the four drive shuttles (e.g., drive shuttles 1020, 1022, 1024, 1026), as further described herein. In addition, further exemplary embodiments of MEMS device (e.g., comprising exemplary gyroscope architecture 1000, or portions thereof) can comprise the two frame gyroscopes (e.g., two GY or frame gyroscopes, each comprising two of GY proof masses 1004, 1006, 1008, 1010, etc.), which can be coupled to each other and can be configured to facilitate constraining a motion associated with the two frame gyroscopes (e.g., two GY or frame gyroscopes, each comprising two of GY proof masses 1004, 1006, 1008, 1010, etc.) into a first condition of linear momentum balance.

In further non-limiting implementations, exemplary MEMS device (e.g., comprising exemplary gyroscope architecture 1000, or portions thereof) can further comprise two coupling mechanisms (e.g., coupling mechanisms or lever arms 1036, 1038) coupled to respective pairs of the four proof masses (e.g., GZ proof masses 1028, 1030, 1032, 1034) and configured to force the respective pairs of the four proof masses (e.g., GZ proof masses 1028, 1030, 1032, 1034) into anti-phase motion as a result of the second component of angular velocity associated with the MEMS device (e.g., comprising exemplary gyroscope architecture 1000, or portions thereof) around the second axis (e.g., Z axis). In a non-limiting aspect of exemplary MEMS device (e.g., comprising exemplary gyroscope architecture 1000, or portions thereof), the two coupling mechanisms (e.g., coupling mechanisms or lever arms 1036, 1038) can be configured to facilitate constraining the anti-phase motion associated with the four proof masses (e.g., GZ proof masses 1028, 1030, 1032, 1034) into a second condition of linear momentum balance.

In another non-limiting aspect of exemplary MEMS device (e.g., comprising exemplary gyroscope architecture 1000, or portions thereof), a motion associated with the four proof masses (e.g., GZ proof masses 1028, 1030, 1032, 1034) can be decoupled from out-of-plane motion associated with the two frame gyroscopes (e.g., two GY or frame gyroscopes, each comprising two of GY proof masses 1004, 1006, 1008, 1010, etc.) via respective flexible couplings (e.g., via respective coupling 1052, 1054, 1056, 1058) and the four drive shuttles (e.g., drive shuttles 1020, 1022, 1024, 1026), wherein the out-of-plane motion is defined with reference to a plane comprising the first axis (e.g., Y axis) and the third axis (e.g., X axis).

In a further non-limiting aspect of exemplary MEMS device (e.g., comprising exemplary gyroscope architecture 1000, or portions thereof), the two or more drive shuttles (e.g., of drive shuttles 1020, 1022, 1024, 1026) can be configured to force the two or more proof masses (e.g., of GZ proof masses 1028, 1030, 1032, 1034) into oscillation.

In yet another non-limiting aspect of exemplary MEMS device (e.g., comprising exemplary gyroscope architecture 1000, or portions thereof), the one or more of a set of the two or more drive shuttles (e.g., of drive shuttles 1020, 1022, 1024, 1026) or a set of the one or more frame gyroscope (e.g., GY or frame gyroscope comprising two GY proof masses 1004, 1006, 1008, 1010, etc.) can be configured to sense drive motion associated with the oscillation. In another non-limiting aspect of exemplary MEMS device (e.g., comprising exemplary gyroscope architecture 1000, or portions thereof), the one or more of the set of the two or more drive shuttles (e.g., of drive shuttles 1020, 1022, 1024, 1026) or the set of the one or more frame gyroscope (e.g., GY or frame gyroscope comprising two GY proof masses 1004, 1006, 1008, 1010, etc.) can be configured to excite the drive motion associated with the oscillation via a set of drive combs (e.g., one or more drive comb 1206). In addition, in yet another non-limiting aspect of exemplary MEMS device (e.g., comprising exemplary gyroscope architecture 1000, or portions thereof), the two or more drive shuttles (e.g., of drive shuttles 1020, 1022, 1024, 1026) can be configured to move in anti-phase drive motion and can be configured to transmit the anti-phase drive motion to the one or more frame gyroscope (e.g., GY or frame gyroscope comprising two GY proof masses 1004, 1006, 1008, 1010, etc.) via one or more flexible coupling (e.g., one or more coupling 1052, 1054, 1056, 1058) configured to minimize transmission of motion, which is orthogonal to the anti-phase drive motion, of the one or more frame gyroscope (e.g., GY or frame gyroscope comprising two GY proof masses 1004, 1006, 1008, 1010, etc.) to the two or more drive shuttles (e.g., of drive shuttles 1020, 1022, 1024, 1026).

In still further non-limiting implementations, exemplary MEMS device (e.g., comprising exemplary gyroscope architecture 1000, or portions thereof) can further comprise a stress isolation frame (e.g., stress isolation frame 1202) coupled to the MEMS device (e.g., comprising exemplary gyroscope architecture 1000, or portions thereof) that can be configured to reject stress transmitted from a package associated with the MEMS device (e.g., comprising exemplary gyroscope architecture 1000, or portions thereof) to the MEMS device (e.g., comprising exemplary gyroscope architecture 1000, or portions thereof).

Accordingly, in still other non-limiting implementations, exemplary MEMS device (e.g., comprising exemplary gyroscope architecture 1000, or portions thereof) can comprise two frame gyroscopes (e.g., two GY or frame gyroscopes, each comprising two of GY proof masses 1004, 1006, 1008, 1010, etc.) configured to sense a first component of angular velocity associated with the MEMS device (e.g., comprising exemplary gyroscope architecture 1000, or portions thereof) around a first axis (e.g., Y axis), for example, as described herein regarding FIGS. 10-16.

In further non-limiting implementations, exemplary MEMS device (e.g., comprising exemplary gyroscope architecture 1000, or portions thereof) can further comprise four drive shuttles (e.g., drive shuttles 1020, 1022, 1024, 1026) comprising respective guided masses and coupled (e.g., via respective coupling 1052, 1054, 1056, 1058) to associated ones of the two frame gyroscopes (e.g., two GY or frame gyroscopes, each comprising two of GY proof masses 1004, 1006, 1008, 1010, etc.), wherein the four drive shuttles (e.g., drive shuttles 1020, 1022, 1024, 1026) can be configured to move in anti-phase drive motion and can be configured to transmit the anti-phase drive motion to the two frame gyroscopes (e.g., two GY or frame gyroscopes, each comprising two of GY proof masses 1004, 1006, 1008, 1010, etc.) via a set of flexible couplings configured to minimize transmission of motion, which is orthogonal to the anti-phase drive motion, of the two frame gyroscopes (e.g., two GY or frame gyroscopes, each comprising two of GY proof masses 1004, 1006, 1008, 1010, etc.) to the four drive shuttles (e.g., drive shuttles 1020, 1022, 1024, 1026), as further described herein.

In addition, exemplary MEMS device (e.g., comprising exemplary gyroscope architecture 1000, or portions thereof) can further comprise four proof masses (e.g., GZ proof masses 1028, 1030, 1032, 1034) coupled with respective ones of the four drive shuttles (e.g., drive shuttles 1020, 1022, 1024, 1026) and configured to sense a second component of angular velocity associated with the MEMS device (e.g., comprising exemplary gyroscope architecture 1000, or portions thereof) around a second axis (e.g., Z axis) that is orthogonal to the first axis (e.g., Y axis).

Moreover, exemplary MEMS device (e.g., comprising exemplary gyroscope architecture 1000, or portions thereof) can further comprise two paddle gyroscopes (e.g., GX, CPM, or paddle gyroscopes that can each comprise one of GX proof mass GX proof mass 1040, 1042) coupled to respective ones of the two frame gyroscopes (e.g., two GY or frame gyroscopes, each comprising two of GY proof masses 1004, 1006, 1008, 1010, etc.) and configured to sense a third component of angular velocity associated with the MEMS device (e.g., comprising exemplary gyroscope architecture 1000, or portions thereof) around a third axis (e.g., X axis) that is orthogonal to the first axis (e.g., Y axis) and the second axis (e.g., Z axis). As a non-limiting example of exemplary MEMS device (e.g., comprising exemplary gyroscope architecture 1000, or portions thereof), ones of respective pairs of the four drive shuttles (e.g., drive shuttles 1020, 1022, 1024, 1026) can be coupled to each other via one or more of one or more spring or one or more anchor to a substrate of the MEMS device (e.g., comprising exemplary gyroscope architecture 1000, or portions thereof). In a further non-limiting example of exemplary MEMS device (e.g., comprising exemplary gyroscope architecture 1000, or portions thereof), the two frame gyroscopes (e.g., two GY or frame gyroscopes, each comprising two of GY proof masses 1004, 1006, 1008, 1010, etc.) can be further configured to couple the two paddle gyroscopes (e.g., GX, CPM, or paddle gyroscopes that can each comprise one of GX proof mass GX proof mass 1040, 1042) to the four proof masses (e.g., GZ proof masses 1028, 1030, 1032, 1034).

As further described herein, exemplary MEMS device (e.g., comprising exemplary gyroscope architecture 1000, or portions thereof) can further comprise two coupling mechanisms (e.g., coupling mechanisms or lever arms 1036, 1038) coupled to respective pairs of the four proof masses (e.g., GZ proof masses 1028, 1030, 1032, 1034) that can be configured to force the respective pairs of the four proof masses (e.g., GZ proof masses 1028, 1030, 1032, 1034) into anti-phase motion as a result of the second component of angular velocity associated with the MEMS device (e.g., comprising exemplary gyroscope architecture 1000, or portions thereof) around the second axis (e.g., Z axis). In a non-limiting aspect of exemplary MEMS device (e.g., comprising exemplary gyroscope architecture 1000, or portions thereof), the four drive shuttles (e.g., drive shuttles 1020, 1022, 1024, 1026) can be configured to force the four proof masses (e.g., GZ proof masses 1028, 1030, 1032, 1034) into oscillation. In a non-limiting aspect of exemplary MEMS device (e.g., comprising exemplary gyroscope architecture 1000, or portions thereof), one or more of a set of the four drive shuttles (e.g., drive shuttles 1020, 1022, 1024, 1026) or a set of the two frame gyroscopes (e.g., two GY or frame gyroscopes, each comprising two of GY proof masses 1004, 1006, 1008, 1010, etc.) can be configured to sense drive motion associated with the oscillation. In addition, in another non-limiting aspect of exemplary MEMS device (e.g., comprising exemplary gyroscope architecture 1000, or portions thereof), the one or more of the set of the four drive shuttles (e.g., drive shuttles 1020, 1022, 1024, 1026) or the set of the two frame gyroscopes (e.g., two GY or frame gyroscopes, each comprising two of GY proof masses 1004, 1006, 1008, 1010, etc.) can be configured to excite drive motion associated with the oscillation via a set of drive combs (e.g., one or more drive comb 1206).

Other non-limiting implementations of exemplary MEMS device (e.g., comprising exemplary gyroscope architecture 1000, or portions thereof) can comprise a stress isolation frame (e.g., stress isolation frame 1202) coupled to the MEMS device (e.g., comprising exemplary gyroscope architecture 1000, or portions thereof) and configured to reject stress transmitted from a package associated with the MEMS device (e.g., comprising exemplary gyroscope architecture 1000, or portions thereof) to the MEMS device (e.g., comprising exemplary gyroscope architecture 1000, or portions thereof), for example, as further described herein.

Figure 25:
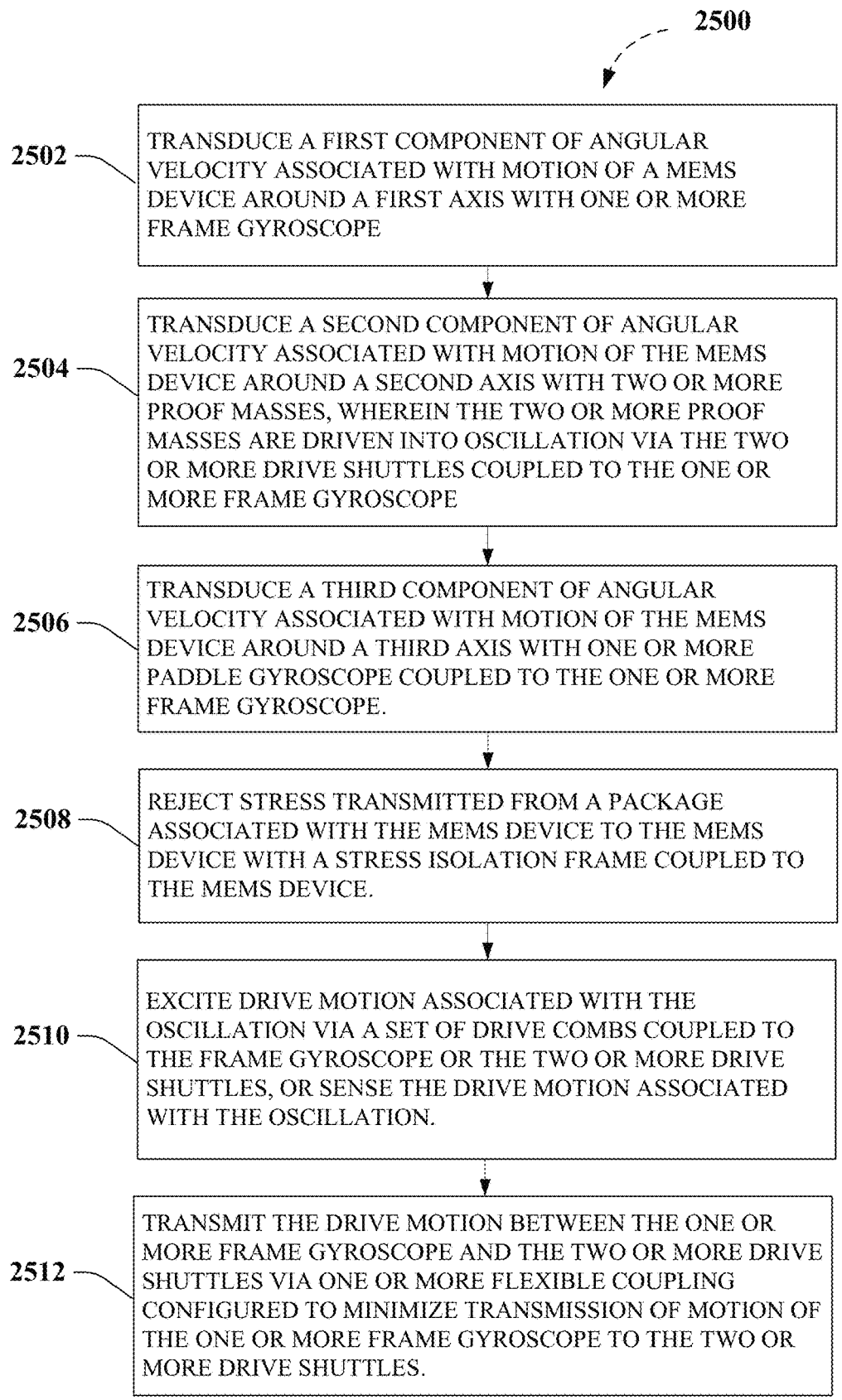
FIG. 25 depicts an exemplary flowchart of non-limiting methods associated with various embodiments described herein.
Figure 26:
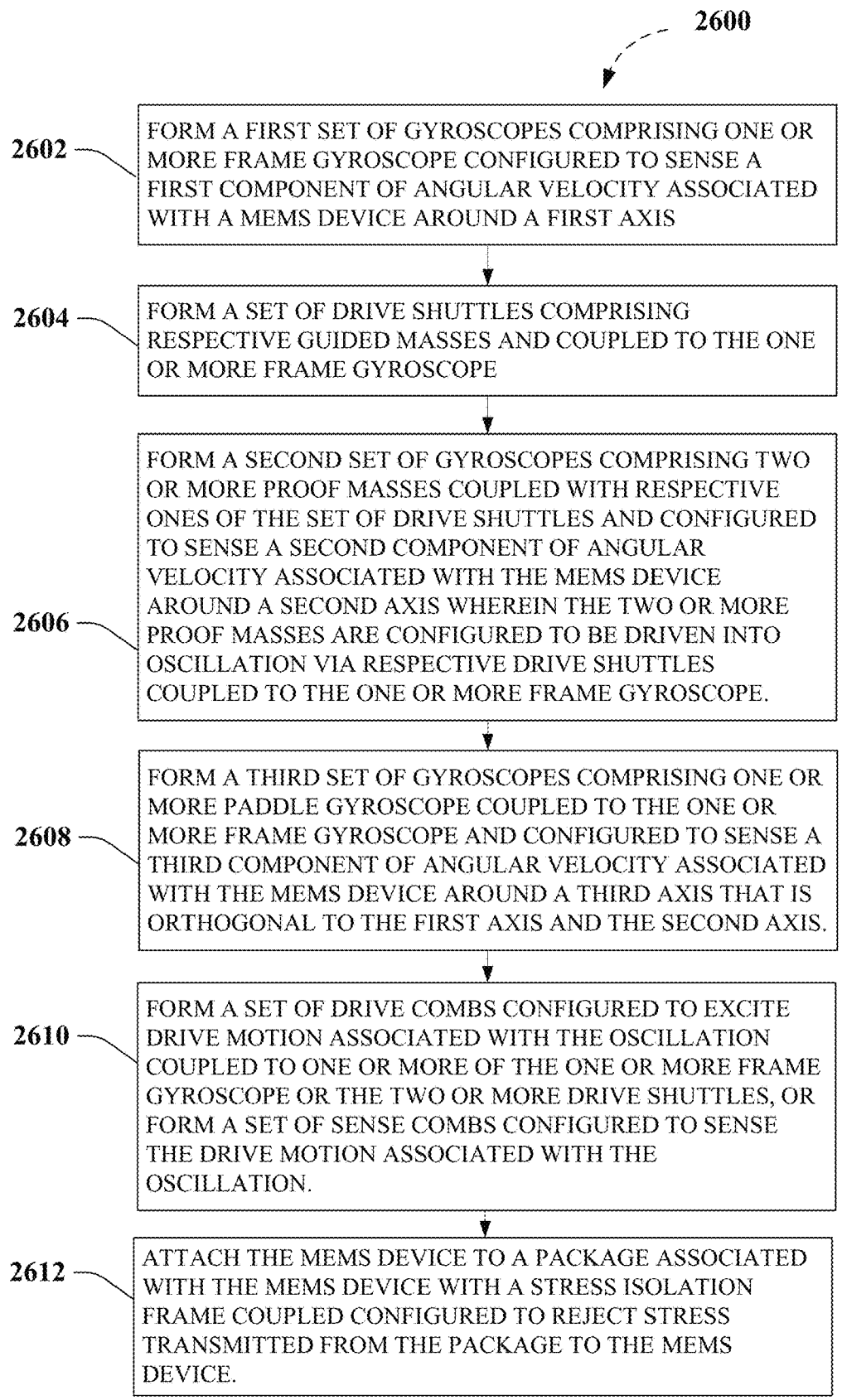
FIG. 26 depicts another exemplary flowchart of non-limiting methods associated with various embodiments described herein.

In view of the subject matter described supra, methods that can be implemented in accordance with the subject disclosure will be better appreciated with reference to the flowcharts of FIGS. 25-26. While for purposes of simplicity of explanation, the methods are shown and described as a series of blocks, it is to be understood and appreciated that such illustrations or corresponding descriptions are not limited by the order of the blocks, as some blocks may occur in different orders and/or concurrently with other blocks from what is depicted and described herein. Any non-sequential, or branched, flow illustrated via a flowchart should be understood to indicate that various other branches, flow paths, and orders of the blocks, can be implemented which achieve the same or a similar result. Moreover, not all illustrated blocks may be required to implement the methods described hereinafter.

Exemplary Methods

FIG. 25 depicts an exemplary flowchart of non-limiting methods 2500 associated with various embodiments described herein. As a non-limiting example, exemplary methods 2500 can comprise, at 2502, transducing a first component of angular velocity associated with motion of a MEMS device (e.g., comprising exemplary gyroscope architecture 1000, or portions thereof) around a first axis (e.g., Y axis) with one or more frame gyroscope (e.g., GY or frame gyroscope, comprising two of GY proof masses 1004, 1006, 1008, 1010, etc.), as described herein.

In a further non-limiting example, exemplary methods 2500 can comprise, at 2504, transducing a second component of angular velocity associated with motion of the MEMS device (e.g., comprising exemplary gyroscope architecture 1000, or portions thereof) around a second axis (e.g., Z axis) with two or more proof masses (e.g., GZ proof masses 1028, 1030, 1032, 1034), wherein the first axis (e.g., Y axis) and the second axis (e.g., Z axis) are orthogonal, and wherein the two or more proof masses (e.g., GZ proof masses 1028, 1030, 1032, 1034) are driven into oscillation via two or more drive shuttles (e.g., drive shuttles 1020, 1022, 1024, 1026) coupled (e.g., via respective coupling 1052, 1054, 1056, 1058) to the one or more frame gyroscope (e.g., GY or frame gyroscope, comprising two of GY proof masses 1004, 1006, 1008, 1010, etc.), and wherein the two or more drive shuttles (e.g., drive shuttles 1020, 1022, 1024, 1026) are configured to be constrained to a motion associated with the two or more drive shuttles (e.g., drive shuttles 1020, 1022, 1024, 1026) in a plane defined by the two or more drive shuttles (e.g., drive shuttles 1020, 1022, 1024, 1026).

Exemplary methods can further comprise, at 2506, transducing a third component of angular velocity associated with motion of the MEMS device (e.g., comprising exemplary gyroscope architecture 1000, or portions thereof) around a third axis (e.g., X axis) with one or more paddle gyroscope (e.g., GX, CPM, or paddle gyroscopes that can each comprise one of GX proof mass GX proof mass 1040, 1042) coupled to the one or more frame gyroscope (e.g., GY or frame gyroscope, comprising two of GY proof masses 1004, 1006, 1008, 1010, etc.), as further described herein.

In addition, exemplary methods can comprise, at 2508, rejecting stress transmitted from a package associated with the MEMS device (e.g., comprising exemplary gyroscope architecture 1000, or portions thereof) to the MEMS device (e.g., comprising exemplary gyroscope architecture 1000, or portions thereof) with a stress isolation frame (e.g., stress isolation frame 1202) coupled to the MEMS device (e.g., comprising exemplary gyroscope architecture 1000, or portions thereof). As a non-limiting example, exemplary methods can comprise forcing respective pairs of the two or more proof masses (e.g., GZ proof masses 1028, 1030, 1032, 1034), comprising four proof masses (e.g., GZ proof masses 1028, 1030, 1032, 1034), into anti-phase motion as a result of the second component of angular velocity applied to the MEMS device (e.g., comprising exemplary gyroscope architecture 1000, or portions thereof), via coupling mechanisms (e.g., coupling mechanisms or lever arms 1036, 1038) between the respective pairs.

Exemplary methods can further comprise, at 2510, exciting drive motion associated with the oscillation via a set of drive combs (e.g., one or more drive comb 1206) coupled to one or more of the one or more frame gyroscope (e.g., GY or frame gyroscope, comprising two of GY proof masses 1004, 1006, 1008, 1010, etc.) or the two or more drive shuttles (e.g., drive shuttles 1020, 1022, 1024, 1026) and/or sensing the drive motion (e.g., via one or more drive sense combs 1204) associated with the oscillation, as described above. As further described above, exemplary methods can comprise, at 2512, transmitting the drive motion between the one or more frame gyroscope (e.g., GY or frame gyroscope, comprising two of GY proof masses 1004, 1006, 1008, 1010, etc.) and the two or more drive shuttles (e.g., drive shuttles 1020, 1022, 1024, 1026) via one or more flexible coupling (e.g., via respective coupling 1052, 1054, 1056, 1058) configured to minimize transmission of motion, which is orthogonal to the motion associated with the two or more drive shuttles (e.g., drive shuttles 1020, 1022, 1024, 1026), of the one or more frame gyroscope (e.g., GY or frame gyroscope, comprising two of GY proof masses 1004, 1006, 1008, 1010, etc.) to the two or more drive shuttles (e.g., drive shuttles 1020, 1022, 1024, 1026).

FIG. 26 depicts another exemplary flowchart of non-limiting methods 2600 associated with various embodiments described herein. As a non-limiting example, exemplary methods 2600 can comprise, at 2602, forming a first set of gyroscopes comprising one or more frame gyroscope (e.g., GY or frame gyroscope, comprising two of GY proof masses 1004, 1006, 1008, 1010, etc.) configured to sense a first component of angular velocity associated with a MEMS device (e.g., comprising exemplary gyroscope architecture 1000, or portions thereof) around a first axis (e.g., Y axis), as describe herein.

Exemplary methods 2600 can further comprise, at 2604, forming a set of drive shuttles comprising respective guided masses and coupled (e.g., via respective coupling 1052, 1054, 1056, 1058) to the one or more frame gyroscope (e.g., GY or frame gyroscope, comprising two of GY proof masses 1004, 1006, 1008, 1010, etc.).

In addition, exemplary methods 2600 can further comprise, at 2606, forming a second set of gyroscopes comprising two or more proof masses (e.g., GZ proof masses 1028, 1030, 1032, 1034) coupled with respective ones of the set of drive shuttles (e.g., drive shuttles 1020, 1022, 1024, 1026) and configured to sense a second component of angular velocity associated with the MEMS device (e.g., comprising exemplary gyroscope architecture 1000, or portions thereof) around a second axis (e.g., Z axis), wherein the first axis (e.g., Y axis) and the second axis (e.g., Z axis) are orthogonal, and wherein the two or more proof masses (e.g., GZ proof masses 1028, 1030, 1032, 1034) are configured to be driven into oscillation via respective drive shuttles coupled (e.g., via respective coupling 1052, 1054, 1056, 1058) to the one or more frame gyroscope (e.g., GY or frame gyroscope, comprising two of GY proof masses 1004, 1006, 1008, 1010, etc.), as further described herein.

Exemplary methods 2600 can further comprise, at 2608, forming a third set of gyroscopes comprising one or more paddle gyroscope (e.g., GX, CPM, or paddle gyroscopes that can each comprise one of GX proof mass GX proof mass 1040, 1042) coupled to the one or more frame gyroscope (e.g., GY or frame gyroscope, comprising two of GY proof masses 1004, 1006, 1008, 1010, etc.) and configured to sense a third component of angular velocity associated with the MEMS device (e.g., comprising exemplary gyroscope architecture 1000, or portions thereof) around a third axis (e.g., X axis) that is orthogonal to the first axis (e.g., Y axis) and the second axis (e.g., Z axis).

At 2610, exemplary methods 2600 can further comprise forming a set of drive combs (e.g., one or more drive comb 1206) configured to excite drive motion associated with the oscillation coupled to one or more of the one or more frame gyroscope (e.g., GY or frame gyroscope, comprising two of GY proof masses 1004, 1006, 1008, 1010, etc.) or the two or more drive shuttles (e.g., drive shuttles 1020, 1022, 1024, 1026) and/or forming a set of sense combs (e.g., one or more drive sense combs 1204) configured to sense the drive motion associated with the oscillation. In addition, at 2612, exemplary methods 2600 can comprise attaching the MEMS device (e.g., comprising exemplary gyroscope architecture 1000, or portions thereof) to a package associated with the MEMS device (e.g., comprising exemplary gyroscope architecture 1000, or portions thereof) with a stress isolation frame (e.g., stress isolation frame 1202) configured to reject stress transmitted from the package to the MEMS device (e.g., comprising exemplary gyroscope architecture 1000, or portions thereof).

In further non-limiting implementations, exemplary methods can further comprise one or more of coupling the one or more paddle gyroscope (e.g., GX, CPM, or paddle gyroscopes that can each comprise one of GX proof mass GX proof mass 1040, 1042) to the two or more proof masses (e.g., GZ proof masses 1028, 1030, 1032, 1034) via the one or more frame gyroscope (e.g., GY or frame gyroscope, comprising two of GY proof masses 1004, 1006, 1008, 1010, etc.), forming the first set of gyroscopes comprising two frame gyroscopes (e.g., two GY or frame gyroscopes, each comprising two of GY proof masses 1004, 1006, 1008, 1010, etc.) configured to sense the first component of angular velocity associated with the MEMS device (e.g., comprising exemplary gyroscope architecture 1000, or portions thereof) around the first axis (e.g., Y axis), forming the set of drive shuttles comprising four drive shuttles (e.g., drive shuttles 1020, 1022, 1024, 1026) coupled (e.g., via respective coupling 1052, 1054, 1056, 1058) to the two frame gyroscopes (e.g., two GY or frame gyroscopes, each comprising two of GY proof masses 1004, 1006, 1008, 1010, etc.), forming the second set of gyroscopes comprising four proof masses (e.g., GZ proof masses 1028, 1030, 1032, 1034) configured to sense the second component of angular velocity associated with the MEMS device (e.g., comprising exemplary gyroscope architecture 1000, or portions thereof) around the second axis (e.g., Z axis), and/or forming the third set of gyroscopes comprising two paddle gyroscopes (e.g., GX, CPM, or paddle gyroscopes that can each comprise one of GX proof mass GX proof mass 1040, 1042) configured to sense the third component of angular velocity associated with the MEMS device (e.g., comprising exemplary gyroscope architecture 1000, or portions thereof) around the third axis (e.g., X axis), as further described herein.

What has been described above includes examples of the embodiments of the subject disclosure. While specific embodiments and examples are described in the subject disclosure for illustrative purposes, various modifications are possible that are considered within the scope of such embodiments and examples, as those skilled in the relevant art can recognize. It is, of course, not possible to describe every conceivable combination of configurations, components, and/or methods for purposes of describing the claimed subject matter, but it is to be appreciated that many further combinations and permutations of the various embodiments are possible. Thus, although the disclosed subject matter has been described in accordance with the embodiments shown, one of ordinary skill in the art will readily recognize that there could be variations to the embodiments and those variations would be within the spirit and scope of the disclosed subject matter. Accordingly, many modifications may be made by one of ordinary skill in the art without departing from the spirit and scope of the disclosed subject matter. As a result, the claimed subject matter is intended to embrace all such alterations, modifications, and variations that fall within the spirit and scope of the appended claims.

In addition, the words "example" or "exemplary" is used herein to mean serving as an example, instance, or illustration. Any aspect or design described herein as "exemplary" is not necessarily to be construed as preferred or advantageous over other aspects or designs. Rather, use of the word, "exemplary," is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while an aspect may have been disclosed with respect to only one of several embodiments, such feature may be combined with one or more other features of the other embodiments as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A microelectromechanical systems (MEMS) device, comprising:
at least one frame gyroscope configured to sense a first component of angular velocity associated with the MEMS device around a first axis;
at least two drive shuttles comprising respective guided masses and coupled to the at least one frame gyroscope; and
at least two proof masses coupled with respective ones of the at least two drive shuttles and configured to sense a second component of angular velocity associated with the MEMS device around a second axis that is orthogonal to the first axis, wherein the at least two drive shuttles are constrained to not respond to angular velocity associated with the MEMS device around the first axis and the second axis.

2. The MEMS device of claim 1, further comprising:
at least one paddle gyroscope coupled to respective ones of the at least one frame gyroscope and configured to sense a third component of angular velocity associated with the MEMS device around a third axis that is orthogonal to the first axis and the second axis.

3. The MEMS device of claim 2, wherein the MEMS device is configured to operate as at least one of a two axis gyroscope or a three axis gyroscope.

4. The MEMS device of claim 2, wherein the at least one frame gyroscope comprises two frame gyroscopes, wherein the at least two drive shuttles comprise four drive shuttles comprising at least the respective guided masses and coupled to associated ones of the two frame gyroscopes, and wherein the at least two proof masses comprise four proof masses coupled with respective ones of the four drive shuttles.

5. The MEMS device of claim 4, wherein ones of respective pairs of the four drive shuttles are coupled to each other via at least one spring.

6. The MEMS device of claim 4, wherein the two frame gyroscopes are further configured to couple two paddle gyroscopes of the at least one paddle gyroscope to the four drive shuttles.

7. The MEMS device of claim 4, wherein the two frame gyroscopes are coupled to each other and are configured to facilitate constraining, at least in part, a motion associated with the two frame gyroscopes into a first condition of linear momentum balance.

8. The MEMS device of claim 4, further comprising:
two coupling mechanisms coupled to respective pairs of the four proof masses and configured to force the respective pairs of the four proof masses into anti-phase motion as a result of the second component of angular velocity associated with the MEMS device around the second axis.

9. The MEMS device of claim 8, wherein the two coupling mechanisms are configured to facilitate constraining, at least in part, the anti-phase motion associated with the four proof masses into a second condition of linear momentum balance.

10. The MEMS device of claim 8, wherein a motion associated with the four proof masses is decoupled, at least in part, from out-of-plane motion associated with the two frame gyroscopes via respective flexible couplings and the four drive shuttles, wherein the out-of-plane motion is defined with reference to a plane comprising the first axis and the third axis.

11. The MEMS device of claim 1, wherein the at least two drive shuttles are configured to force the at least two proof masses into oscillation.

12. The MEMS device of claim 11, wherein at least one of a set of the at least two drive shuttles or a set of the at least one frame gyroscope are configured to sense drive motion associated with the oscillation.

13. The MEMS device of claim 12, wherein the at least one of the set of the at least two drive shuttles or the set of the at least one frame gyroscope are configured to excite the drive motion associated with the oscillation via a set of drive combs.

14. The MEMS device of claim 12, wherein the at least two drive shuttles are configured to move in anti-phase drive motion and are configured to transmit the anti-phase drive motion to the at least one frame gyroscope via at least one flexible coupling configured to minimize transmission of motion, which is orthogonal to the anti-phase drive motion, of the at least one frame gyroscope to the at least two drive shuttles.

15. The MEMS device of claim 1, further comprising:
a stress isolation frame coupled to the MEMS device and configured to reject, at least in part, stress transmitted from a package associated with the MEMS device to the MEMS device.

* * * * *